US012789344B2

(12) United States Patent
Prescott

(10) Patent No.: US 12,789,344 B2
(45) Date of Patent: Nov. 10, 2026

(54) TOOL DRIVE ASSEMBLY WITH INTEGRATED MAGNETIC DISPLACEMENT MONITORING SYSTEM

(71) Applicant: Hubbell Incorporated, Shelton, CT (US)

(72) Inventor: Benjamin Prescott, Pembroke, NH (US)

( * ) Notice: Subject to any disclaimer, the term of this patent is extended or adjusted under 35 U.S.C. 154(b) by 0 days.

(21) Appl. No.: 18/677,513

(22) Filed: May 29, 2024

(65) Prior Publication Data

US 2024/0399552 A1 Dec. 5, 2024

Related U.S. Application Data

(60) Provisional application No. 63/568,298, filed on Mar. 21, 2024, provisional application No. 63/470,219, filed on Jun. 1, 2023.

(51) Int. Cl.

| | |
|---|---|
| ***B25F 5/00*** | (2006.01) |
| ***B25F 5/02*** | (2006.01) |
| ***G01P 3/487*** | (2006.01) |
| ***H01R 43/042*** | (2006.01) |

(52) U.S. Cl.

CPC ............ *B25F 5/00* (2013.01); *H01R 43/0428* (2013.01)

(58) Field of Classification Search

CPC .......... B25F 5/00; B25F 5/02; H01R 43/0428; G01P 3/487; G01D 5/14; G01D 5/145; G01D 5/20; G01D 5/204; G01D 5/2448; G01D 11/24; G01D 11/245; G01R 33/07

USPC ........... 173/2; 72/31.11; 324/207.11, 207.12, 324/207.2–207.25, 228, 251

See application file for complete search history.

(56) References Cited

U.S. PATENT DOCUMENTS

| | | | | |
|---|---|---|---|---|
| 4,540,318 | A | 9/1985 | Hornung et al. | |
| 10,226,826 | B2 * | 3/2019 | Kehoe | B25B 7/126 |
| 11,272,670 | B2 * | 3/2022 | Lam | A01G 3/037 |
| 11,784,539 | B2 * | 10/2023 | Biancuzzi | H02K 11/215 310/68 R |
| 12,138,770 | B2 * | 11/2024 | Wason | B25F 5/001 |
| 2002/0148274 | A1 | 10/2002 | Goop | |

(Continued)

OTHER PUBLICATIONS

International Search Report and Written Opinion in corresponding International Application No. PCT/US21/31451 mailed Sep. 10, 2024. (13 pages).

*Primary Examiner* — Shelley M Self
*Assistant Examiner* — Patrick B Fry
(74) *Attorney, Agent, or Firm* — Wissing Miller LLP

(57) ABSTRACT

A drive assembly for portable, hand-held, battery powered tools is provided. The drive assembly includes a motor, a gear assembly, a lead drive shaft, a jaw drive member and a magnetic displacement monitoring system. The gear assembly is coupled to the motor and the lead drive shaft is operatively coupled to the gear assembly. The magnetic displacement monitoring system has at least one magnet coupled to the lead drive shaft, at least one magnetic field sensor disposed adjacent to the magnet, and a processing element electrically coupled to the magnetic field sensor. As the motor runs, the lead drive shaft rotates about an axis and the jaw drive member moves along the lead drive shaft. The magnetic field sensor senses the change in magnetic field and sends at least one signal to the processing element which determines the location of the jaw drive member along the lead drive shaft.

15 Claims, 36 Drawing Sheets

(56) References Cited

U.S. PATENT DOCUMENTS

| | | | |
|---|---|---|---|
| 2020/0223038 A1 | 7/2020 | Araki et al. | |
| 2021/0062942 A1 | 3/2021 | Besser et al. | |
| 2021/0154821 A1 * | 5/2021 | Wason | H01R 43/0428 |
| 2021/0328399 A1 * | 10/2021 | Radtke | B25F 5/02 |
| 2022/0173637 A1 * | 6/2022 | Biancuzzi | B29C 66/71 |
| 2023/0012107 A1 * | 1/2023 | Kadlecek | B25B 27/0014 |
| 2023/0072765 A1 | 3/2023 | Wason et al. | |
| 2024/0019272 A1 * | 1/2024 | Schmitt | G01D 5/2451 |

* cited by examiner

Fig. 19
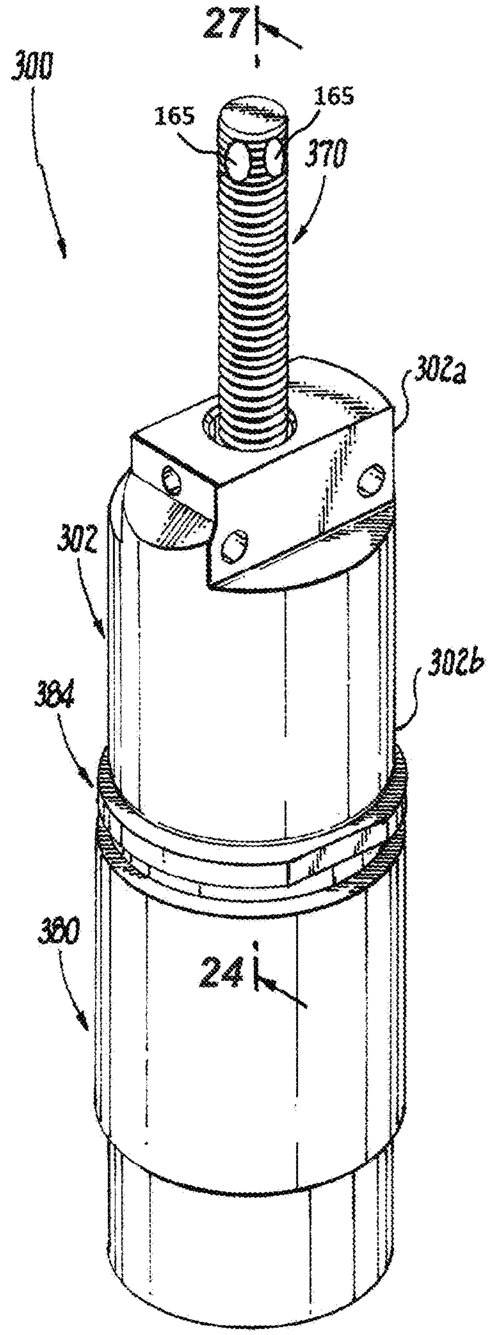
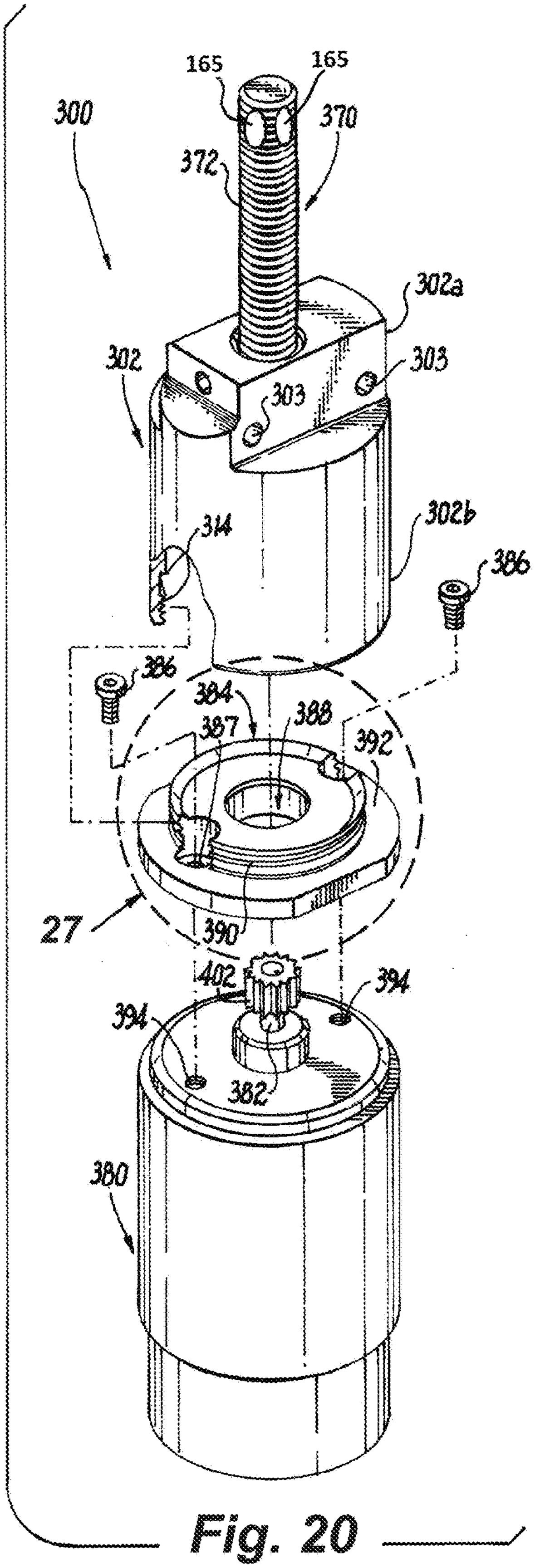
Fig. 20

Fig. 25
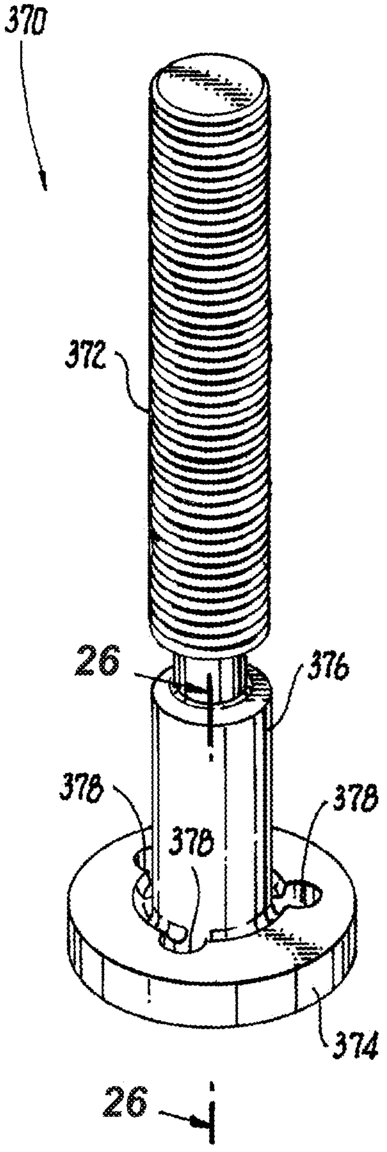
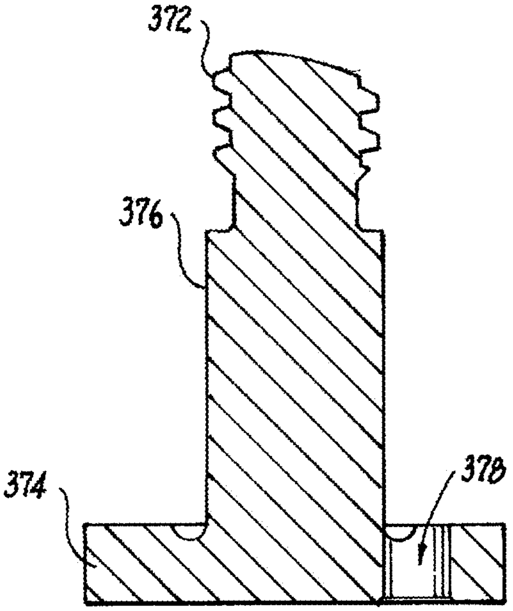
Fig. 26

Fig. 39A
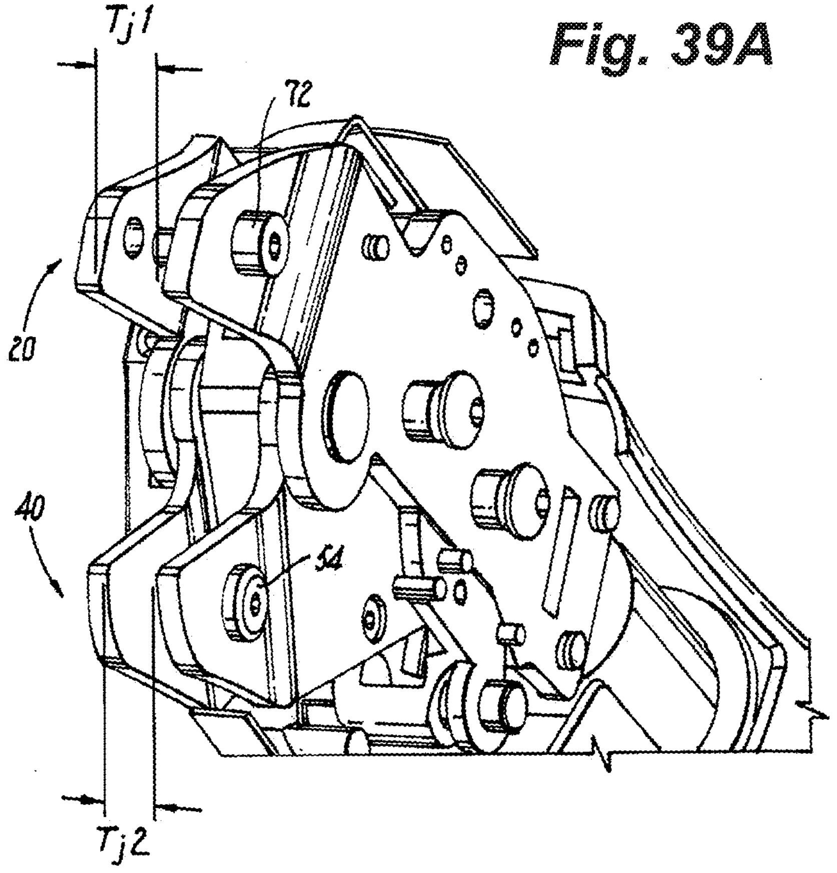
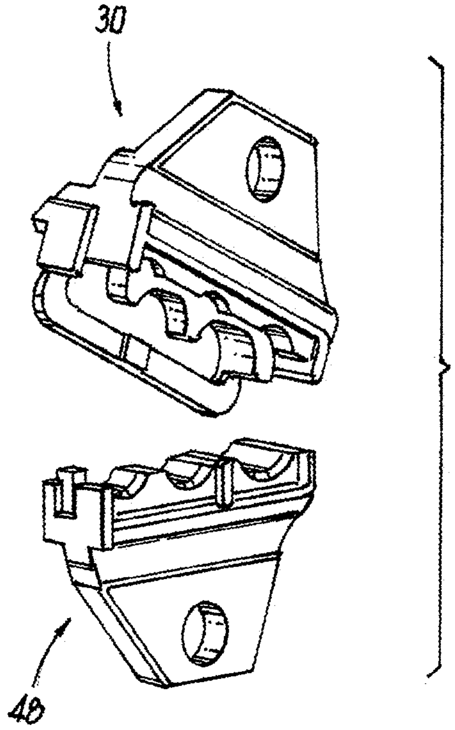
Fig. 39B

TOOL DRIVE ASSEMBLY WITH INTEGRATED MAGNETIC DISPLACEMENT MONITORING SYSTEM

CROSS-REFERENCE TO RELATED APPLICATIONS

This application claims priority to U.S. Provisional Application Ser. No. 63/470,219 filed Jun. 1, 2023 entitled TOOL DRIVE ASSEMBLY WITH INTEGRATED MAGNETIC DISPLACEMENT MONITORING SYSTEM and to U.S. Provisional Application Ser. No. 63/568,298 filed Mar. 21, 2024 entitled TOOL DRIVE ASSEMBLY WITH INTEGRATED MAGNETIC DISPLACEMENT MONITORING SYSTEM the contents of each of which are incorporated herein in their entirety by reference.

TECHNICAL FIELD

The present disclosure relates to tool drive assemblies, and more specifically to a tool drive assembly with an integrated magnetic displacement monitoring system.

DESCRIPTION OF THE RELATED ART

Hand-held, battery powered tools including battery powered crimping tools are known in the art. Such tools are sometimes referred to as a pressing tool. Using such tools, an electrical wire termination is manually held in place between a pair of jaws, namely a fixed jaw and a movable jaw. Crimping of the electrical wire termination is carried out when a motor is activated causing the movable jaw to move toward the fixed jaw so that the jaws impinge the object. The motor, drive assembly, gearbox and other hardware depend on various switches to stop power to the motor once the drive assembly reaches a maximum and/or minimum range required to operate the tool. However, the momentum of the motor and/or drive assembly will often cause overtravel to occur which may damage and/or cause or hasten the wear of the tool.

More specifically, it is important for the proper operation of power tools to be able to determine the operational state of the drive mechanism for the tool. For example, it is important for tools such as mechanical crimp tools to be able to determine the position of dies during the crimp process to ensure the proper crimp cycle has been completed. The location of a cam nut along a power or lead screw on such devices is critical to proper tool function, as it determines the position of the crimping dies, specifically where the tool stops, and where the loads are applied to the tool. Mechanical switches are often placed at upper and lower limits of the cam nut travel to provide an indication of when these limits have been reached. However, due to momentum of either the motor and/or the nut, overtravel often occurs. Other problems include that the tool does not know the location of the nut on the power or lead screw when in the middle region between upper and lower switches. Without the position of the nut on the lead screw being known, the tool may fail to operate if power is lost in this condition and power is then returned. Furthermore, mounting of physical switches to detect the position of the nut on the lead screw presents tolerance problems as there is no adequate solution for precisely mounting the switches within the tool's housing other than board mounting.

Accordingly, a need exists for a system or systems for determining the precise operational state of a power tool's drive system.

SUMMARY OF THE INVENTION

The present disclosure provides exemplary embodiments of portable, hand-held, battery powered crimping tools and drive assemblies with magnetic displacement monitoring systems for such tool. For example, the crimping tool may be a battery powered crimping tool having an in-line handle assembly and a working head assembly. The handle assembly has a tool frame and an outer housing. The working head assembly has a pair of jaw assemblies mounted to the tool frame such that at least one of the jaw assemblies is movable relative to the other jaw assembly. Each jaw assembly may include a die for crimping an object or a blade for cutting an object.

In one exemplary embodiment, a drive assembly for portable, hand-held, battery powered tools is provided. The drive assembly includes a motor, a gear assembly, a lead drive shaft, a jaw drive member and a magnetic displacement monitoring system. The gear assembly is coupled to the motor and the lead drive shaft is operatively coupled to the gear assembly. The magnetic displacement monitoring system has at least one magnet coupled to the lead drive shaft, at least one magnetic field sensor disposed adjacent to the magnet, and a processing element electrically coupled to the magnetic field sensor. As the motor runs, the lead drive shaft rotates about an axis and the jaw drive member moves along the lead drive shaft. The magnetic field sensor senses the change in magnetic field and sends at least one signal to the processing element which determines the location of the jaw drive member along the lead drive shaft.

In another exemplary embodiment, the drive assembly includes a drive assembly housing, a motor, a gear assembly, a lead drive shaft, a jaw drive member and a magnetic displacement monitoring system. The motor and gear assembly are housed within the drive assembly housing. The lead drive shaft has a distal end portion and a proximal end portion. The distal end portion of the lead drive shaft is threaded and substantially outside of the drive assembly housing. The drive member is movable along the lead drive shaft as the lead drive shaft rotates about an axis.

In another exemplary embodiment, the magnetic displacement monitoring system includes at least one magnet, at least one magnetic field sensor and a processing element. The magnet is operatively associated with a lead drive shaft. The magnetic field sensor is disposed adjacent to the magnet wherein the magnetic field sensor is configured to sense the magnetic field as the magnet is rotated about an axis. The processing element is electrically coupled to the magnetic field sensor and configured to monitor rotation of the lead drive shaft based on the sensed magnetic field.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 19 is a perspective view of another exemplary embodiment of the drive assembly of FIG. 6;

FIG. 20 is an exploded perspective view of the drive assembly of FIG. 19, illustrating a lead drive shaft extending from a drive assembly housing, and a drive housing adapter that is used to couple the drive assembly housing to a motor of the drive assembly;

FIG. 25 is an enlarged view of a portion of the lead drive shaft of FIG. 21 taken from detail 25 of FIG. 21;

FIG. 26 is a cross-sectional view of a portion of the lead drive shaft of FIG. 25, taken from line 26-26 of FIG. 25;

FIGS. 39A, 39B are views of a tool showing the jaw assemblies and dies according to an illustrative embodiment of the present disclosure;

DETAILED DESCRIPTION

The portable, battery-powered, hand-held tools contemplated by the present disclosure include but are not limited to crimping tools that crimp one or more conductors to an object and cutting tools used to cut one or more conductors. The present disclosure will be shown and described in connection with portable, battery-powered, hand-held tools with an in-line handle design. However, handle design of the portable, battery-powered, hand-held tool may be a pistol grip design, a suitcase design or other type handle design. The present disclosure will also be shown and described in connection with a crimping tool. However, the crimping jaws of the tool may be substituted with cutting jaws to create a cutting tool.

For ease of description, the portable, battery-powered, crimping tools according to the present disclosure may also be referred to as the "tools" in the plural and the "tool" in the singular. The objects crimped by the crimping tool may also be referred to herein as the "wire terminations" in plural and the "wire termination" in the singular. Non-limiting examples of the wire terminations include lugs and splices. The conductors, cables, wires or objects to be crimped within the wire terminations or cut by the tools of the present disclosure may also be referred to as the "conductors" in the plural and the "conductor" in the singular. "Braking" and/or "motor braking" may refer to braking of the motor, stopping of the motor, reducing power to the motor, or the like such that rotational speed of the motor drops. In addition, as used in the present disclosure, the terms "front," "rear," "upper," "lower," "upwardly," "downwardly," "proximal," "distal" and other orientation descriptors are intended to facilitate the description of the exemplary embodiments disclosed herein and are not intended to limit the structure of the exemplary embodiments or limit the claims to any particular position or orientation.

Figure 1:
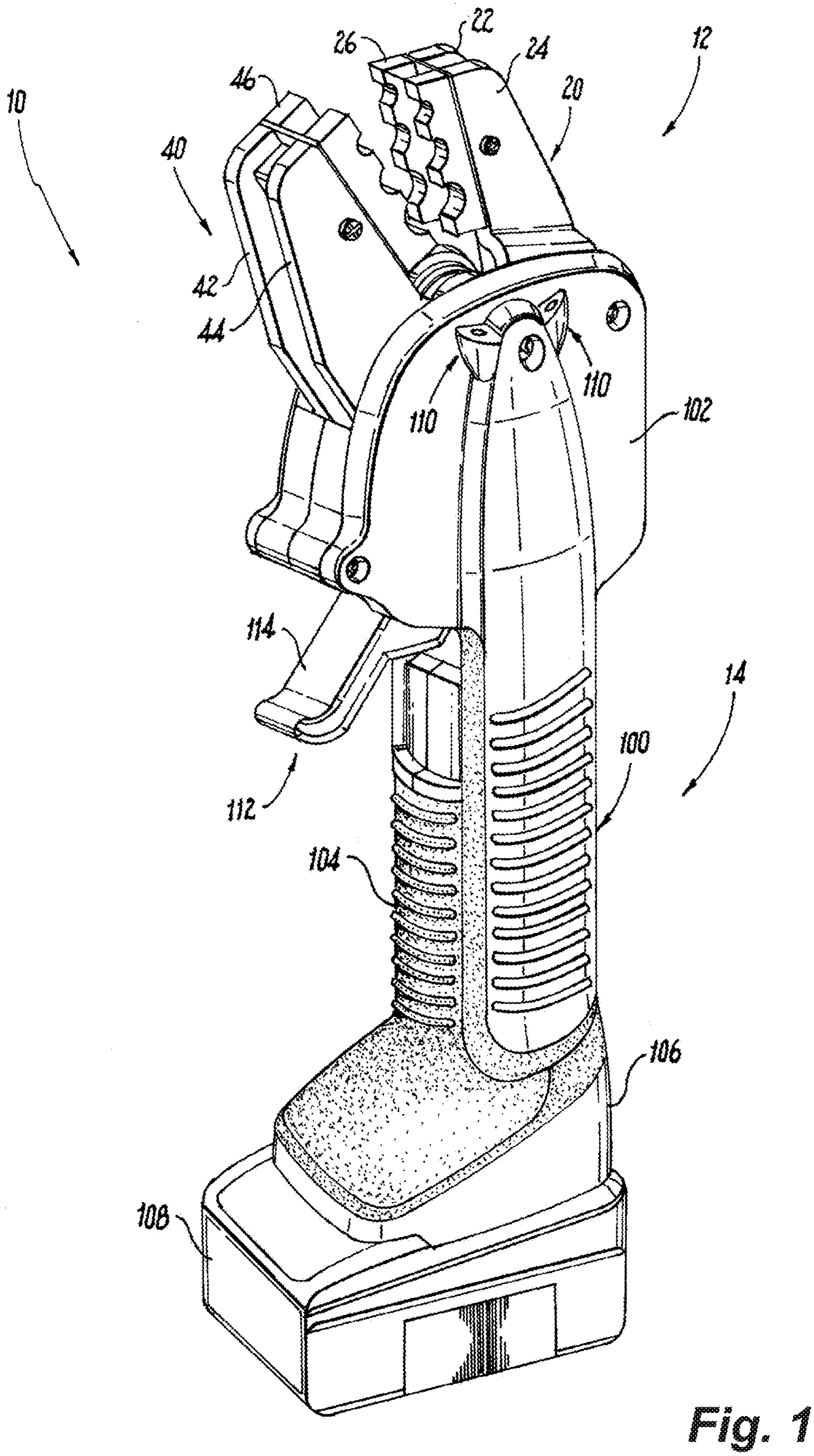
FIG. 1 is a side perspective view of a first side of an exemplary embodiment of a battery-powered tool according to the present disclosure, illustrating a working head assembly and a handle assembly.
Figure 2:
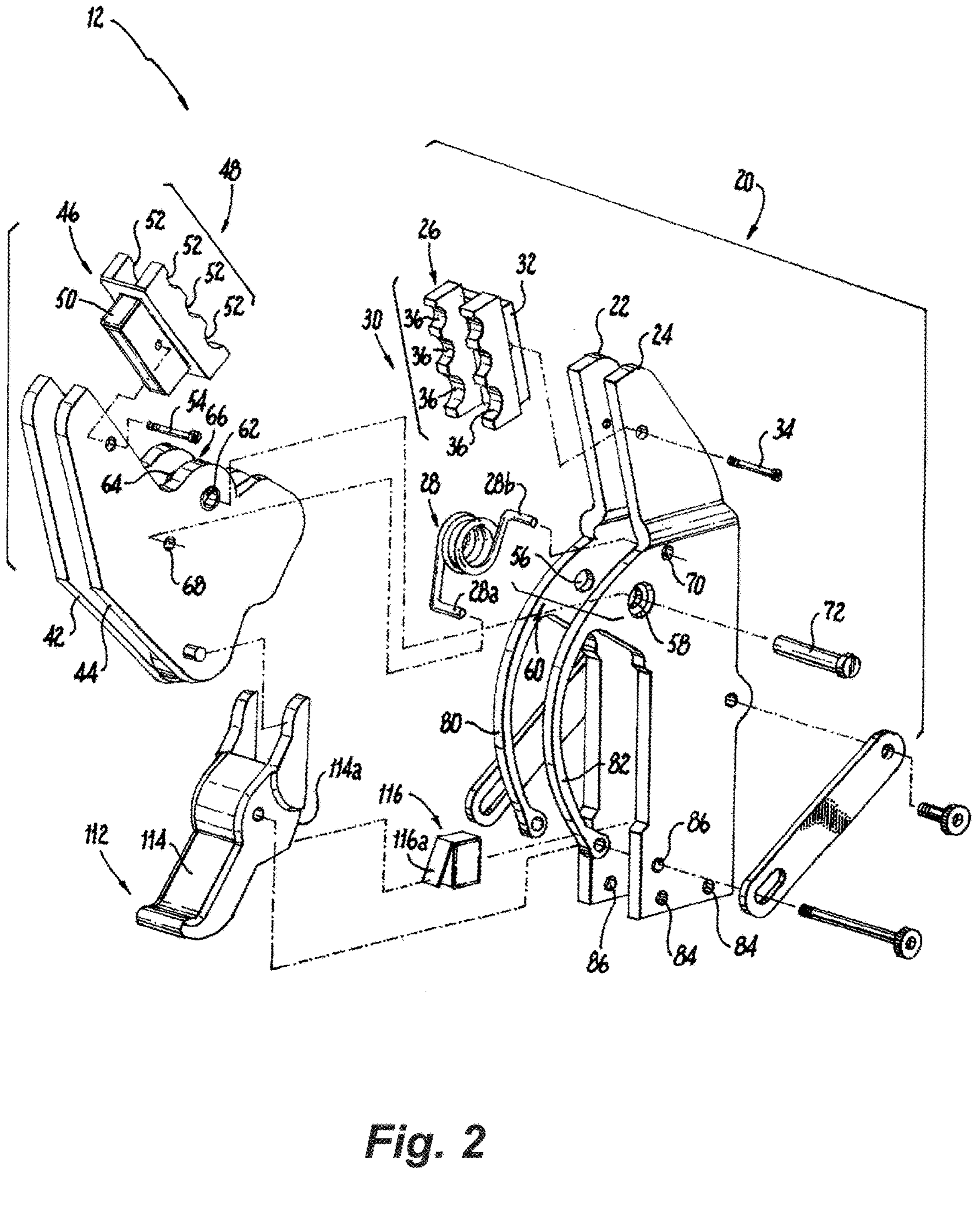
FIG. 2 is an exploded perspective view of an exemplary embodiment of jaw assemblies of the tool according to the present disclosure.

Referring to FIGS. 1 and 2, a battery-powered, hand-held crimping tool 10 according to the present disclosure is shown. The tool 10 includes a working head assembly 12 and a handle assembly 14. The working head assembly 12 includes a first jaw assembly 20 and a second jaw assembly 40. A biasing member 28 is used to automatically bias the second jaw assembly 40 in a direction away from the first jaw assembly 20. The first jaw assembly 20 includes a first jaw plate 22, a second jaw plate 24, a die 26. The first jaw plate 22 and second jaw plate 24 are aligned in parallel and spaced apart, as shown in FIG. 2. In this exemplary embodiment, the die 26 includes one or more impinging regions 30 and a mounting member 32. Each of the one or more impinging regions 30 may include one or more impacting surfaces 36, each surface being configured and dimensioned to receive a barrel portion of a wire termination (not shown). The die 26 is secured to the first and second jaw plates 22 and 24 by positioning the mounting member 32 between the first and second jaw plates so that a fastener 34, e.g., a bolt, can be passed through apertures in the plates 22 and 24 and the mounting member 32, as shown, and tightened. The second jaw assembly 40 includes a first jaw plate 42, a second jaw plate 44 and die 46. The first jaw plate 42 and second jaw plate 44 are aligned in parallel and spaced apart, as shown in FIG. 2. In this exemplary embodiment, the die 46 includes one or more impinging regions 48 and a mounting member 50. Each of the one or more impinging regions 48 may include one or more impacting surfaces 52, each surface 52 being configured and dimensioned to receive a barrel portion of a wire termination (not shown). The die 46 is secured to the first and second jaw plates 42 and 44 by positioning the mounting member 50 between the first and second jaw plates 42 and 44 so that a fastener 54, e.g., a bolt, can be passed through apertures in the plates 42 and 44 and the mounting member 50, as shown, and tightened.

Continuing to refer to FIGS. 1 and 2, the second jaw assembly 40 is operatively coupled to the first jaw assembly 20 so that the second jaw assembly 40 is movable relative to the first jaw assembly 20. Various known techniques may be used to couple the jaw assemblies 20 and 40. For example, in the embodiment of FIG. 2, a tang and clevis type configuration is used, where a portion of the first and second jaw plates 22 and 24 include through apertures 56 and 58 acting as a clevis 60, and portion of the first and second jaw plates 42 and 44 include apertures 62 and 64 acting as a tang 66. In this exemplary embodiment, the biasing member 28, e.g., a helical torsion spring, is positioned within the tang 66 of the second jaw assembly 40 so that a central opening of the biasing member 28 is aligned with the apertures 62 and 64 in the tang 66. One end **28*a* of the biasing member 28 is inserted into a spring aperture 68 in the second jaw plate 44 of the second jaw assembly 40 to couple the biasing member 28 to the second jaw assembly 40. The tang 66 is then positioned between the clevis 60 of the first jaw assembly 20, and another end 28*b* of the biasing member 28 is inserted into a spring aperture 70 in the second jaw plate 24 of the first jaw assembly 20 to couple the biasing member 28 to the first jaw assembly 20. With the tang 66 aligned with the clevis 60, a bolt 72 is passed through the clevis apertures 56 and 58, the tang apertures 62 and 64, and the central opening of the biasing member 28 to movably secure the second jaw assembly 40 to the first jaw assembly 20. In this exemplary embodiment, the second jaw assembly 40 pivots relative to the first jaw assembly 20 where the bolt 72 acts as the pivot pin. As noted above, the biasing member 28 normally biases the second jaw assembly 40 in a direction away from the first jaw assembly 20**.

Figure 3:
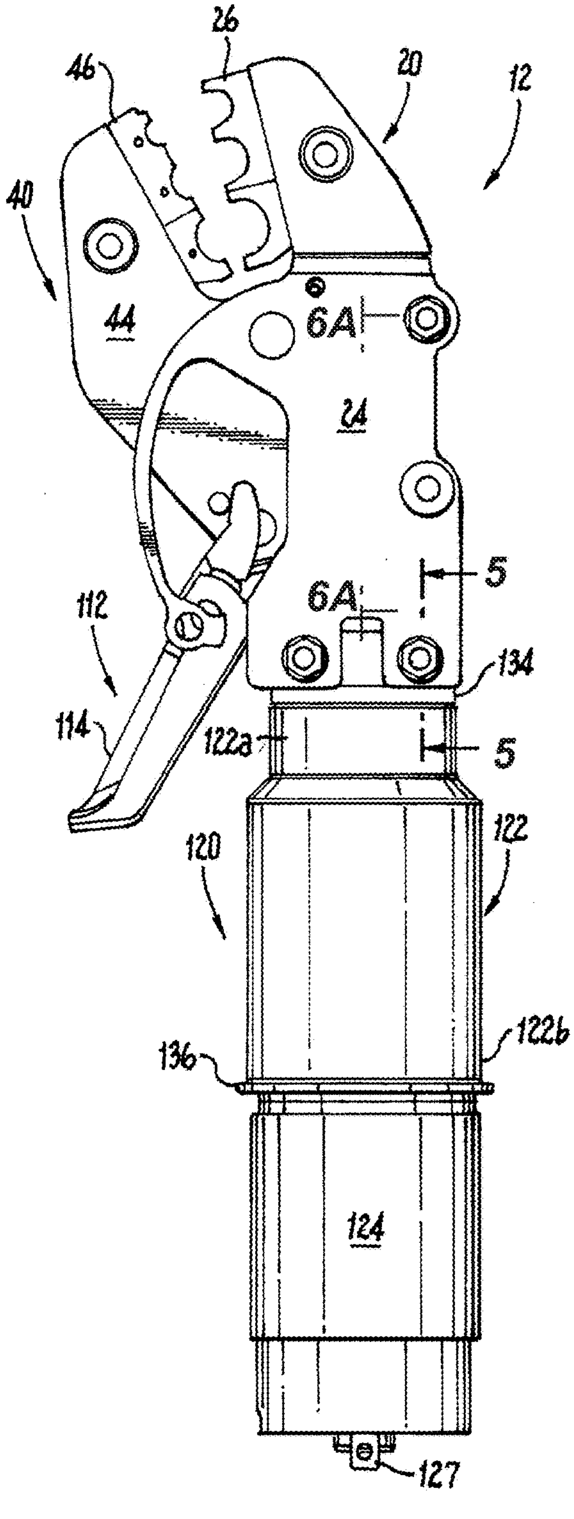
FIG. 3 is a side elevation view of the tool of FIG. 1 with the outer housing of the tool removed.

Referring now to FIGS. 1 and 3, the handle assembly 14 houses a drive assembly and one or more electrical controls used to activate and deactivate the tool 10. In the exemplary embodiment shown, the handle assembly 14 includes a housing 100, seen in FIG. 1, and the drive assembly 120, seen in FIG. 3. The housing 100 is configured and dimensioned to enclose or wrap around the drive assembly 120 and a proximal portion of the working head assembly 12. More specifically, the distal end of the housing 100 is a head portion 102 configured and dimensioned to enclose a portion of the jaw assemblies 20 and 40. An intermediate portion of the housing 100 is a grip portion 104 that is configured and dimensioned to enclose the drive assembly 120. The proximal end of the housing 100 is an end portion 106 configured and dimensioned to receive a portion of a battery 108 and to house the components used to connect the battery 108 to the housing 100 using, for example, known battery clips. The head portion 102 of the housing 100 may also include one or more lights 110, e.g., LEDs, used to illuminate an area between the first and second jaw assemblies 20 and 40 when, for example, the tool 10 is activated.

Figure 4:
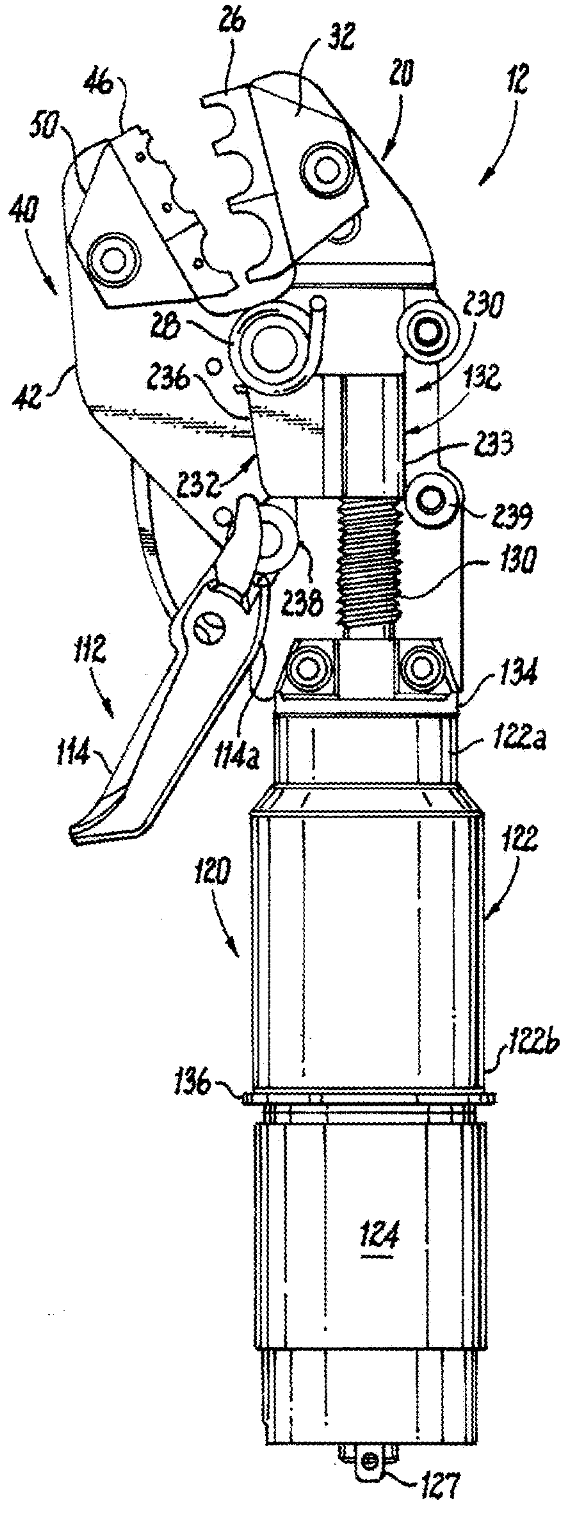
FIG. 4 is the side elevation view of tool of FIG. 3, illustrating one of the movable jaws of a jaw assembly removed to reveal a jaw drive member coupled to a lead drive shaft used to move the movable jaw assembly.
Figure 6:
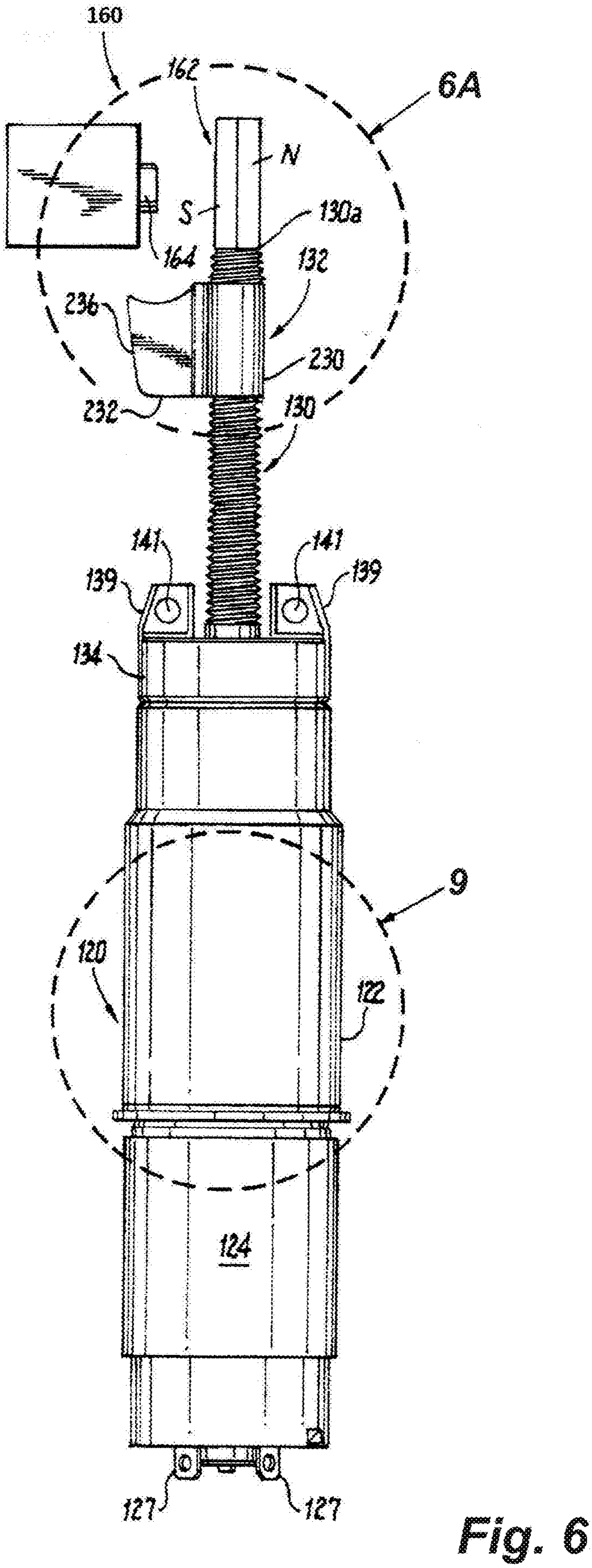
FIG. 6 is the side elevation view of the tool of FIG. 3, illustrating the pair of jaw assemblies removed to reveal the jaw drive member coupled to the lead drive shaft used to move at least one of the jaw assemblies.
Figure 7:
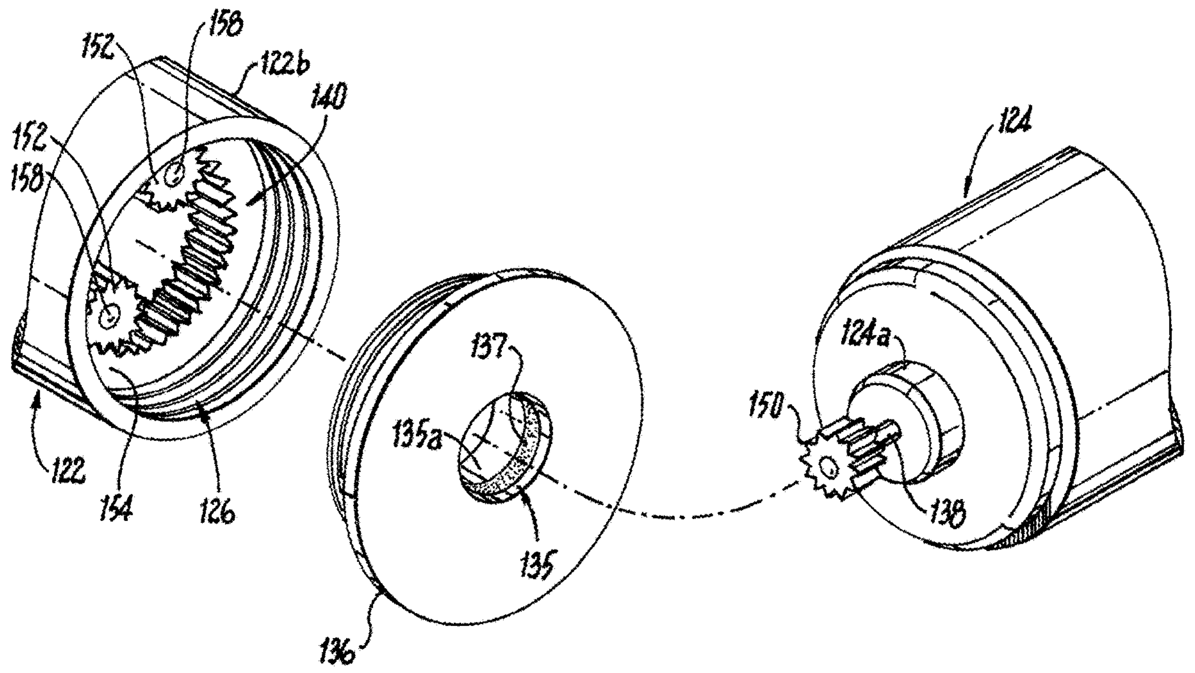
FIG. 7 is an exploded perspective view of a proximal end of the drive assembly housing of FIG. 6, illustrating the motor separated from the drive assembly housing and the end cap of the drive assembly housing removed to reveal a portion of the gear assembly within the drive assembly housing.
Figure 8:
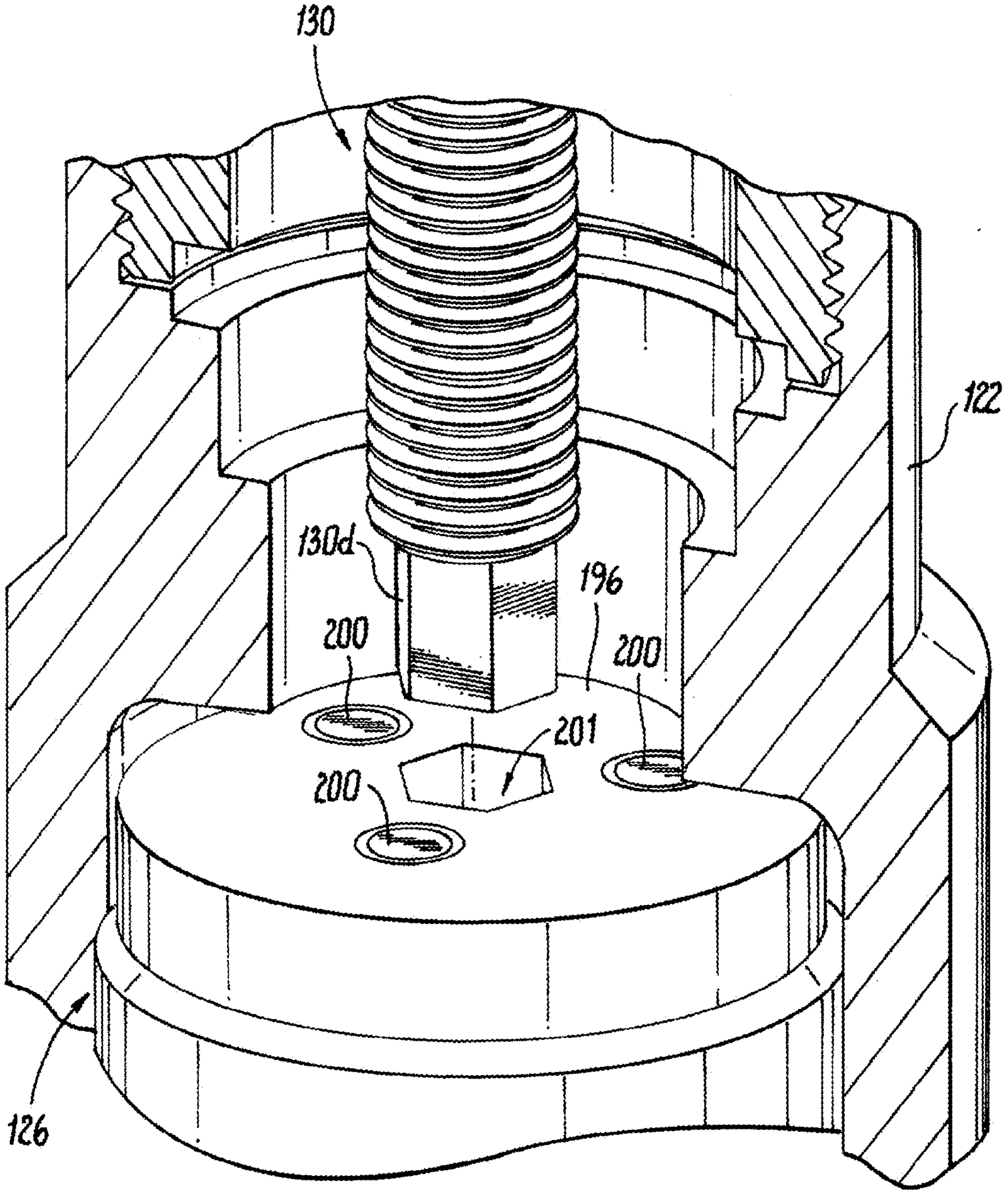
FIG. 8 is an enlarged cross-sectional view of the interior of the drive assembly housing of FIG. 6 with the bearing system removed to illustrate a connection between the lead drive shaft and the gear assembly.

In the exemplary embodiment shown, the battery 108 is removably connected to the end portion 106 of the housing 100. In another embodiment, the battery 108 could be removably mounted or connected to any suitable position on the housing 100. In another embodiment, the battery 108 may be affixed to the housing 100 so that it is not removable. The battery 108 shown is a rechargeable battery, such as a lithium-ion battery, that can output a voltage of at least 16 VDC, and preferably in the range of between about 16 VDC and about 24 VDC. The battery 108 provides power to a motor 124, as seen in FIGS. 6 and 7 in the drive assembly 120 via electrical contacts 127 on the motor 124. To activate the motor and possibly the lights 110, if used, one or more operator control assemblies 112 may be used. In the exemplary embodiment shown, the one or more operator controls 112 may include a trigger 114, and a switch 116, seen in FIG. 2. In this exemplary embodiment, the trigger 114 pivotally connected to a spring arm 80 extending from the first jaw plate 22 of the first jaw assembly 20 and to a spring arm 82 extending from the second jaw plate 24 of the first jaw assembly 20. The switch 116 may be, for example a single pole micro-switch, that operatively interacts with a camming surface 114*a* of the trigger 114, seen in FIG. 4. The switch 116 is electrically connected between the battery 108, the motor 124 and the one or more lights 110 such that when the trigger 114 is depressed to a point where the camming surface 114*a* of the trigger 114 contacts and depresses the switch arm 116*a*, the switch 116 turns "on" causing the motor 124 to activate and the one or more lights 110 to turn "on" illuminating the area between the first and second jaw assemblies 20 and 40.

Figure 9:
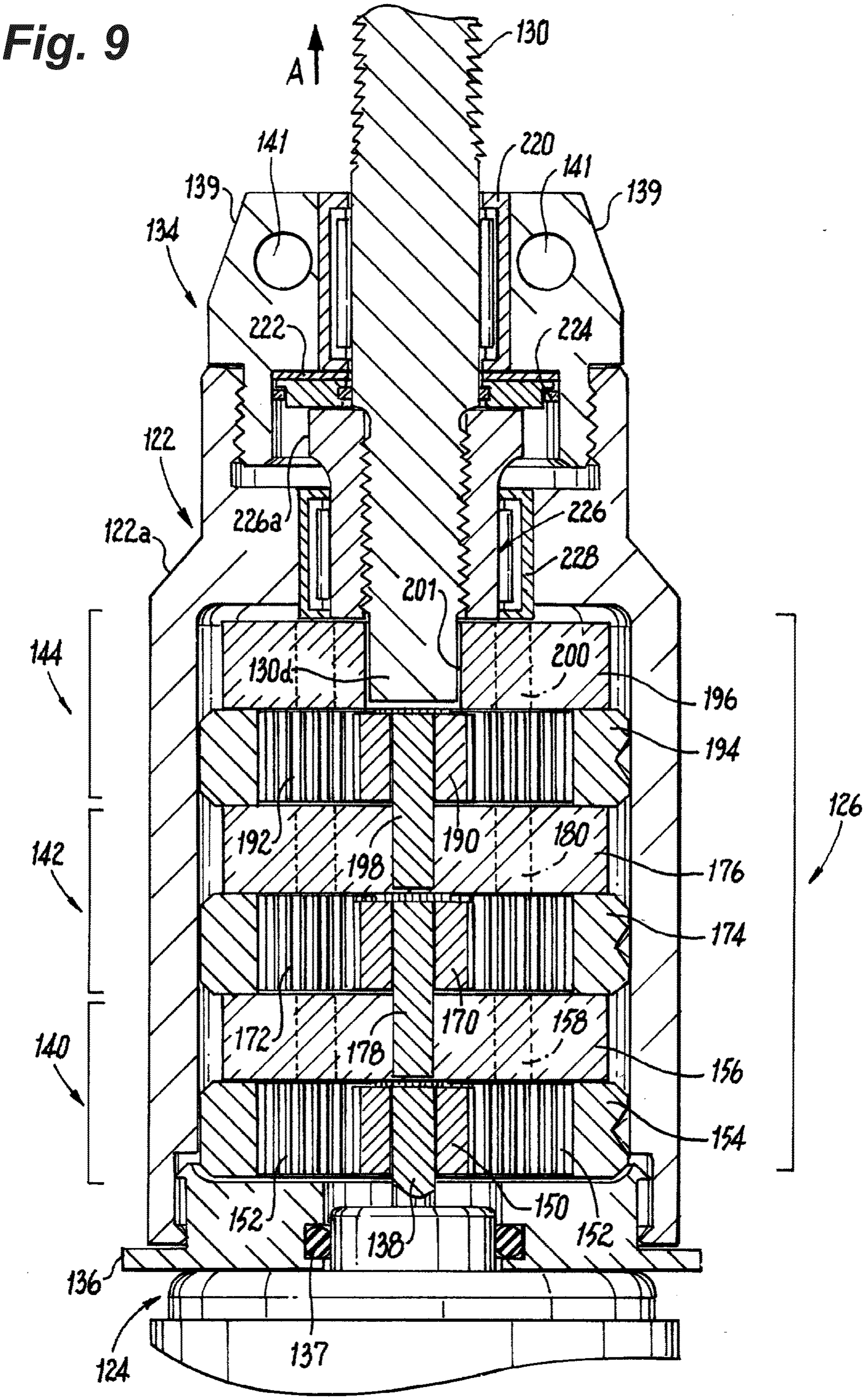
FIG. 9 is a cross-sectional view of a portion of the tool frame of FIG. 6 taken from detail 9 in FIG. 6, illustrating the bearing system and the gear assembly within the drive assembly housing and a portion of the motor connected to the drive assembly housing.
Figure 10:
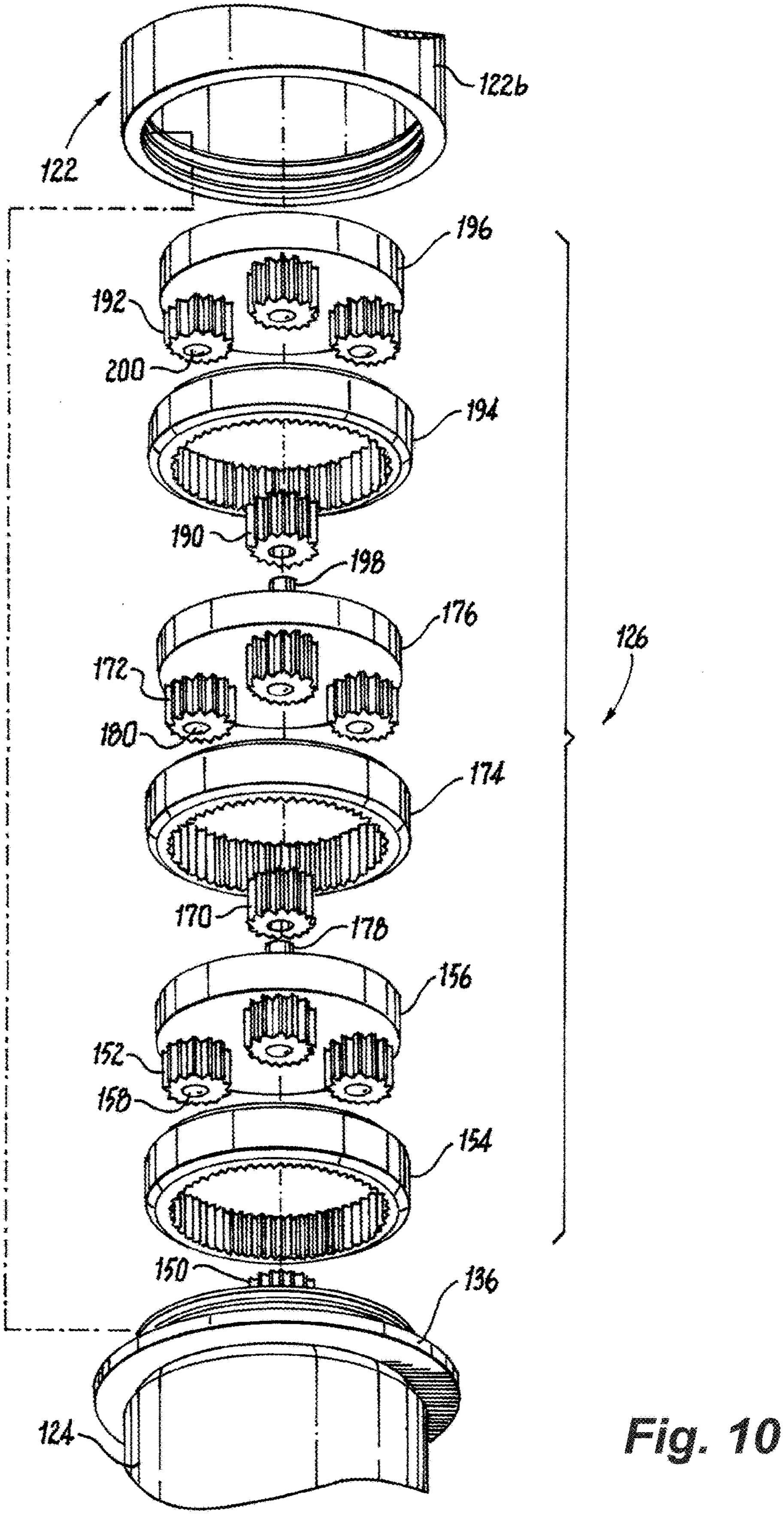
FIG. 10 is an exploded bottom perspective view of an exemplary embodiment of a gear assembly according to the present disclosure.
Figure 11:
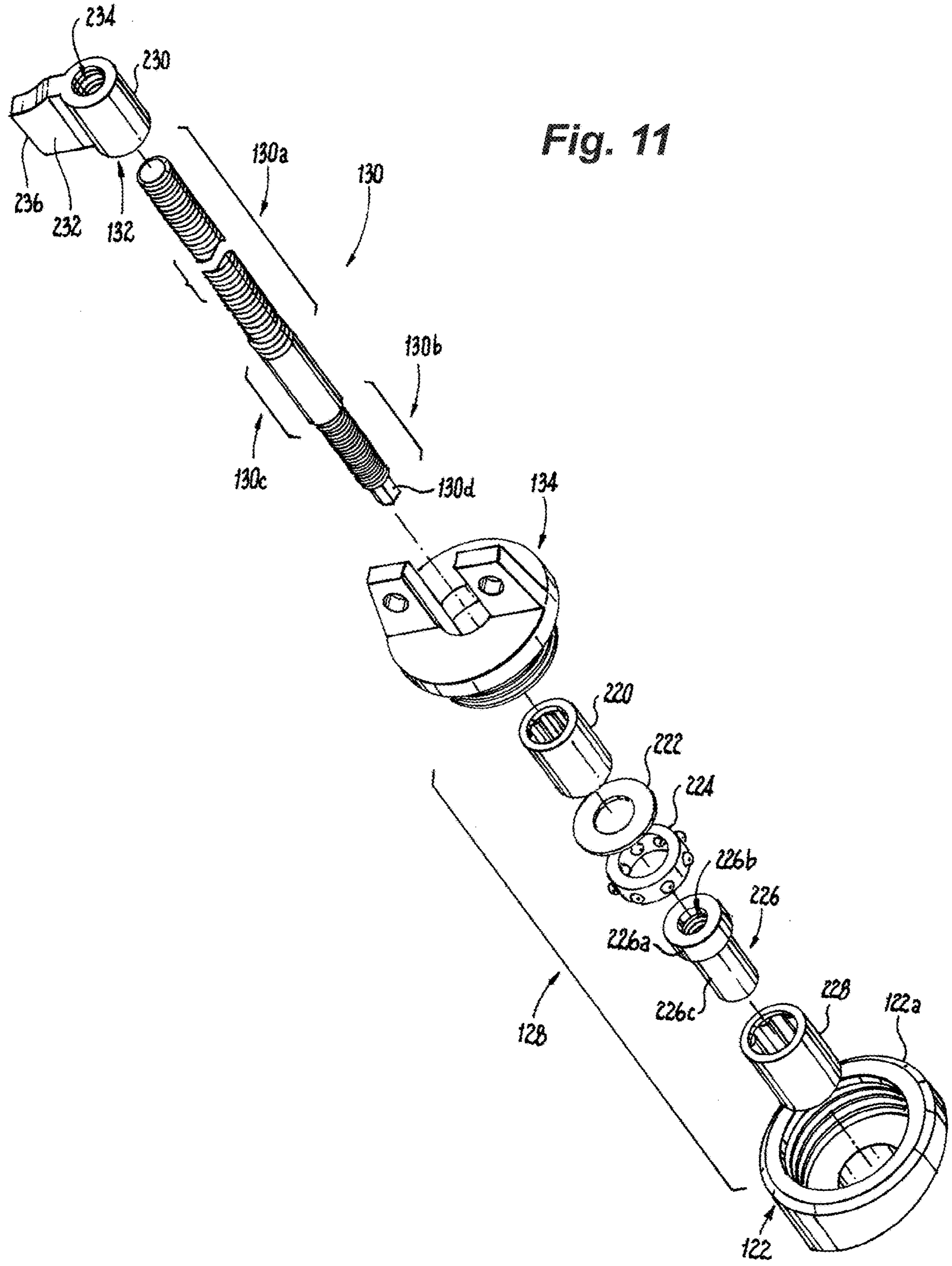
FIG. 11 is an exploded perspective view of an exemplary embodiment of a bearing system according to the present disclosure.

Turning now to FIGS. 6-15, an exemplary embodiment of the drive assembly (or system) 120 according to the present disclosure is shown. The drive assembly 120 includes the motor 124, a gear assembly 126, a bearing system 128, a lead drive shaft 130, a magnetic displacement monitoring system 160 (MDMS) including magnet 162 and magnetic field sensor 164, and a jaw drive member 132. In a non-limiting embodiment, the drive assembly 120 may also include a known braking system 129. A drive assembly housing 122 holds or encases the gear assembly 126 and the bearing system 128. Extending from a distal end portion 122*a* of the drive assembly housing 122 and operatively coupled to the gear assembly 126 is the lead drive shaft 130, seen in FIG. 11. In this exemplary embodiment, the lead drive shaft 130 includes a distal end portion 130*a*, a proximal end portion 130*b* and an intermediate portion 130*c* between the distal end portion 130*a* and the proximal end portion 130*b*. The distal end portion 130*a* is threaded with, for example, buttress threads typically used for one-directional loading on the lead drive shaft 130, or acme threads typically used for bi-directional loading on the lead drive shaft 130. The proximal end portion 130*b* of the lead drive shaft 130 is threaded with, for example, conventional machine screw threads. At the tip of the proximal end portion 130*b* of the lead drive shaft 130 is a spline or key 130*d*, seen in FIGS. 8 and 9, that interacts with the gear assembly 126. In the exemplary embodiment shown, the spline 130*d* is a hex shaped member that interacts with a hex shape keyway 201 in the gear assembly 126. The intermediate portion 130*c* as shown in FIG. 11 of the lead drive shaft 130 has a smooth exterior surface with an outside diameter that is substantially the same as the outside diameter of the distal end portion 130*a*. The jaw drive member 132, seen in FIG. 6, is movably coupled to a distal end portion 130*a* of the lead drive shaft 130 as described in more detail below with reference to FIGS. 6 and 11.

Figure 5:
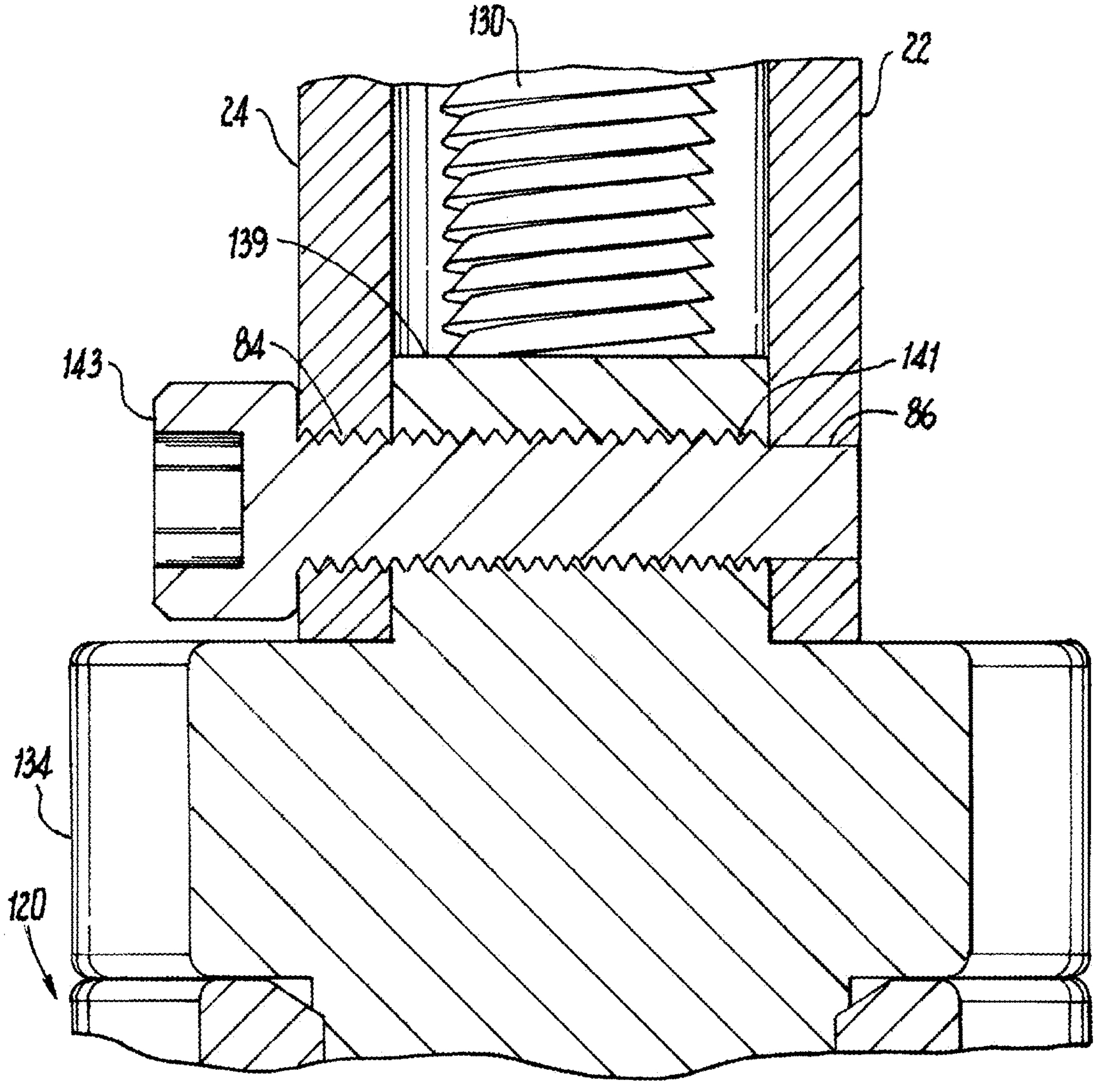
FIG. 5 is a partial cross-sectional view of the tool of FIG. 3 taken from line 5-5.

The proximal end portion 130*b* of the lead drive shaft 130 is secured within the distal end portion 122*a* of the drive assembly housing 122 by the bearing system 128 and an end cap 134 of the drive assembly housing 122, seen in FIGS. 9 and 11. The end cap 134 is secured to the distal end portion 122*a* of the drive assembly housing 122 by a mechanical connection. In the exemplary embodiment shown in FIGS. 9 and 11, the mechanical connection is a threaded connection, where threading on the end cap 134 is screwed into threading in the drive assembly housing 122. However, other mechanical connections are contemplated, including snap-fit and press-fit connections where the end cap 134 is snapped or pressed within the drive assembly housing 122, set screw connections where set screws secure the end cap 134 to the drive assembly housing 122, and welds. The end cap 134 of the drive assembly housing 122 includes a pair of tabs 139, each having a mounting aperture 141. The mounting apertures 141 are positioned to align with corresponding mounting apertures 84 and 86 in the first and second jaw plates 22 and 24 of the first jaw assembly 20, seen in FIG. 2. The first and second jaw plates can then be secured to the tabs 139 of the end cap 134 using bolts 143, as shown in FIG. 5.

Referring to FIGS. 6, 7 and 9, extending from a proximal end portion 122*b* of the drive assembly housing 122 and operatively coupled to the gear assembly 126 is the motor 124. The motor 124 is secured to the proximal end portion 122*b* of the drive assembly housing 122 via an end cap 136, seen in FIGS. 7 and 9. The end cap 136 is secured to the proximal end portion 122*b* of the drive assembly housing 122 by a mechanical connection. In the exemplary embodiment shown in FIGS. 7 and 9, the mechanical connection is preferably a threaded connection between the end cap 136 and the drive assembly housing 122. However, other mechanical connections are contemplated, including annular or cantilever snap-fit connections, press-fit connections, set screw connections and welds. The motor 124 is secured to the end cap 136 by a mechanical connection. In the exemplary embodiment shown in FIGS. 7 and 9, the mechanical connection is a press-fit connection between the proximal end 124*a* of the motor 124 passing through a central opening 135 in the end cap 136 and an interior surface 135*a* of the central opening 135. However, other mechanical connections are contemplated, including snap-fit connections, set screw connections and welds. A sealing member 137, e.g., an O-ring, may be positioned within the central opening 135 of the end cap 136 to seal the connection between motor 124 and the end cap 136.

Generally, the motor 124 rotates a motor drive shaft 138, seen in FIG. 7, that is coupled to the gear assembly 126. The gear assembly 126 reduces the rate of rotation of the motor drive shaft 138. The lead drive shaft 130 is coupled to the gear assembly 126 and rotates at the output rate of the gear assembly 126. The bearing system 128 as seen in FIG. 11 is provided so that the lead drive shaft 130 can withstand radial and axial loads generated during an operation of the jaw assemblies 20 and 40 as seen in FIG. 1. As an example, the motor 124 may be configured to rotate the motor drive shaft 138 at a rate in the range of about 15,000 rpm and about 21,000 rpm with an output torque in the range of about 0.4 in-lb. and about 0.8 in-lb. In this configuration, the motor current may be in the range of about 6 amps and about 15 amps, the battery voltage may be in the range of about 16 VDC and about 24 VDC, and the output motor power may be in the range of about 95 watts and about 160 watts. The gear assembly 126 may reduce the rate of rotation of the motor drive shaft 138 to a range of about 375 rpm and about 1400 rpm. As such, the gear ratio of the gear assembly 126 may be in the range of about 15:1 and about 40:1. The output of the gear assembly 126 is transferred to the lead drive shaft 130. In this exemplary embodiment, the lead drive shaft 130 is a threaded shaft having a diameter in a range of about 0.35 inches and about 0.50 inches, with a lead, e.g., a screw lead, in a range of about 0.071 inches and about 0.125 inches. Under the motor operating configuration described above, the efficiency of the gear assembly 126 may be in the range of about 11% and about 61%, and the pull force of the lead drive shaft 130 may be in the range of about 200 lbs. and about 400 lbs. Movement of the lead drive shaft 130 is transferred to the jaw drive member 132. In the exemplary embodiment of the present disclosure, the output of the gear assembly 126 is rotational motion which is transferred to the lead drive shaft 130. Rotation of the lead drive shaft 130 is translated to linear movement of the jaw drive member 132. With a pull force of the lead drive shaft 130 in the exemplary range of about 200 lbs. and about 400 lbs., the linear travel distance of the jaw drive member 132 may be in the range of about 0.6 inches and about 0.9 inches. Linear movement of the jaw drive member 132 moves the second jaw assembly 40 toward the first jaw assembly 20 when crimping a wire termination positioned between the first and second jaw assemblies 20 and 40. It is noted that with the gear assembly 126 reducing the rate of rotation of the motor drive shaft 138 to a range of about 375 rpm and about 1400 rpm, the total crimp cycle of the tool 10 may be in the range of about 0.4 seconds and about 2.0 seconds.

As another example, the motor 124 may be configured to rotate the motor drive shaft 138 at a rate in the range of about 19,000 rpm and about 21,000 rpm with an output torque in the range of about 0.49 in-lb. and about 0.69 in-lb. In this exemplary embodiment, the motor current may be in the range of about 9 amps and about 12 amps, the battery voltage may be in the range of about 16 VDC and about 22 VDC, and the output motor power may be in the range of about 120 watts and about 160 watts. The gear assembly 126 may reduce the rate of rotation of the motor drive shaft 138 to a range of about 600 rpm and about 1200 rpm. As such, the gear ratio of the gear assembly 126 may be in the range of about 18:1 and about 33:1. As noted, the output of the gear assembly 126 is transferred to the lead drive shaft 130. In this exemplary embodiment, the lead drive shaft 130 is a threaded shaft having a diameter in a range of about 0.35 inches and about 0.4 inches, with a lead, e.g., a screw lead, in a range of about 0.075 inches and about 0.1 inches. Under the motor operating configuration described above, the efficiency of the gear assembly 126 may be in the range of about 20% and about 52%, and the pull force of the lead drive shaft 130 may be in the range of about 288 lbs. and about 377 lbs. Movement of the lead drive shaft 130 is transferred to the jaw drive member 132. In this exemplary embodiment of the present disclosure, the output of the gear assembly 126 is rotational motion which is transferred to the lead drive shaft 130. Rotation of the lead drive shaft 130 is translated to linear movement of the jaw drive member 132. With a pull force of the lead drive shaft 130 in the exemplary range of about 288 lbs. and about 377 lbs., the linear travel distance of the jaw drive member 132 as shown in FIG. 11 may be in the range of about 0.65 inches and about 0.85 inches. Linear movement of the jaw drive member 132 moves the second jaw assembly 40 toward the first jaw assembly 20 when crimping a wire termination positioned between the first and second jaw assemblies. It is noted that with the gear assembly 126 reducing the rate of rotation of the motor drive shaft 138 to a range of about 600 rpm and about 1200 rpm, the total crimp cycle of the tool 10 may be in the range of about 0.4 seconds and about 0.9 seconds.

As described above, in the exemplary embodiment shown, the motor 124 is electrically connected to the battery 108 and the switch 116, seen in FIG. 2, and its operation is controlled by the trigger 114. Generally, the motor 124 is adapted to operate at a nominal voltage corresponding to the voltage of the battery 108, e.g., between about 16 VDC and about 24 VDC. For example, if the battery 108 is adapted to output a voltage of about 18 VDC, then the motor 124 would be adapted to operate at a voltage of about 18 VDC. Under a no-load condition, such a motor 124 can operate at about 22,000 rpm with a current of about 0.2 amps. At maximum efficiency, the motor 124 can operate in a range of about 18,000 rpm to about 20,000 rpm with a current in a range of about 10 amps and about 12 amps, a torque of about 0.4 in-lb., and an output wattage in a range of about 95 W and about 135 W.

Turning now to FIGS. 9 and 10, an exemplary embodiment of the gear assembly 126 according to the present disclosure will be described. In this exemplary embodiment, the gear assembly 126 is a multi-stage gear assembly. Each stage in the gear assembly is a planetary gear assembly that includes a pinion gear, two or more planetary gears, a ring gear and a carrier plate. As an example, in the exemplary embodiment shown there are three planetary gear assemblies. A first planetary gear assembly 140 is a first stage (or an input stage), a second planetary gear assembly 142 is a second stage (or an intermediate stage) and a third planetary gear assembly 144 is a third stage (or an output stage). The first planetary gear assembly 140 includes a pinion gear 150, three planetary gears 152, a ring gear 154 and a carrier plate 156. The pinion gear 150 is attached to the drive shaft 138 of the motor 124. The planetary gears 152 are attached to shafts 158 extending from one side of the carrier plate 156 so that the planetary gears 152 are rotatable relative to their corresponding shaft 158. The shafts 158 are arranged on the carrier plate 156 so that the planetary gears 152 are spaced apart and independent of each other. The carrier plate 156 is positioned adjacent the ring gear 154 so that the teeth of the planetary gears 152 intermesh with the teeth of the ring gear 154. The pinion gear 150 is positioned within the ring gear 154 between the planetary gears 152 so that the teeth of the pinion gear 150 intermesh with the teeth of the planetary gears 152.

Continuing to refer to FIGS. 9 and 10, the second planetary gear assembly 142 includes a pinion gear 170, three planetary gears 172, a ring gear 174 and a carrier plate 176. The pinion gear 170 is attached to a shaft 178 extending from a side of the carrier plate 156 that is opposite the planetary gears 152. The planetary gears 172 are attached to shafts 180 extending from one side of the carrier plate 176 so that the planetary gears 172 are rotatable relative to their corresponding shaft 180. The shafts 180 are arranged on the carrier plate 176 so that the planetary gears 172 are spaced apart and independent of each other. The carrier plate 176 is positioned adjacent the ring gear 174 so that the teeth of the planetary gears 172 intermesh with the teeth of the ring gear 174. The pinion gear 170 is positioned within the ring gear 174 between the planetary gears 172 so that the teeth of the pinion gear 170 intermesh with the teeth of the planetary gears 172.

The third planetary gear assembly 144 includes a pinion gear 190, three planetary gears 192, a ring gear 194 and a carrier plate 196. The pinion gear 190 is attached to a shaft 198 extending from a side of the carrier plate 176 that is opposite the planetary gears 172. The planetary gears 192 are attached to shafts 200 extending from one side of the carrier plate 196 so that the planetary gears 192 are rotatable relative to their corresponding shaft 200. The shafts 200 are arranged on the carrier plate 196 so that the planetary gears 192 are spaced apart and independent of each other. The carrier plate 196 is positioned adjacent the ring gear 194 so that the teeth of the planetary gears 192 intermesh with the teeth of the ring gear 194. The pinion gear 190 is positioned within the ring gear 194 between the planetary gears 192 so that the teeth of the pinion gear 190 intermesh with the teeth of the planetary gears 192. As noted above, the proximal end portion 130*b* as seen in FIG. 11 of the lead drive shaft 130 has a spline or key 130*d*, seen in FIGS. 8 and 9, that interacts with the gear assembly 126. In the exemplary embodiment shown, the spline 130*d* is a hex shaped member that interacts with a hex shape keyway 201 in the carrier plate 196 of the third planetary gear assembly 144.

Figure 12:
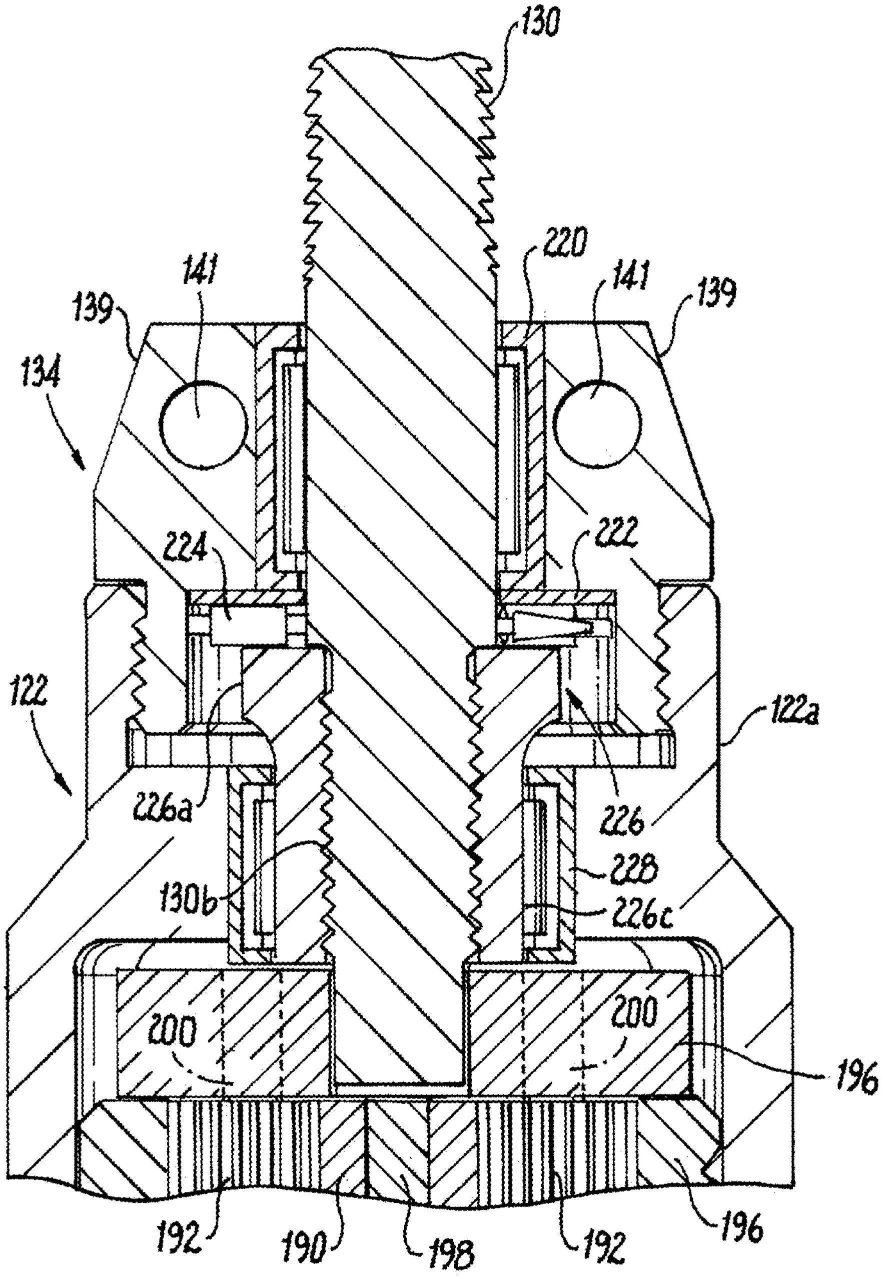
FIG. 12 is an enlarged cross-sectional view of the bearing system of FIG. 11 installed within the drive assembly housing.

Referring now to FIGS. 11 and 12, an exemplary embodiment of a bearing system 128 according to the present disclosure is shown. The bearing system 128 is provided so that the drive assembly 120 can withstand radial and axial (or thrust) loads as the lead drive shaft 130 is rotated during an operation of the tool 10. The bearing system 128 is positioned within the distal end portion 122*a* of the drive assembly housing 122 adjacent the gear assembly 126 and is held within the drive assembly housing 122 by the end cap 134. In the exemplary embodiment shown, the bearing system 128 includes an upper radial bearing 220, a thrust washer 222, a thrust bearing 224, a flange bushing 226 and a lower radial bearing 228. The flange bushing 226 has an upper portion 226*a* with wider diameter that provides a platform on which the thrust bearing 224 can sit. The flange bushing 226 has a center bore 226*b*, seen in FIG. 11, that is preferably threaded so that the flange bushing 226 can be threaded onto the proximal end portion 130*b* of the lead drive shaft 130, as shown in FIG. 12. The flange bushing 226 is used to secure the lead drive shaft 130 to the drive assembly housing 122. The lower radial bearing 228 is positioned around a smooth exterior wall 226*c* of the flange bushing 226 as shown. The lower radial bearing 228 is provided to withstand radial loads on the flange bushing 226 as it rotates during an operation of the tool 10. An example of a suitable lower radial bearing 228 is the Koyo Bearing No. BK1010 manufactured by JTEKT North America Corporation. The thrust bearing 224 is positioned around the intermediate portion 130*c* of the lead drive shaft 130 adjacent the flange bushing 226. The thrust bearing 224 is provided to withstand axial (or thrust) loads on the lead drive shaft 130, in the direction of arrow "A" seen in FIG. 9, as the lead drive shaft 130 rotates during an operation of the tool 10. An example of a suitable thrust bearing 226 is the Koyo Bearing No. NTA613 manufactured by JTEKT North America Corporation. The thrust washer 222 is positioned on the thrust bearing 224 and is provided to hold the thrust bearing 224 in position within the drive assembly housing 122. In addition, the thrust washer 222 also resists and transfers thrust loads to the end cap 134. The upper radial bearing 220 is positioned around the intermediate portion 130*c* of the lead drive shaft 130 adjacent the thrust washer 222 as shown. The upper radial bearing 220 is provided to withstand radial loads on the lead drive shaft 130 as it rotates during an operation of the tool 10.

Figure 37A:
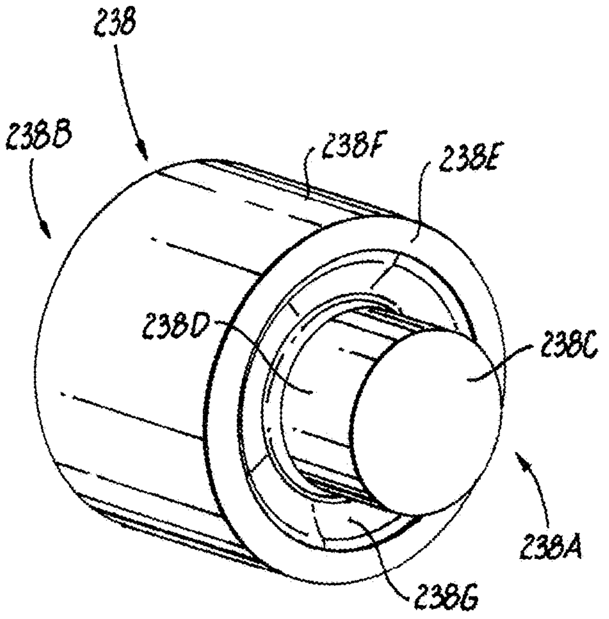
FIGS. 37A-37C are views of a cam roller according to an illustrative embodiment of the present disclosure.
Figure 37B:
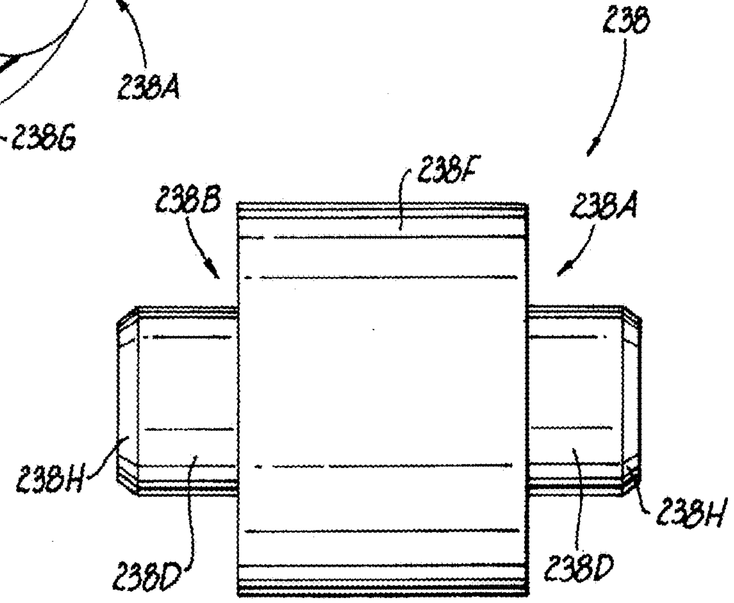
Figure 37C:
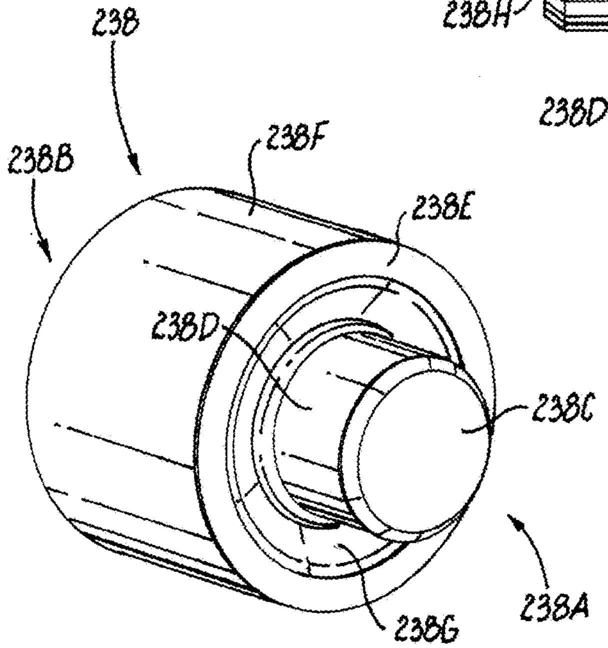

Referring to FIGS. 6 and 11, the jaw drive member 132 is movably coupled to the distal end portion 130*a* of the lead drive shaft 130. In the exemplary embodiment shown, the jaw drive member 132 includes a body 230 and a camming member 232. The body 230 includes a threaded center bore 234 that can be screwed onto the distal end portion 130*a* of the lead drive shaft 130. The camming member 232 has a cam surface 236 configured to engage a cam roller 238, seen in FIG. 4, between the first jaw plate 42 and the second jaw plate 44 seen in FIG. 3 of the second jaw assembly. When the motor 124 is activated by the control assembly 112, rotational movement of the lead drive shaft 130 is translated to linear motion of the jaw drive member 132 in the direction of the end cap 134 causing the cam surface 236 to contact the cam roller 238. As the cam roller 238 traverses the cam surface 236 the second jaw assembly 40 is pivoted clockwise toward the first jaw assembly 20. As shown in FIGS. 37A-37C, cam roller 238 includes a main roller 238F and has an axle extension 238C extending from each side 238A, 238B. Axle extensions 238C may be formed integral with the main roller 238F or may be welded, glued or otherwise attached to main roller 238F. Axle extensions 238C include axle surfaces 238D which rotatingly rest in correspondingly positioned and dimensioned orifices provided in the first jaw plate 42 and the second jaw plate 44 allowing cam roller 238 to freely rotate as the surface of main roller 238F engages cam surface 236 of jaw drive member 132. Outer side surfaces 238E of cam roller 238 may loosely abut the inside surfaces of the first jaw plate 42 and the second jaw plate 44 around these correspondingly positioned and dimensioned orifices provided in the first jaw plate 42 and the second jaw plate 44. According to an embodiment of the present disclosure, the outer edges 238H of the axle surfaces 238D may be chamfered. Generally, the axle surfaces 238D are provided with some type of lubricant (e.g., grease, oil, etc.) to extend the life of the device by ensuring the cam rollers 238 remain free to rotate over the life span of the tool. According to an illustrative embodiment of the present disclosure, to provide an even longer useful life span of the tool 10, grooves 238G are provided in the outer side surfaces 238E of cam roller 238 which allow a lubricant such as grease to be packed into the grooves 238G prior to assembly of the tool 10. Grooves 238G generally have a complete radius greater than 0.30 inches and have an edge tangent to the axle surfaces 238D. The lubricant provided in grooves 238G is naturally released onto the axle surfaces 238D over time by rotation of the cam roller 238 thus ensuring axle surfaces 238D receive adequate lubrication over an extended period of time.

Figure 15:
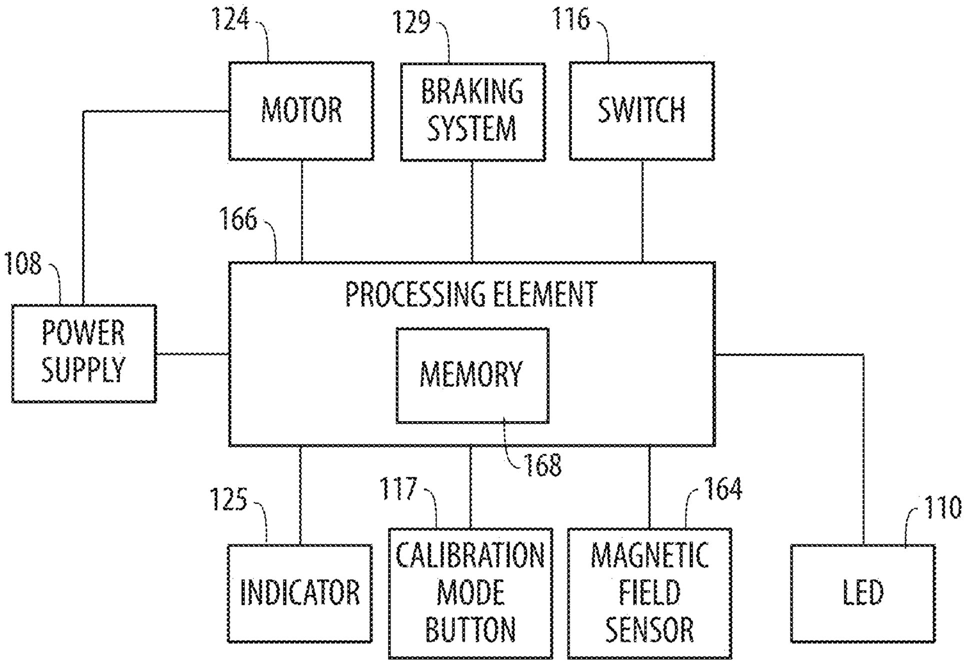
FIG. 15 is a schematic block diagram illustrating an exemplary embodiment of the magnetic displacement monitoring system integrated with a drive assembly of a tool.

In an exemplary embodiment as depicted in FIG. 15, the drive assembly 120 may also include a known braking system 129. The braking system may be an electric braking system, a mechanical braking system, or a combination thereof. Non-limiting examples of an electric braking system include electromagnetic brakes, permanent magnet brakes, and eddy current brakes. Non-limiting examples of a mechanical braking system include drum brakes, cone brakes, disc brakes and band brakes. In an embodiment of the present disclosure, the braking system uses an eddy current brake including a non-ferromagnetic metallic rotor and an Eddy brake caliper. The Eddy brake caliper has an electromagnet positioned in the caliper. The non-ferromagnetic metallic rotor is constructed and arranged to rotate with a portion of the drive assembly 120 when the drive assembly is actuated, for example the motor 124 and/or lead drive shaft 130, such that a portion of the electromagnet is positioned on each side of the rotor, so that the magnetic field passes through the rotor. Power supplied to the electromagnet regulates the braking force, e.g., more electrical power provides more drag on the motor 124. The actuation of the braking system 129 will be discussed in more detail below.

Figure 6A:
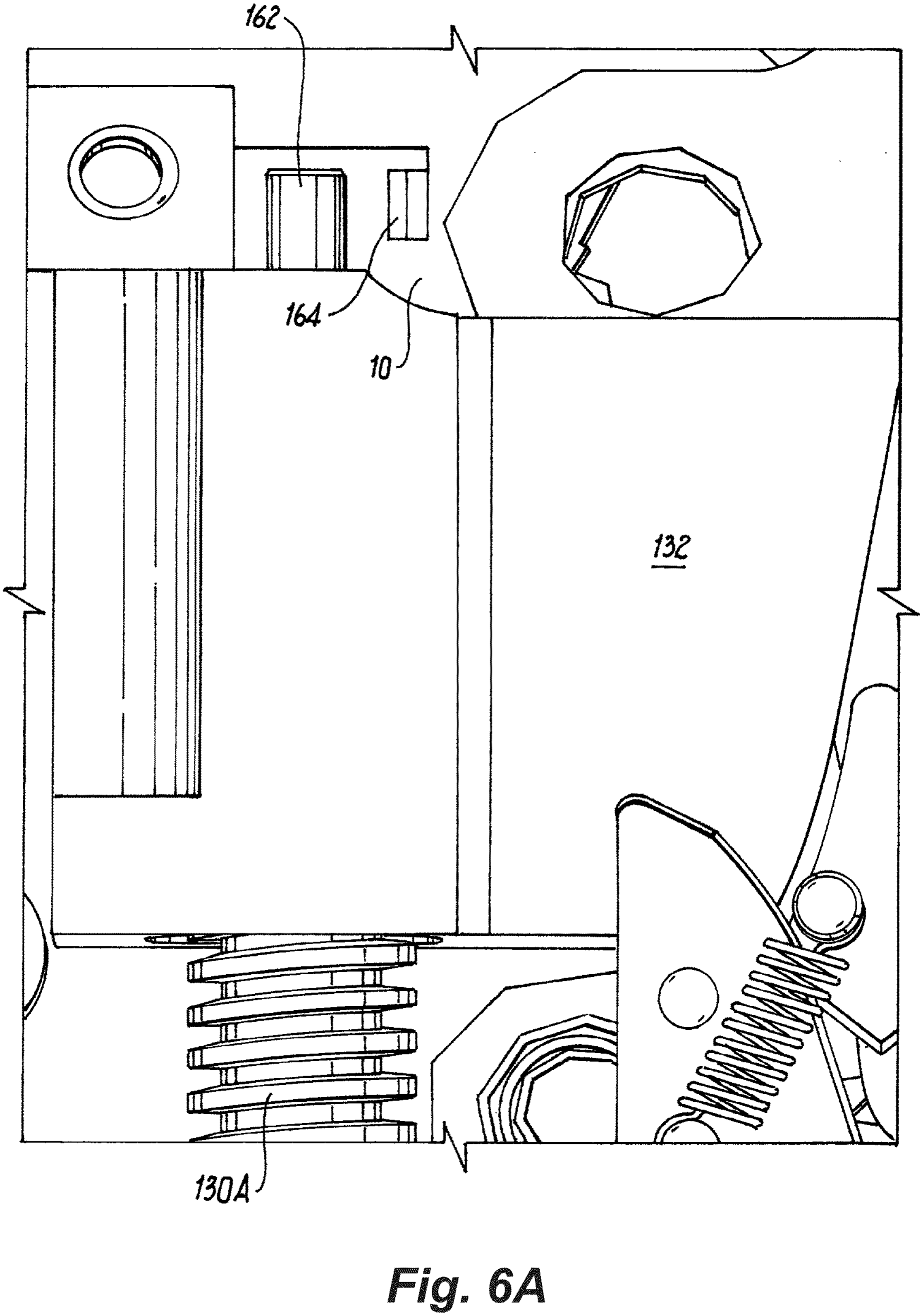
FIG. 6A is a partial cross-sectional view of the tool of FIG. 3 taken from line 6A-6A.
Figure 13A:
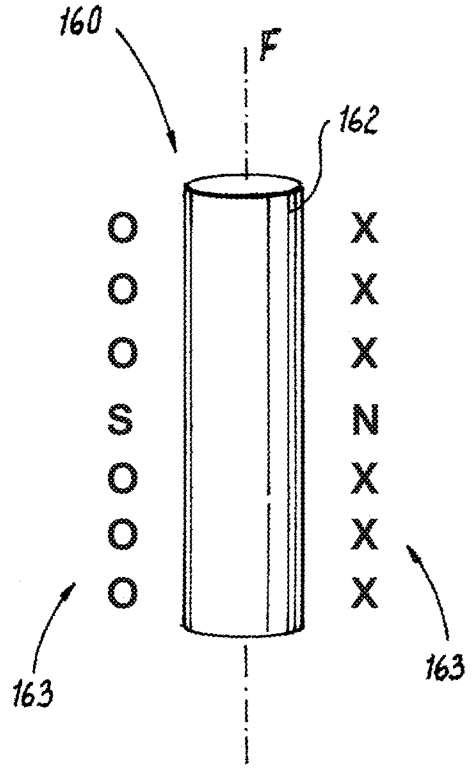
FIG. 13A is a perspective view for explaining an exemplary embodiment of the magnetic displacement monitoring system.
Figure 13B:
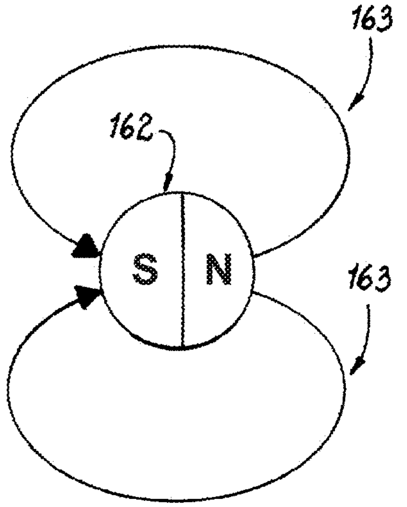
FIG. 13B is a perspective view of the magnetic field produced by a magnet of the magnetic displacement monitoring system of FIG. 13A.
Figure 14:
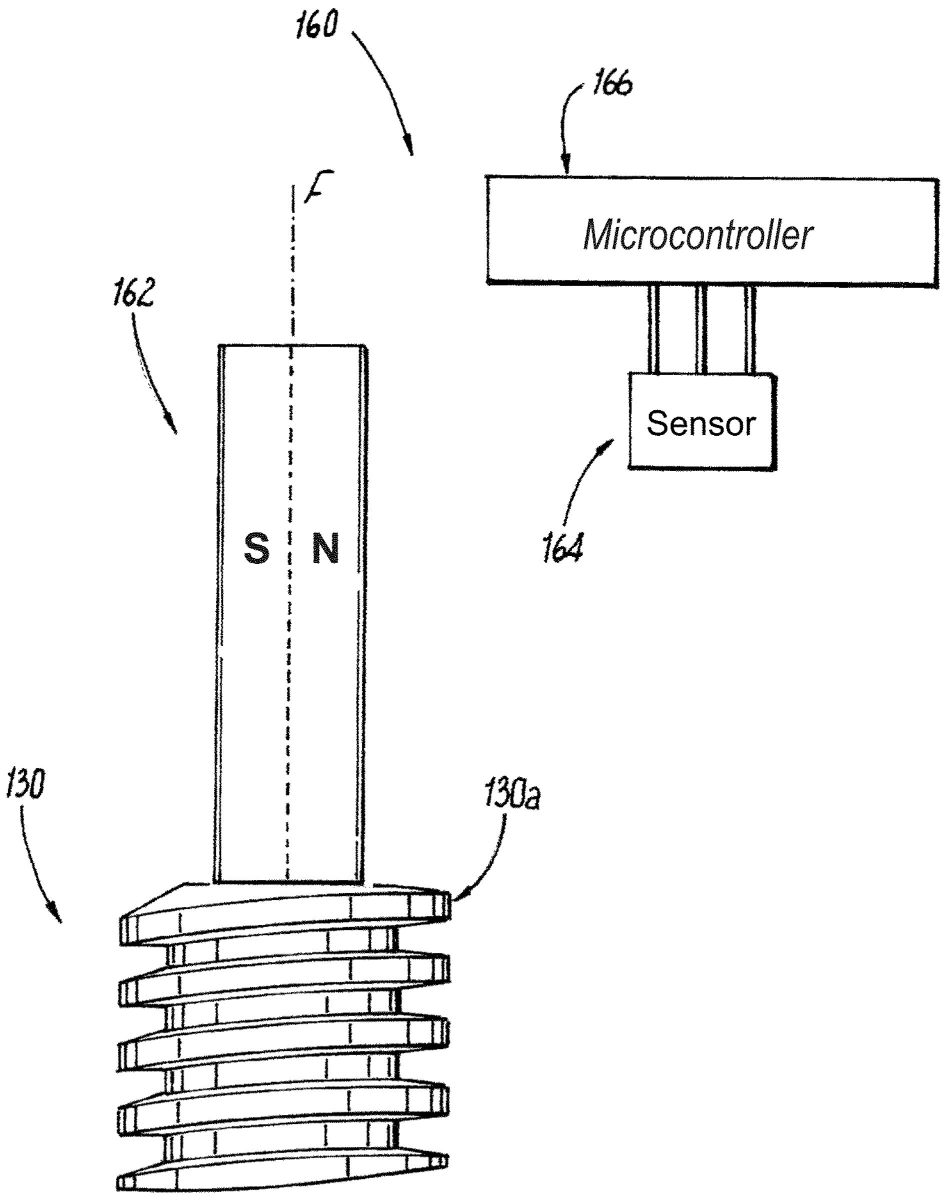
FIG. 14 is a perspective view of an exemplary embodiment of the magnetic displacement monitoring system of FIG. 6.
Figure 42A:
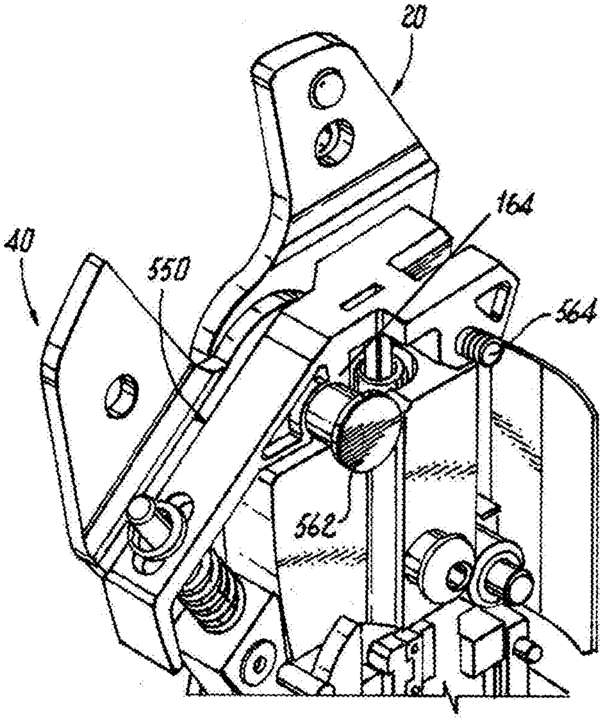
FIGS. 42A-42C are views for describing a cover plate according to an illustrative embodiment of the present disclosure.
Figure 42B:
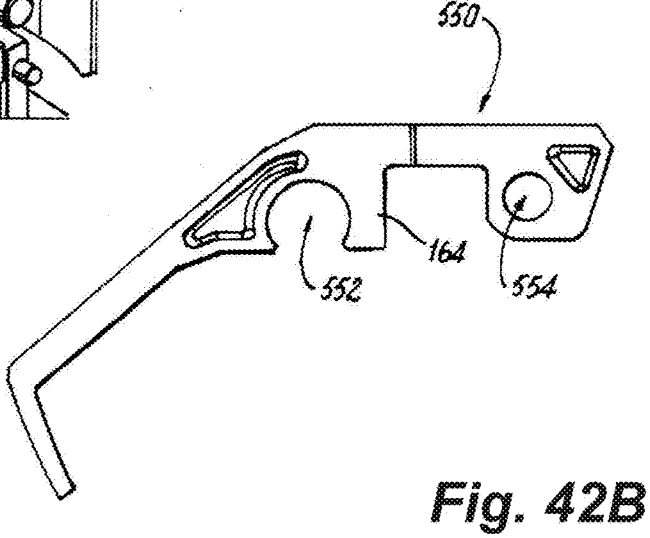
Figure 42C:
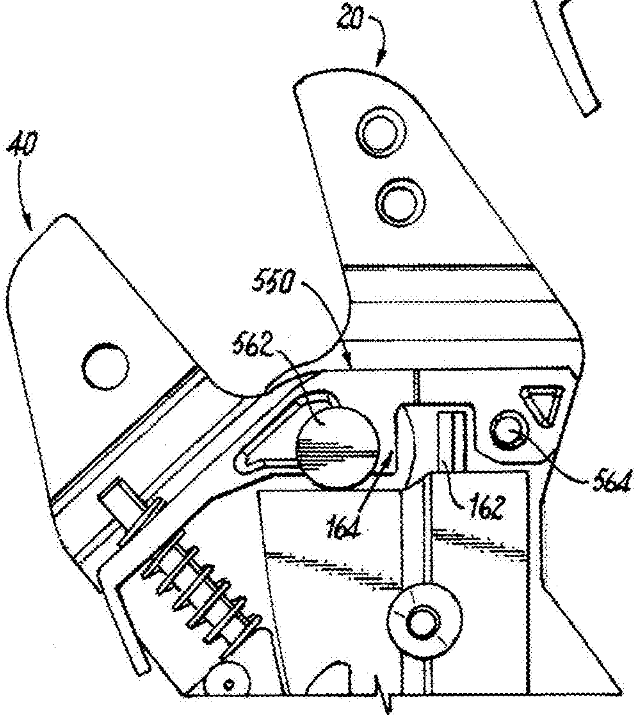

Turning now to FIGS. 13A-15, an exemplary embodiment of the MDMS 160 according to the present disclosure will be described. In this exemplary embodiment, the MDMS 160 may include a magnetic field sensor 164 operatively associated with a magnet (e.g., magnet 162), and a processing element or elements 166. According to an illustrative embodiment of the present disclosure, the magnet is cylindrical and is diametrically magnetized. As illustrated in FIGS. 13A, 13B, the magnetic field lines 163 of a diametrically magnetized cylindrical magnet 162 extend between the poles about its longitudinal axis F as shown. Magnetic field sensor 164 is placed in close proximity to magnet 162 and senses the presence and magnitude of the magnetic field created by these magnetic field lines. As shown in FIGS. 6, 6A magnet 162 may be inserted (e.g., press fit) into a bore provided in the distal end 130*a* of lead drive shaft 130 or otherwise attached to the lead drive shaft 130. Of course, while present embodiments depict the magnet(s) being associated with the distal end of the lead drive shaft 130, the magnet(s) may be provided along any one or more portions of the lead drive shaft 130. The magnetic field sensor 164 may be mounted to a portion of the frame or housing of tool 10 in close proximity to magnet 162. According to an illustrative embodiment of the present disclosure as depicted in FIGS. 42A-42C, the magnetic field sensor 164 may be embedded in or otherwise secured to a cover plate 550. Cover plate 550 includes openings 552 and 554. Opening 552 receives a pin or bolt 562 which is similar to bolt 72 as shown in FIG. 2 described with respect to earlier embodiments. Opening 554 receives a set screw 564 ensuring cover plate 550 is secured in position. Cover plate 550 substantially covers the gap between the jaw plates 22 and 24 forming the first jaw assembly 20 and the gap between the jaw plates 42 and 44 forming the second jaw assembly 40. Cover plate 550 prevents or limits debris from entering the tool through these gaps. Furthermore, since the magnetic field sensor 164 is embedded in or otherwise secured to the cover plate 550, the sensor 164 as seen in FIG. 14 can be easily and properly positioned within the tool 10 with respect to the magnet 162. In this way, the rotation of the lead drive shaft 130 is translated to rotational movement of the magnet 162 causing the alternating N and S poles of the magnet 162 to pass by and be detected by the magnetic field sensor 164. This information is provided to processing element 166. By detecting the alternating N and S poles, magnetic field sensor 164 and processing element 166 as shown in FIG. 15 are able to keep track of the number of rotations of the lead drive shaft 130 and thus accurately keep track of the displacement of the jaw drive member 132. It will be appreciated from FIG. 13B, the diametrically polarized magnet 162 reaches peak flux density each ½ rotation and null zones each ½ rotation. Accordingly, this can be used to accurately determine each rotation of lead drive shaft 130 providing precise information relating to the location and speed of jaw drive member 132 as shown in FIG. 6.

Other types of magnets and configurations may be utilized to achieve similar results. For example, one or more small magnets 165 may be inserted in holes or grooves provided about the diameter of the distal end portion 372 of lead drive shaft 370, seen in FIGS. 19 and 20. The magnet(s) 165 may be a cylindrical magnet, a ring magnet, or a radial magnet and may be diametrically or axially magnetized. The magnet(s) 165 may also be a dipole magnet or a quadrupole magnet. It will be appreciated that any type or number of magnets and magnetic field sensors may be used to achieve similar or even greater accuracy than that achieved by the present embodiment. In another exemplary embodiment shown in FIG. 18, the at least one magnet 167 may be a radial ring magnet circumferentially coupled to the distal end portion 240*a* of the lead drive shaft 240 by press fit, snap fit and/or adhesive on the distal end portion 240*a* of the lead drive shaft 240.

As described herein, one or more magnetic field sensors 164 may be used for sensing the magnetic fields generated by the alternating N and S poles of at least one magnet and generating a corresponding output signal that is indicative of rotation of the lead drive shaft 130 or 240 about an axis. In an exemplary embodiment, the magnetic field sensor 164 may be a Hall effect sensor. Hall effect sensors may be of the analog or digital variety. Hall effect sensors that do or do not have built-in amplifiers may be used. The Hall effect sensor is oriented relative to the magnet 162 such that when the alternating N and S poles of the magnet 162 rotate past the magnetic field sensor 164, the magnetic flux detected by the Hall effect sensor changes polarity. This change in polarity of the magnetic flux causes the magnetic field sensor 164 to change the signal it sends to the processing element 166 as seen in FIG. 15, indicating a full or partial rotation of the lead drive shaft 130. The data received by the processing element 166 from the magnetic field sensor 164 concerning magnetic flux may include magnitude and/or polarity of the magnetic flux. The Hall effect sensor may be, for example, a bipolar Hall effect sensor of type SS411P.

According to an illustrative embodiment, the processing element 166 includes a memory 168, as seen in FIG. 15. It is also envisioned that the memory 168 may be distinct from the processing element 166. The processing element 166 and any associated circuitry may be housed within the handle assembly 14 as seen in FIG. 1. The processing element 166 communicates with other elements of the MDMS 160 and drive assembly 120 as will be described in more detail below. As will be understood, the processing element 166 may be embodied as one or more complex programmable logic devices (CPLDs), microprocessors, multi-core processors, coprocessing entities, application-specific instruction-set processors (ASIPs), microcontrollers, and/or controllers. Further, the processing element 166 may be embodied as a combination of one or more of these processing devices or circuitry. The terms devices and circuitry may refer to an entirely hardware embodiment or a combination of hardware and computer program products. Thus, the processing element 166 may be embodied as integrated circuits, application specific integrated circuits (ASICs), field programmable gate arrays (FPGAs), programmable logic arrays (PLAs), hardware accelerators, other circuitry, and/or the like.

The memory 168 includes, for example, a program storage area and a data storage area. The program storage area and the data storage area can include combinations of different types of memory, such as read-only memory ("ROM"), random access memory ("RAM") (e.g., dynamic RAM ["DRAM" ], synchronous DRAM ["SDRAM" ], etc.), electrically erasable programmable read-only memory ("EEPROM"), flash memory, a hard disk, an SD card, or other suitable magnetic, optical, physical, or electronic memory devices. The processing element 166 is connected to the memory 168 as shown in FIG. 15 and executes software instructions. Software included in the implementation of the magnetic field sensor 164 and/or the processing element 166 can be stored in the memory 168. The software includes, for example, firmware, one or more applications, program data, filters, rules, one or more program modules, and other executable instructions. The processing element 166 is configured to retrieve from memory 168 and execute, among other things, instructions related to the control processes and methods described herein. In other constructions, the processing element 166 includes additional, fewer, or different components.

As previously described, upon actuation of the tool 10 when making a crimp, the lead drive shaft 130 rotates about the axis to move the second jaw assembly 40 toward the first jaw assembly 20. As the lead drive shaft 130 is rotated relative to the magnetic field sensor 164, the magnet 162 rotates with the lead drive shaft 130. This rotation of the magnet 162 is detectable by the magnetic field sensor 164 which produces a different voltage output for each rotated orientation of the lead drive shaft 130. The magnetic field sensor 164 is in communication with the processing element 166 and is configured to detect the rotation of the lead drive shaft 130. The threads of the distal end portion 130*a* may utilize a threads-per-inch (TPI) range of 12 to 16 TPI. Preferably, a 16 TPI thread profile is used in order to reduce current draw and increase jaw drive member 132 displacement resolution. Capable of knowing the rotation orientation of the lead drive shaft 130 and with a known thread profile, the processing element 166 may be configured to constantly determine the location of the jaw drive member 132 along the lead drive shaft 130 by counting each pole change which may be converted to a displacement of the jaw drive member 132 along the lead drive shaft 130. For example, a lead drive shaft 130 having 16 TPI will move 0.0625 inch per rotation of the lead drive shaft 130. In an exemplary embodiment utilizing a dipole magnet, the location of the jaw drive member 132 may be known to a precision of 0.03125 inches. In another exemplary embodiment utilizing a quadrupole magnet, the location of the jaw drive member 132 may be known to a precision of 0.01565 inches. It is envisioned that other styles and/or number of magnets may be used to determine the location of the jaw drive member 132 in larger or smaller increments of precision. It is further envisioned that the pitch of the lead drive shaft 130 may be higher or lower to obtain the desired amount of travel per rotation of the jaw drive member 132. It will be readily appreciated after a thorough review of present disclosure, the amount of linear motion of the jaw drive member 132 per rotation of the lead drive shaft 130 may be readily optimized or understood with a selection of the desired pitch of the threading of the lead drive shaft 130.

The processing element 166 as shown in FIG. 15 may be further configured to adjust and/or limit the rate of speed of the motor 124 based on the location of the jaw drive member 132 on the lead drive shaft 130 during a cycle of operation of the tool 10. In an exemplary embodiment, the processing element 166 may actuate the braking system 129 to reduce the speed of the motor 124 once the jaw drive member 132 reaches an upper or lower position limit along the lead drive shaft 130 in order to allow the momentum of the motor 124 and drive assembly 120 to slow down to prevent overtravel of the jaw drive member 132. The rate at which the speed of the motor 124 is reduced may be controlled, for example, by the amount of power supplied to the electromagnet of an Eddy brake caliper. For example, an increase in power to the electromagnet will cause a higher rate of speed reduction experienced by the motor 124. Likewise, a lower amount of power supplied to the electromagnet will cause a lower rate of speed reduction experienced by the motor 124. It is envisioned that the braking system 129 may also be actuated by the release of trigger 114 as shown in FIG. 1.

Figure 16:
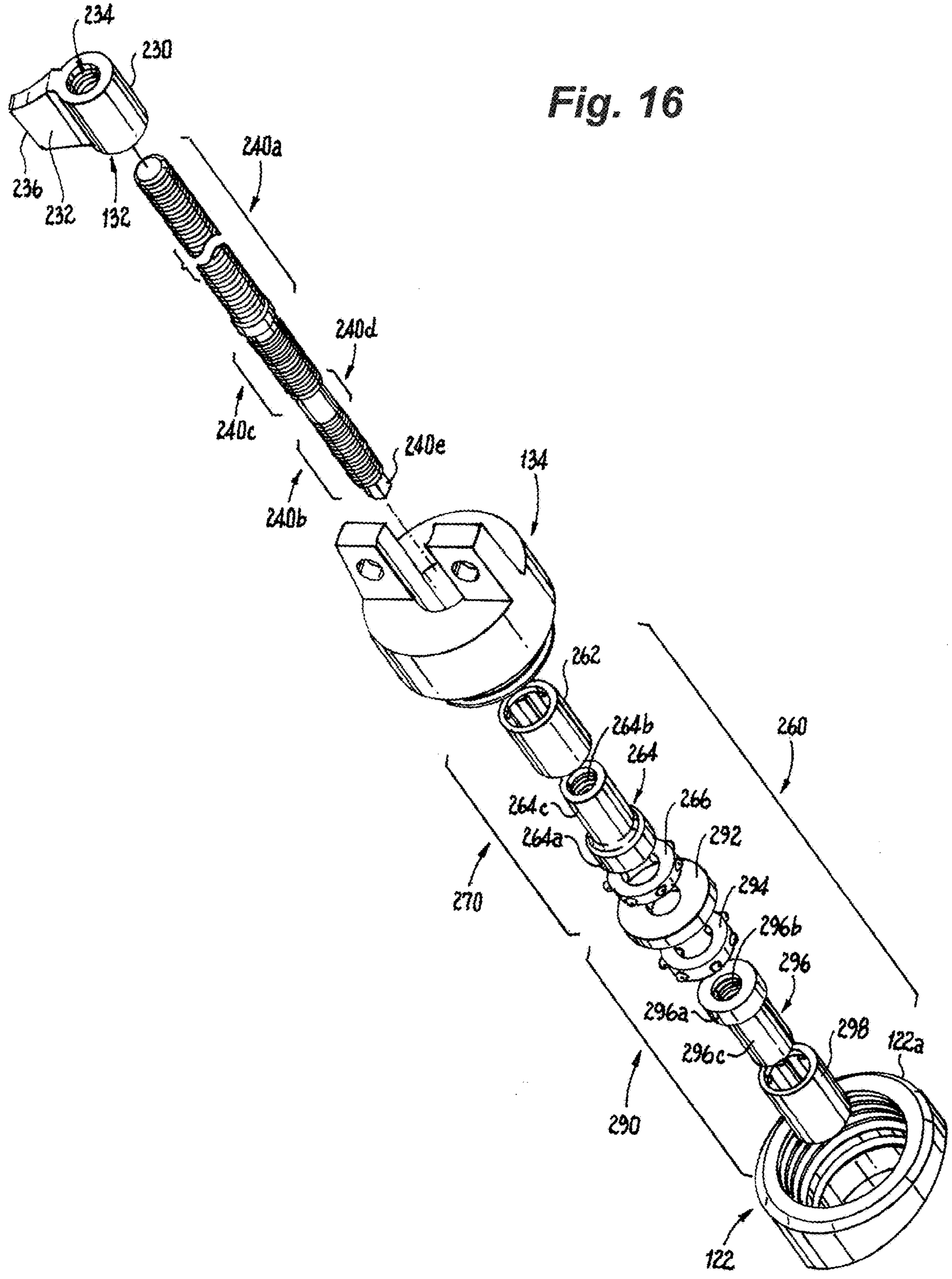
FIG. 16 is an exploded perspective view of another exemplary embodiment of a bearing assembly according to the present disclosure.
Figure 17:
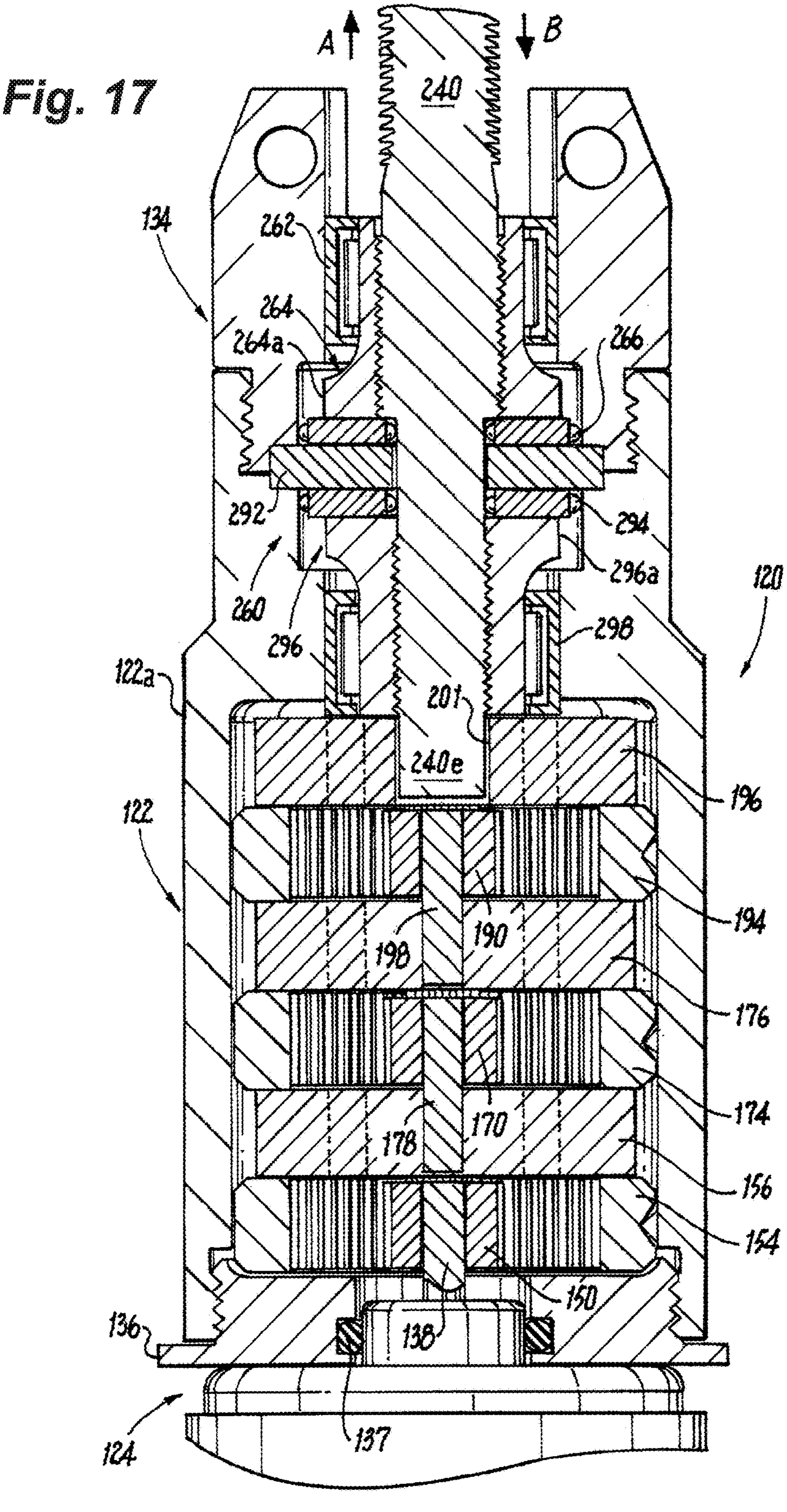
FIG. 17 is a cross-sectional view of a portion of the drive assembly housing similar to FIG. 9, illustrating the bearing system of FIG. 16 within the drive assembly housing.
Figure 18:
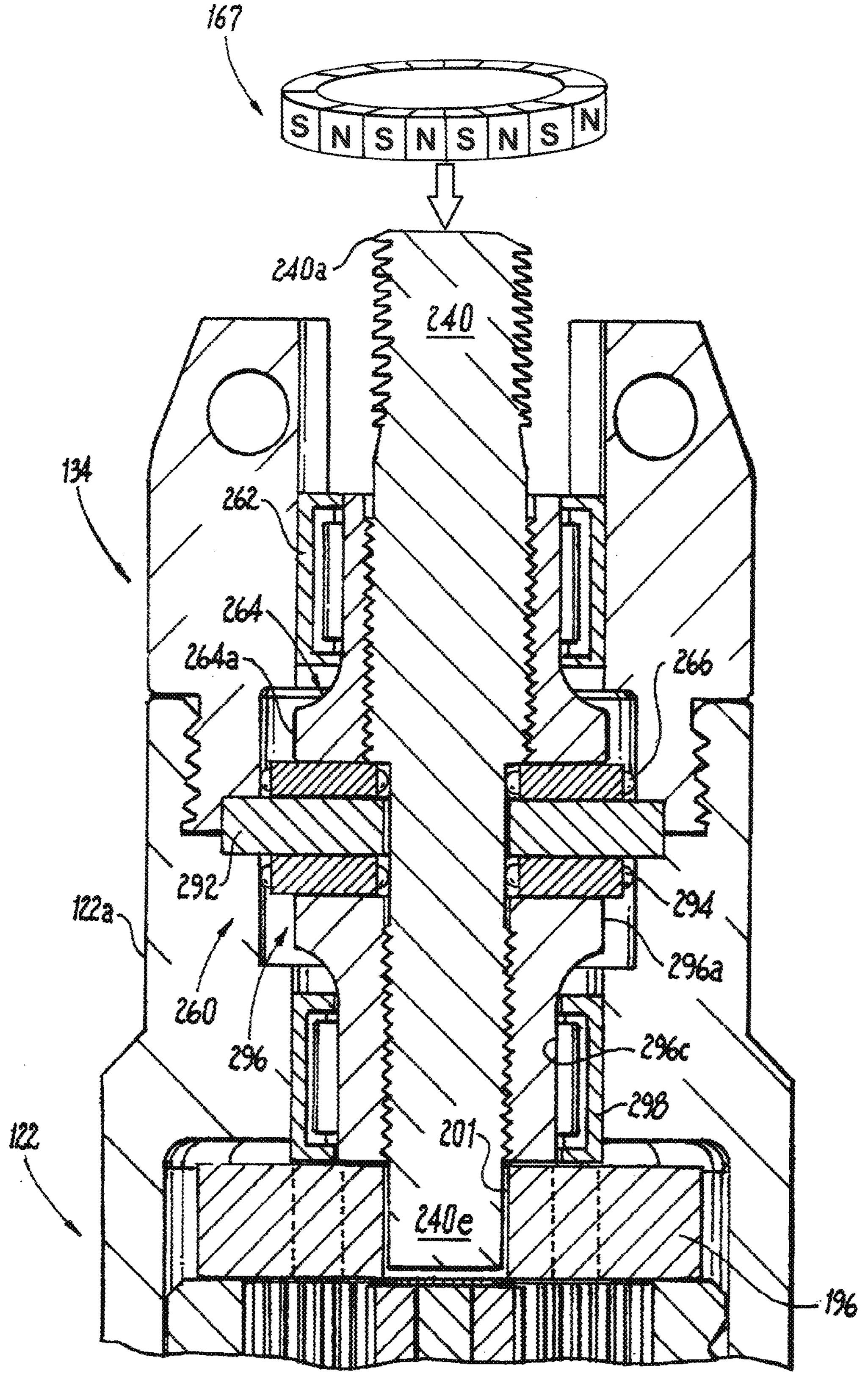
FIG. 18 is an enlarged cross-sectional view of the bearing system within the drive assembly housing of FIG. 17.

Referring now to FIGS. 16-18, another exemplary embodiment of a lead drive shaft 240 and a bearing system 260 according to the present disclosure is shown. In this exemplary embodiment, the lead drive shaft 240 includes a distal end portion 240*a*, a proximal end portion 240*b*, a first intermediate portion 240*c* and a second intermediate portion 240*d*. The first and second intermediate portions 240*c* and 240*d* are between the distal end portion 240*a* and the proximal end portion 240*b* of the lead drive shaft 240. In this exemplary embodiment, the distal end portion 240*a* is threaded with, for example, acme threads typically used for bi-directional loading on the lead drive shaft 240. The first intermediate portion 240*c* of the lead drive shaft 240 is adjacent the distal end portion 240*a* and has an outer diameter that is less than the outer diameter of the distal end portion 240*a*. The first intermediate portion 240*c* is threaded with, for example, conventional machine screw threads. The second intermediate portion 240*d* of the lead drive shaft 240 is adjacent the first intermediate portion 240*c* and has an outer diameter that is less than the outer diameter of the first intermediate portion 240*c*. The second intermediate portion 240*d* has a smooth exterior surface. The proximal end portion 240*b* of the lead drive shaft 240 is adjacent the second intermediate portion 240*d* and has an outer diameter that substantially the same as the outer diameter of the second intermediate portion 240*d*. The proximal end portion 240*b* is threaded with, for example, conventional machine screw threads. At the tip of the proximal end portion 240*b* of the lead drive shaft 240 is a spline or key 240*e*, seen in FIGS. 16 and 18, that interacts with the gear assembly 126 as described in FIGS. 7-10. In the exemplary embodiment shown, the spline 240e is a hex shaped member that interacts with a hex shape keyway 201, seen in FIG. 8, in the gear assembly 126.

Continuing to refer to FIGS. 16-18, the bearing system 260 is provided so that the drive assembly 120 can withstand radial and axial (or thrust) loads as the lead drive shaft 240 is rotated during an operation of the tool 10. The bearing system 260 is positioned within a portion of the end cap 134 and the distal end portion 122*a* of the drive assembly housing 122 adjacent the gear assembly 126 as seen in FIG. 7. In the exemplary embodiment shown, the bearing system 260 includes an upper bearing assembly 270 and a lower bearing assembly 290.

The upper bearing assembly 270 includes an upper radial bearing 262, a flange bushing 264 and a thrust bearing 266. The flange bushing 264 has a lower portion 264*a* with wider diameter that provides a platform to contact the thrust bearing 266. The flange bushing 264 has a center bore 264*b*, seen in FIG. 16, that is preferably threaded so that the flange bushing 264 can be threaded onto the first intermediate portion 240*c* of the lead drive shaft 240, as shown in FIG. 17. The flange bushing 264 is used to secure the lead drive shaft 240 to the drive assembly housing 122 and to hold the thrust bearing 266 in a fixed position relative to the lead drive shaft 240. The upper radial bearing 262 is positioned around a smooth exterior wall 264*c* of the flange bushing 264 as shown in FIG. 16. The upper radial bearing 262 is provided to withstand radial loads on the flange bushing 264 as the flange bushing rotates during an operation of the tool 10. An example of a suitable upper radial bearing 262 is the Koyo Bearing No. BK1010 manufactured by JTEKT North America Corporation. The upper thrust bearing 266 is positioned around the second intermediate portion 240*d* of the lead drive shaft 240 adjacent the lower portion 264*a* of the flange bushing 264. The upper thrust bearing 266 is provided to withstand axial (or thrust) loads in the direction of arrow "B" on the lead drive shaft 240 as it rotates during an operation of the tool 10. An example of a suitable thrust bearing 226 is the Koyo Bearing No. NTA613 manufactured by JTEKT North America Corporation.

The lower bearing assembly 290 includes a thrust washer 292, a lower thrust bearing 294, a lower flange bushing 296 and a lower radial bearing 298. The thrust washer 292 is positioned around the second intermediate portion 240*d* of the lead drive shaft 240 between the upper thrust bearing 266 and the lower thrust bearing 294. As shown in FIG. 18, the thrust washer 292 is captured between the drive assembly housing 122 and the end cap 134. This permits the thrust washer to resist and transfer thrust loads to either the drive assembly housing 122 or the end cap 134 depending on the direction of the load. The thrust washer 292 is also provided to help secure the lower thrust bearing 294 in position within the drive assembly housing 122. The thrust bearing 294 is positioned around the second intermediate portion 240*d* of the lead drive shaft 240 between the thrust washer 292 and the flange bushing 296. The thrust bearing 294 is provided to withstand axial (or thrust) loads on the lead drive shaft 240 in the direction of arrow "A" as seen in FIG. 17 as lead drive shaft 240 rotates during an operation of the tool 10. An example of a suitable lower thrust bearing 294 is the Koyo Bearing No. NTA613 manufactured by JTEKT North America Corporation. The lower flange bushing 296 has an upper portion 296*a* with wider diameter that provides a platform on which the lower thrust bearing 294 can sit. The lower flange bushing 296 has a center bore 296*b*, seen in FIG. 16, that is preferably threaded so that the lower flange bushing 296 can be threaded onto the proximal end portion 240*b* of the lead drive shaft 240, as shown in FIG. 17. The lower flange bushing 296 is also used to secure the lead drive shaft 240 to the drive assembly housing 122. The lower radial bearing 298 is positioned around a smooth exterior wall 296*c* of the lower flange bushing 296 as shown. The lower radial bearing 298 is provided to withstand radial loads on the lower flange bushing 296 as it rotates during an operation of the tool 10. An example of a suitable lower radial bearing 298 is the Koyo Bearing No. BK1010 manufactured by JTEKT North America Corporation.

Figure 21:
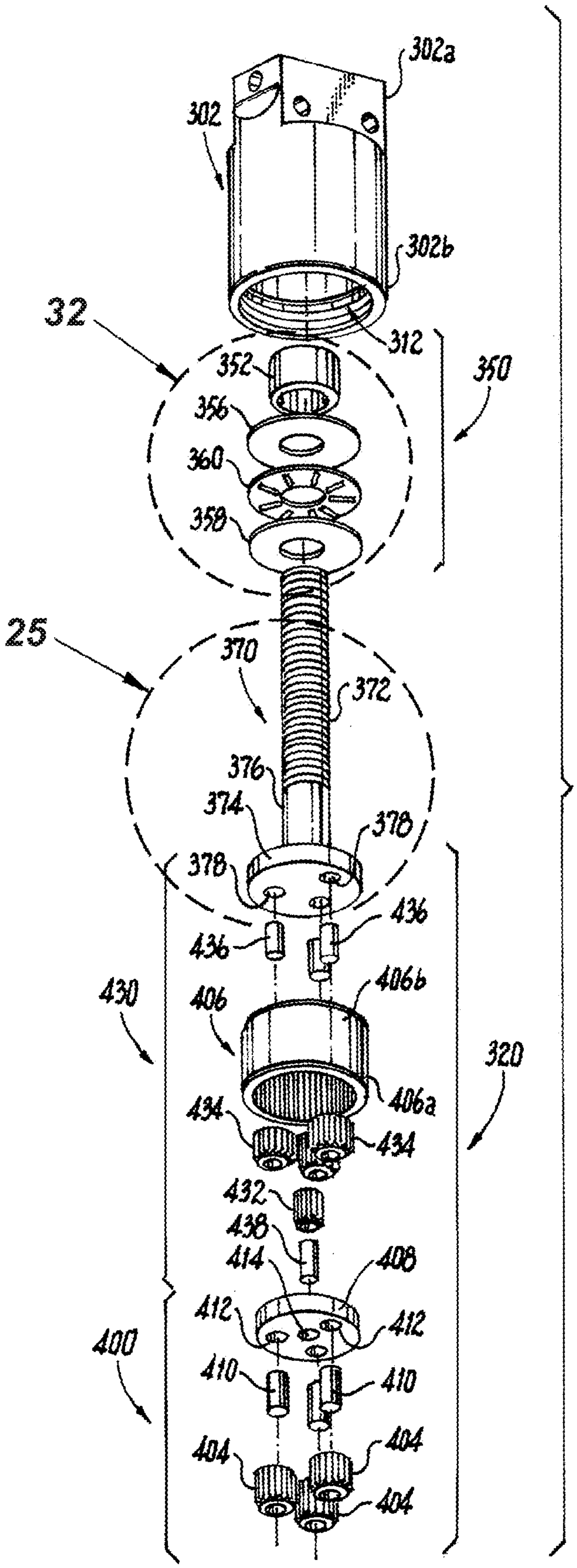
FIG. 21 is an exploded bottom perspective view of a portion of the drive assembly of FIG. 19, illustrating another exemplary embodiment of a gear assembly and bearing system of the drive assembly.
Figure 22:
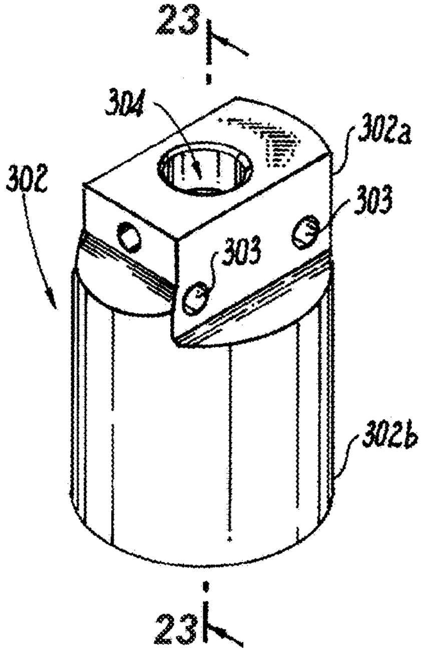
FIG. 22 is a perspective view of the drive assembly housing of FIG. 19.
Figure 23:
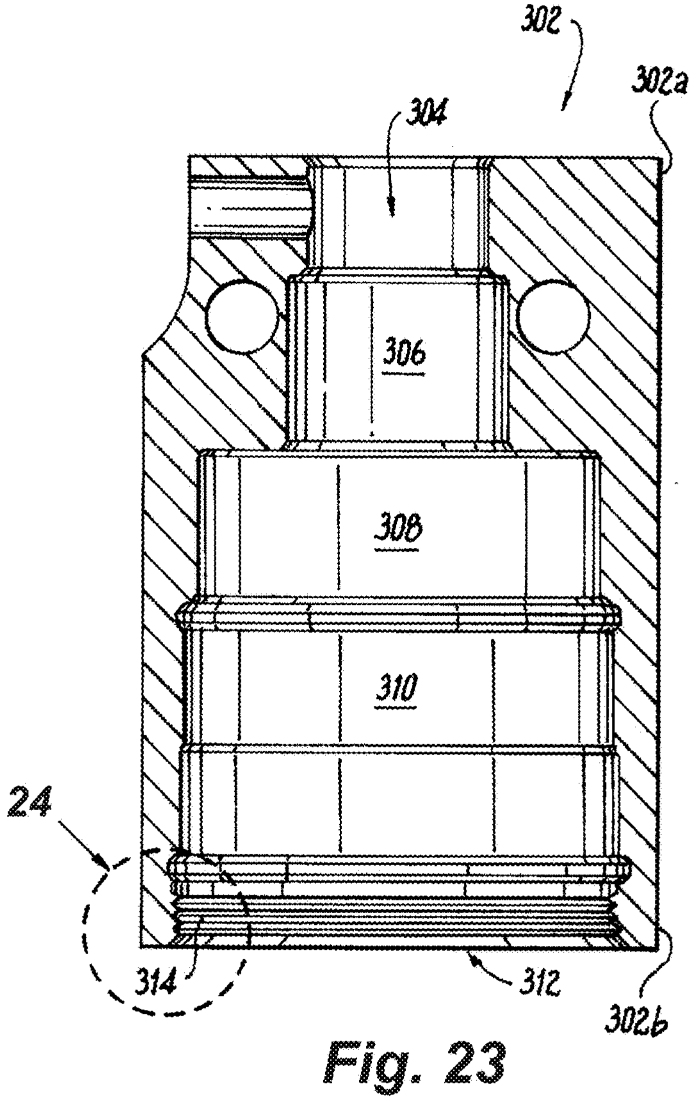
FIG. 23 is an enlarged cross-sectional view of the drive assembly housing of FIG. 22 taken from line 23-23 of FIG. 22.
Figure 24:
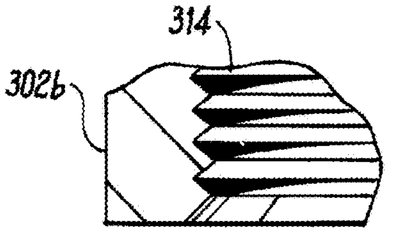
FIG. 24 is an enlarged view of a portion of the drive assembly housing of FIG. 23 taken from detail 24 of FIG. 23.

Turning now to FIGS. 19-34, another exemplary embodiment of the drive assembly (or system) 300 according to the present disclosure is shown. As shown in FIGS. 19-21, the drive assembly 300 includes a drive assembly housing 302, a gear assembly 320, a bearing system 350, a lead drive shaft 370, a motor 380, a MDMS (not shown) that is similar to the MDMS shown in FIGS. 13A, 13B, and 14 and described above, and a jaw drive member that is similar to the jaw drive member 132 shown in FIG. 6 and described above. The drive assembly housing 302 holds or encases the gear assembly 320, the bearing system 350 and at least a portion of the lead drive shaft 370. More specifically, as shown in FIGS. 22-26, the drive assembly housing 302 includes a shaft opening 304, a radial bearing compartment 306, a thrust bearing compartment 308, a gear compartment 310 ending with an opening 312 at a proximal end portion 302*b* of the drive assembly housing 302. It is noted that the wall of the gear compartment 310 may be a flat wall or a stepped wall that aids in securing a ring gear of the gear assembly within the gear compartment 310. Within drive assembly housing 302, the lead drive shaft 370 is operatively coupled to the gear assembly 320, seen in FIG. 21. Preferably, a distal end portion 372 of the lead drive shaft 370 extends from a distal end portion 302*a* of the drive assembly housing 302, seen in FIGS. 19 and 20. The distal end portion 302*a* of the drive assembly housing 302 also includes a pair of mounting apertures 303. The mounting apertures 303 are positioned to align with corresponding mounting apertures 84 and 86 in the first and second jaw plates 22 and 24 of the first jaw assembly 20, seen in FIG. 2. The first and second jaw plates 22 and 24 can then be secured to the distal end portion 302*a* of the drive assembly housing 302 using, for example bolts, similar to the bolts 143 shown in FIG. 5.

Figure 27:
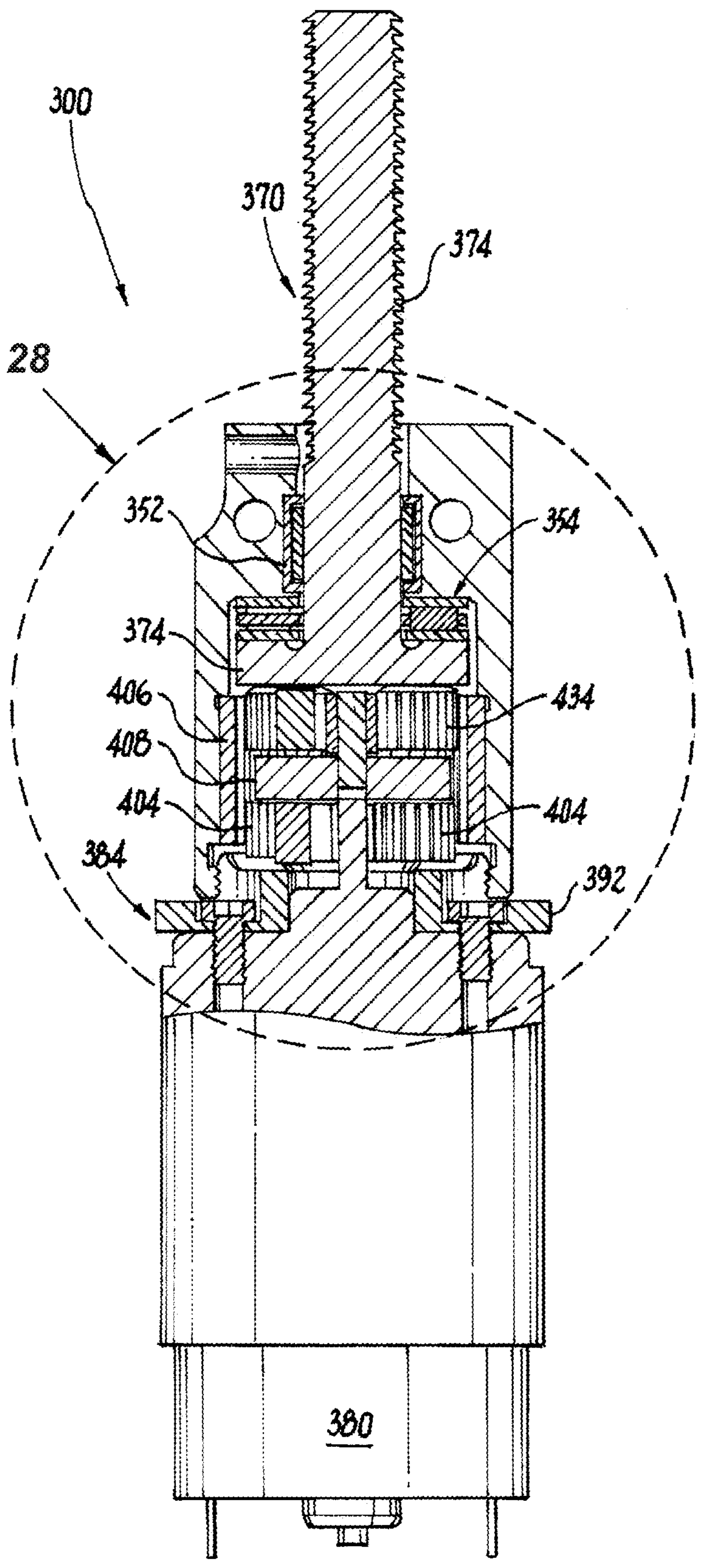
FIG. 27 is a side elevation view in partial cross-section of the drive assembly taken from line 27-27 of FIG. 19, illustrating the lead drive shaft, bearing system and gear system of the drive assembly installed within the drive assembly housing.
Figure 28:
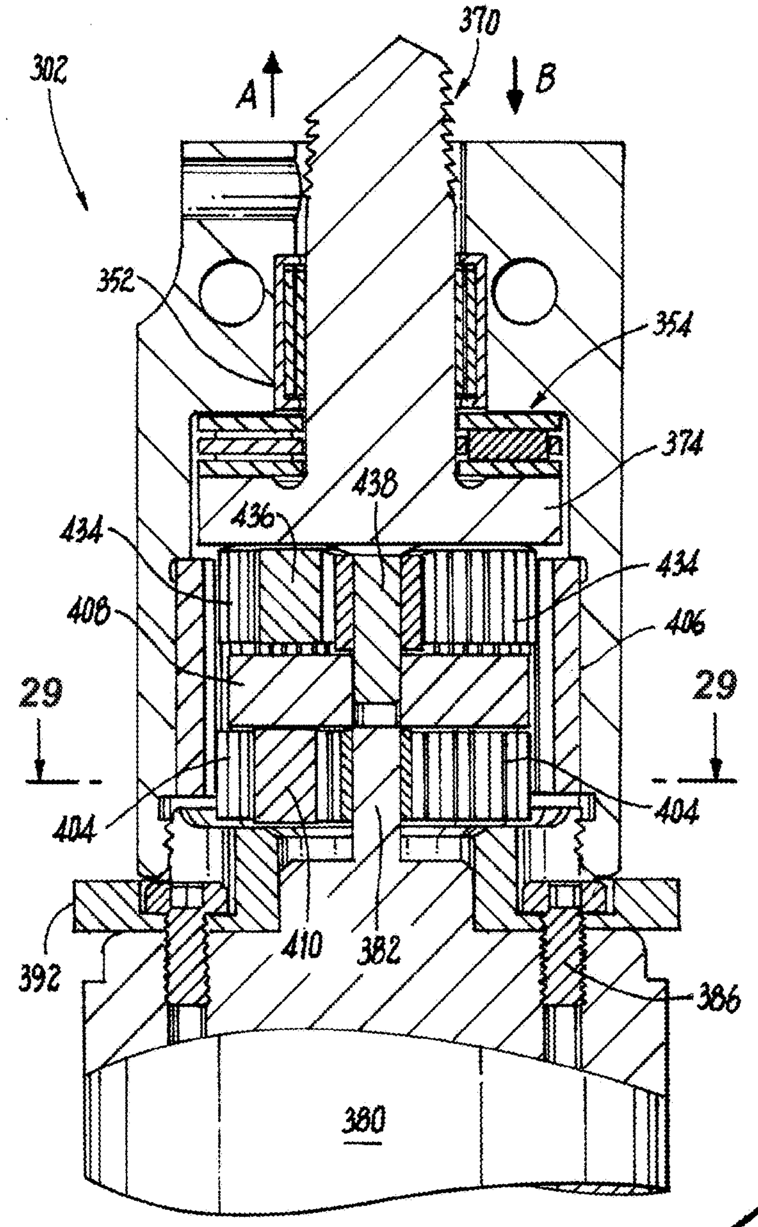
FIG. 28 is an enlarged view of the cross-sectional portion of the drive assembly of FIG. 27 taken from detail 28, of FIG. 27 illustrating the lead drive shaft, bearing system and gear assembly of the drive assembly installed within the drive assembly housing.

In this exemplary embodiment, the lead drive shaft 370 includes the distal end portion 372, a proximal end portion 374 and an intermediate portion 376 between the distal end portion 372 and the proximal end portion 374, as shown in FIGS. 21, 27 and 28. The distal end portion 372 is threaded with, for example, buttress threads typically used for one-directional loading on the lead drive shaft 370, or acme threads typically used for bi-directional loading on the lead drive shaft 370. The proximal end portion 374 of the lead drive shaft 370 is a substantially flat plate with, for example, one or more mounting holes 378 used to couple the lead drive shaft 370 to the gear assembly 320. In the exemplary embodiment shown, the proximal end portion 374 of the lead drive shaft 370 is a substantially round flat plate, as shown in FIG. 21. The intermediate portion 376 of the lead drive shaft 370 has a smooth exterior surface with an outside diameter that is substantially the same as the outside diameter of the distal end portion 372. The jaw drive member 132, seen in FIG. 6, is movably coupled to the distal end portion 372 of the lead drive shaft 370.

Figure 29:
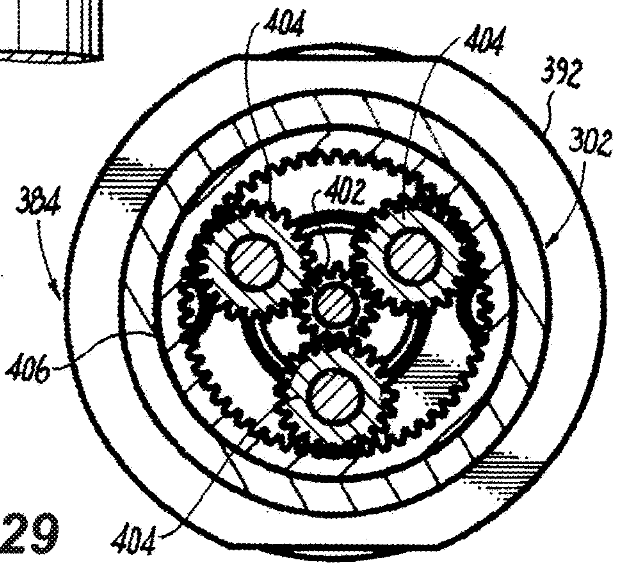
FIG. 29 is a cross-sectional view of the drive assembly of FIG. 28 taken from line 29-29 of FIG. 28 and illustrating the gear assembly shown as a planetary gear assembly.

Turning now to FIGS. 20, 21 and 29-31, another exemplary embodiment of a gear assembly according to the present disclosure will be described. The gear assembly 320 is positioned with the gear compartment 310 of the drive assembly housing 302. In this exemplary embodiment, the gear assembly 320 is a multi-stage gear assembly that utilizes a common ring gear. Each stage in the gear assembly is a planetary gear assembly that includes a pinion gear, two or more planetary gears, the common ring gear and a carrier plate. As an example, in the exemplary embodiment shown there are two planetary gear assemblies. A first planetary gear assembly 400 is the first stage (or an input stage), and a second planetary gear assembly 430 is the second stage (or an output stage). As shown in FIGS. 20 and 21, the first planetary gear assembly 400 includes a pinion gear 402, three planetary gears 404, the common ring gear 406, a carrier plate 408 and gear shafts 410. The pinion gear 402 is attached to the drive shaft 382 of the motor 380. The planetary gears 404 are attached to gear shafts 410 inserted into mounting holes 412 of the carrier plate 408 and extending from one side of the carrier plate 408 so that the planetary gears 404 are rotatable relative to their corresponding gear shaft 410. The gear shafts 410 are arranged on the carrier plate 408 so that the planetary gears 404 are spaced apart and independent of each other. As shown in FIGS. 27-31, the carrier plate 408 is positioned within the bottom portion 406*a* of the ring gear 406 so that the teeth of the planetary gears 404 intermesh with the teeth of the ring gear 406. It is noted that the outer diameter of the carrier plate 408 is less than the inner diameter of the ring gear 406 so that the carrier plate 408 does not damage the teeth on the ring gear 406, as seen in FIGS. 27, 28 and 29, as the carrier plate 408 rotates within the ring gear. The pinion gear 402 passes through a drive housing adapter 384, seen in FIGS. 20 and 21, releasably secured to the drive housing 302 so that the pinion gear 402 is positioned within the bottom portion 406*a* of the ring gear 406 between the planetary gears 404 so that the teeth of the pinion gear 402 intermesh with the teeth of the planetary gears 404, as seen in FIG. 29. More specifically, the drive housing adapter 384 of the drive assembly housing 302 is releasably secured to the motor 380 using fasteners 386, e.g., cap screws, passing through mounting apertures 387 in a lip portion 392 of the drive housing adapter 384 into engagement with mounting apertures 394 in the motor 380, seen in FIGS. 20 and 30. The pinion gear 402 passes through aperture 388 in the drive housing adapter 384 so that the pinion gear 402 can intermesh with the teeth of the planetary gears 404, as seen in FIGS. 20 and 21.

Continuing to refer to FIGS. 21 and 27-31, the second planetary gear assembly 430 includes a pinion gear 432, three planetary gears 434, the common ring gear 406, a carrier plate which, in this exemplary embodiment, is the proximal end portion 374 of the lead drive shaft 370, and gear shafts 436. The pinion gear 432 is attached to a gear shaft 438 inserted into mounting hole 414 in the carrier plate 408 and extending from a side of the carrier plate 408 that is opposite the planetary gears 404. The planetary gears 434 are attached to gear shafts 436 inserted into mounting holes

378 in the proximal end portion 374 of the lead drive shaft 370 and extending from one side of the proximal end portion 374 of the lead drive shaft 370 so that the planetary gears 434 are rotatable relative to their corresponding gear shaft 436. The gear shafts 436 are arranged on the proximal end portion 374 of the lead drive shaft 370 so that the planetary gears 434 are spaced apart and independent of each other. The proximal end portion 374 of the lead drive shaft 370 is positioned adjacent a top portion **406*b* of the ring gear 406 so that the teeth of the planetary gears 344 are within the drive assembly housing 302 and intermesh with the teeth of the top portion 406*b* of the ring gear 406, as seen in FIGS. 21, 27 and 28. The pinion gear 432 is positioned within the ring gear 406 between the planetary gears 434 so that the teeth of the pinion gear 432 intermesh with the teeth of the planetary gears 434, as seen in FIGS. 21 and 29**.

Figure 32:
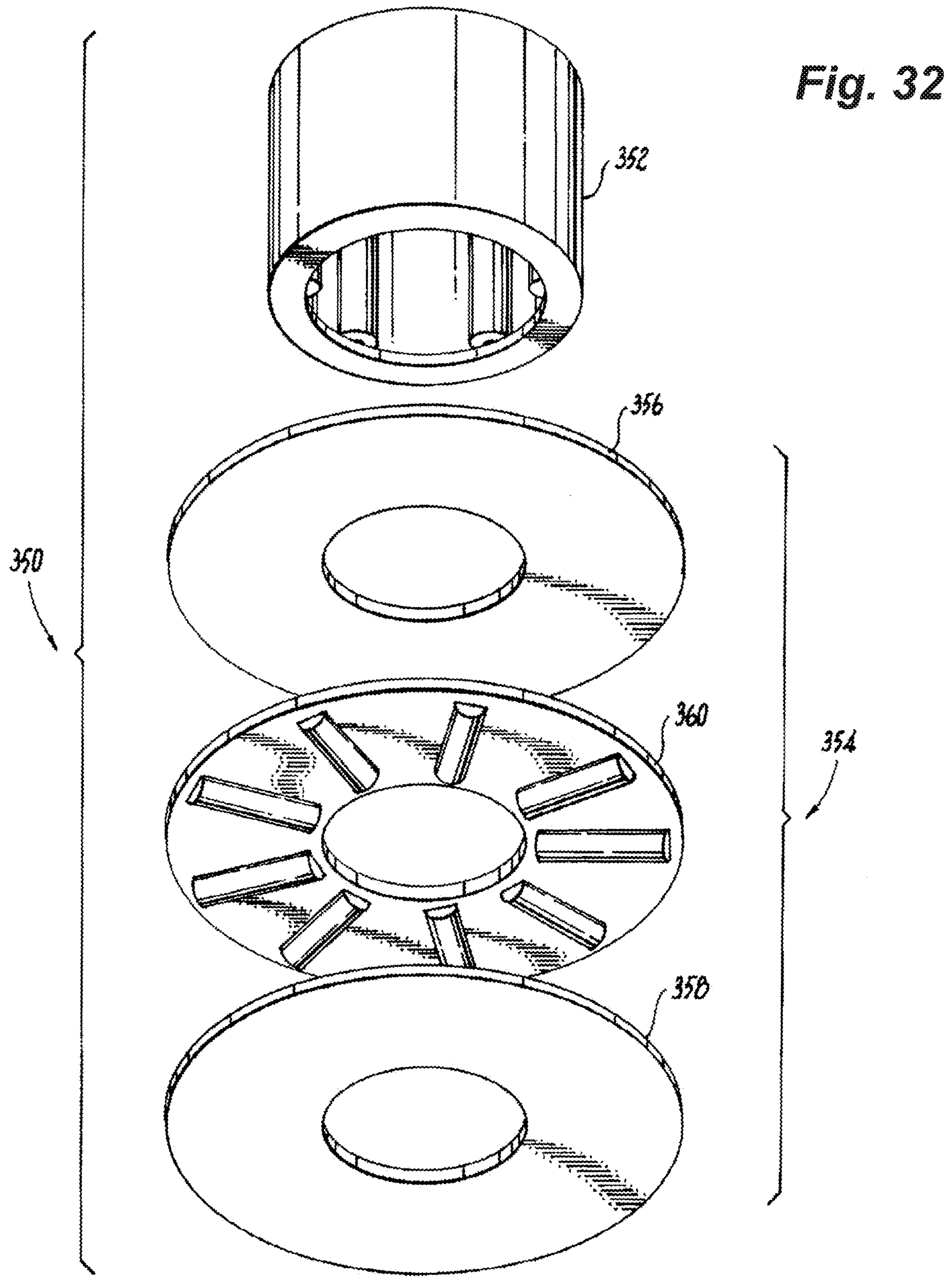
FIG. 32 is an enlarged, exploded perspective view of the bearing system of FIG. 21, illustrating a thrust bearing and a radial bearing.

As noted, the proximal end portion 374 of the lead drive shaft 370 is secured within the drive assembly housing 302 by the bearing system 350, the gear assembly 320 and the drive housing adapter 384 of the drive assembly housing 302, seen in FIGS. 28, 29 and 32. The drive housing adapter 384 is secured to a proximal end portion **302*b* of the drive assembly housing 302 by a mechanical connection. In the exemplary embodiment shown, the mechanical connection is a threaded connection, where threading 390 on the drive housing adapter 384 is screwed into threading 314 in the drive assembly housing 302, seen in FIGS. 20, 23 and 31. However, other mechanical connections are contemplated, including snap-fit and press-fit connections where the drive housing adapter 384 is snapped or pressed within the drive assembly housing 302. Set screw connections where set screws secure the drive housing adapter 384 to the drive assembly housing 302 and welds are also contemplated. A first sealing member similar to the sealing member 137 shown in FIG. 9, may be positioned within the aperture 388 in the drive housing adapter 384 to seal the connection between motor 380 and the drive housing adapter 384. A non-limiting example of a suitable first sealing member is an O-ring. Similarly, a second sealing member (not shown) may be positioned on the lip portion 392 adjacent the threading 390 of the drive housing adapter 384 to further seal the connection between motor 380 and the drive housing adapter 384**. A non-limiting example of a suitable second sealing member is an O-ring.

Referring now to FIGS. 21, 27, 32 and 34, another exemplary embodiment of a bearing system according to the present disclosure is shown. The bearing system 350 is provided so that the drive assembly 300 can withstand radial and axial (or thrust) loads as the lead drive shaft 370 is rotated during an operation of the tool 10. The bearing system 350 is positioned on the intermediate portion 376 of the lead drive shaft 370 with a portion within the bearing compartment 306 of the drive assembly housing 302 and a portion in the thrust bearing compartment 308 of the drive assembly housing.

In the exemplary embodiment shown, the bearing system 350 includes a radial bearing 352 and a thrust bearing assembly 354. The radial bearing 352 is provided to withstand radial loads on the lead drive shaft 370 as it rotates during an operation of the tool 10. An example of a suitable radial bearing 352 is the Koyo Bearing No. BK1010 manufactured by JTEKT North America Corporation. The thrust bearing assembly 354 includes an upper thrust washer 356, a lower thrust washer 358 and a thrust bearing 360 between the upper thrust washer 356 and lower thrust washer 358. The thrust bearing assembly 354 is provided to withstand axial (or thrust) loads on the lead drive shaft 370, in the direction of arrow “A” seen in FIG. 28, as the lead drive shaft rotates during an operation of the tool 10. An example of a suitable thrust bearing assembly 354 is the Koyo Bearing No. NTA613 manufactured by JTEKT North America Corporation. The upper thrust washer 356 is positioned on the thrust bearing 360 and the lower thrust washer 358 is positioned on the thrust bearing 360 and are provided to hold the thrust bearing 360 in position within the thrust bearing compartment 308 of the drive assembly housing 302. In addition, the upper thrust washer 356 and the lower thrust washer 358 also resists and transfers thrust loads to the distal end **302*a* of the drive assembly housing 302**.

Figure 30:
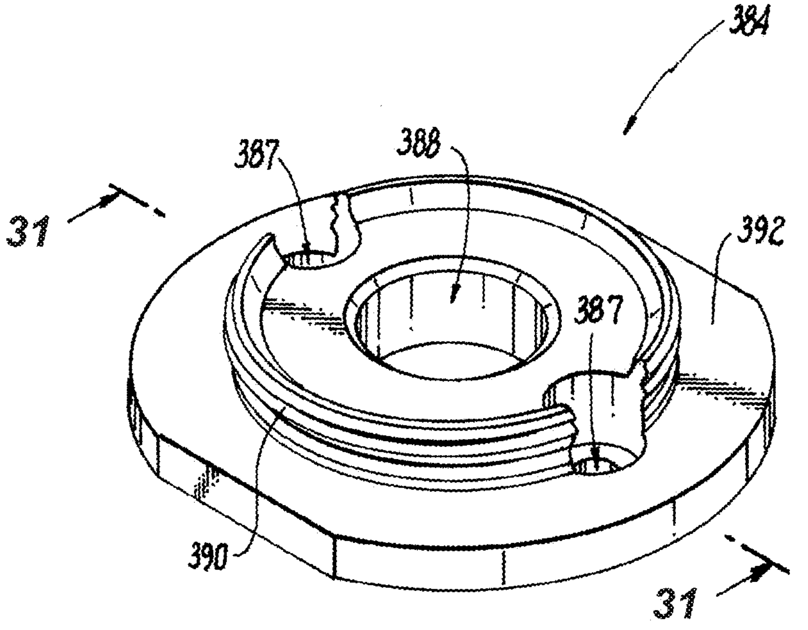
FIG. 30 is an enlarged perspective view of the drive housing adapter of FIG. 20.
Figure 31:
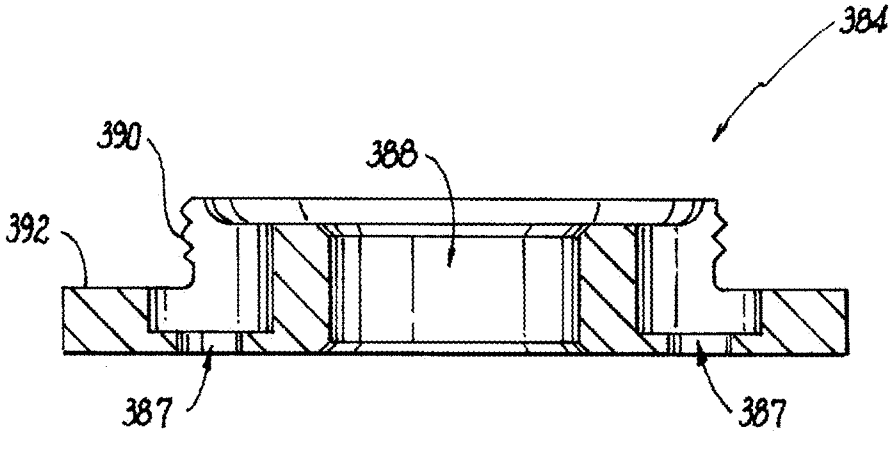
FIG. 31 is a cross-sectional view of the drive housing adapter of FIG. 30 taken from line 31-31.

The radial bearing 352 has a central bore 353 as shown in FIG. 21 with a diameter sufficient to receive the intermediate portion 376 of the lead drive shaft 370. The thrust bearing assembly 354 has a center bore 362, seen in FIG. 34, with a diameter sufficient to receive the intermediate portion 376 of the lead drive shaft 370. More specifically, the radial bearing 352 is press fit into the radial bearing compartment 306 of the drive assembly housing 302 so that the radial bearing 352 can receive the intermediate portion 376 of the lead drive shaft 370, as seen in FIGS. 27 and 28. The thrust bearing 354 rests on the proximal end portion 374 of the lead drive shaft 370 within the thrust bearing compartment 308 of the drive assembly housing 302, as seen in FIGS. 29 and 30.

It is noted that an additional structure or an additional radial bearing (not shown) may be used to address radial loading or leaning at the distal end portion 372 of the lead drive shaft 370, especially under a full load of the jaw drive member 132 as seen in FIG. 11 movably attached to the lead drive shaft 370. For example, such additional structure may be the stabilizing roller 239, seen in FIG. 4, that engages the surface 233 of the jaw drive member 132 described above. Stabilizing roller 239 may have the same structure as cam roller 238 as described above and as depicted in FIGS. 37A-37C. The stabilizing roller 239 opposes the force applied by the cam roller 238 to the jaw drive member 132 to provide additional stability to the distal end portion 372 of the lead drive shaft 370 as the second jaw assembly 40 moves toward the first jaw assembly 20 when crimping a wire termination positioned between the first and second jaw assemblies during an operation of the tool 10.

Figure 33:
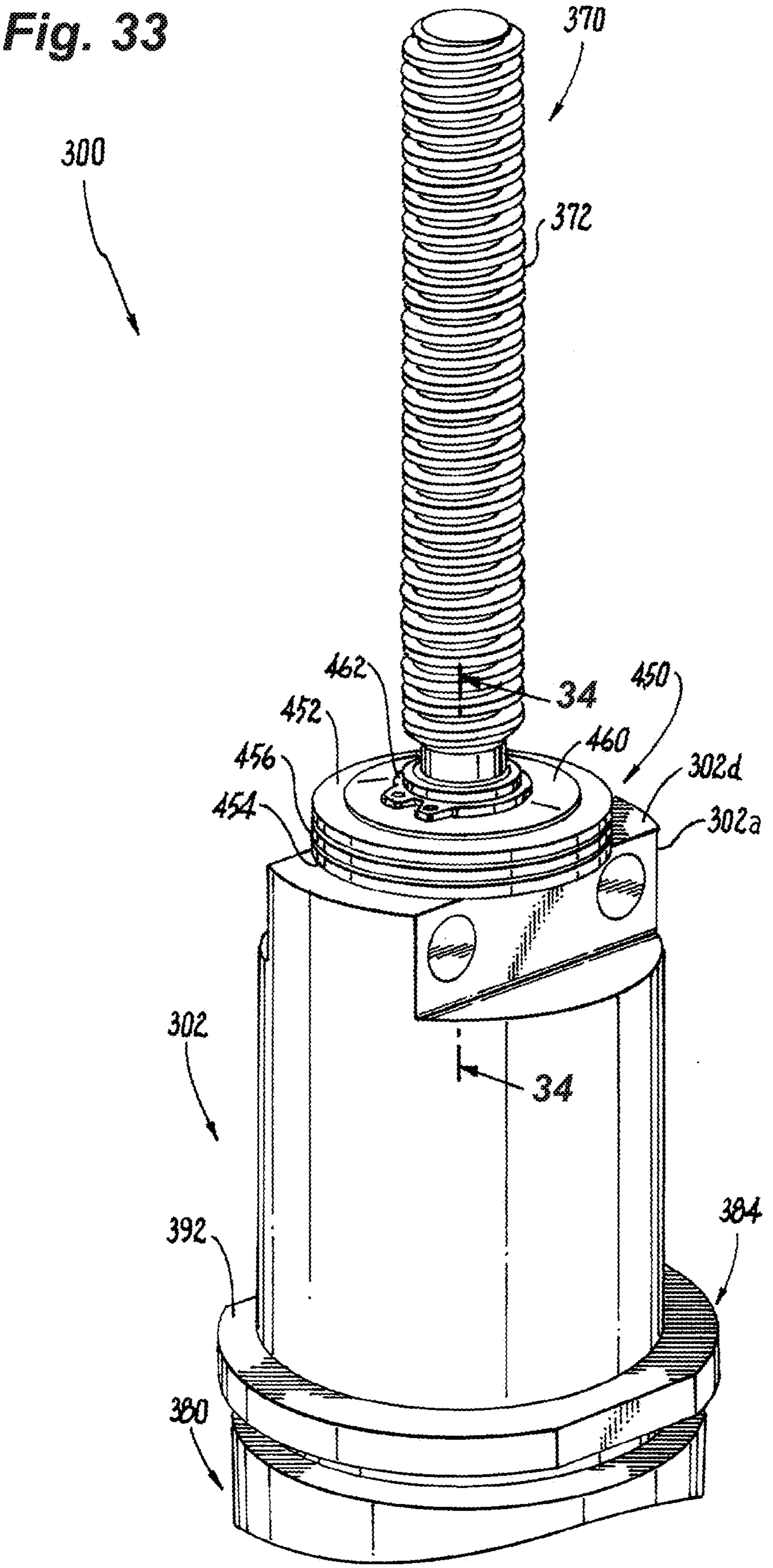
FIG. 33 is a perspective view of another exemplary embodiment of a drive assembly according to the present disclosure, illustrating a thrust bearing assembly on an outer surface of the drive assembly housing.
Figure 34:
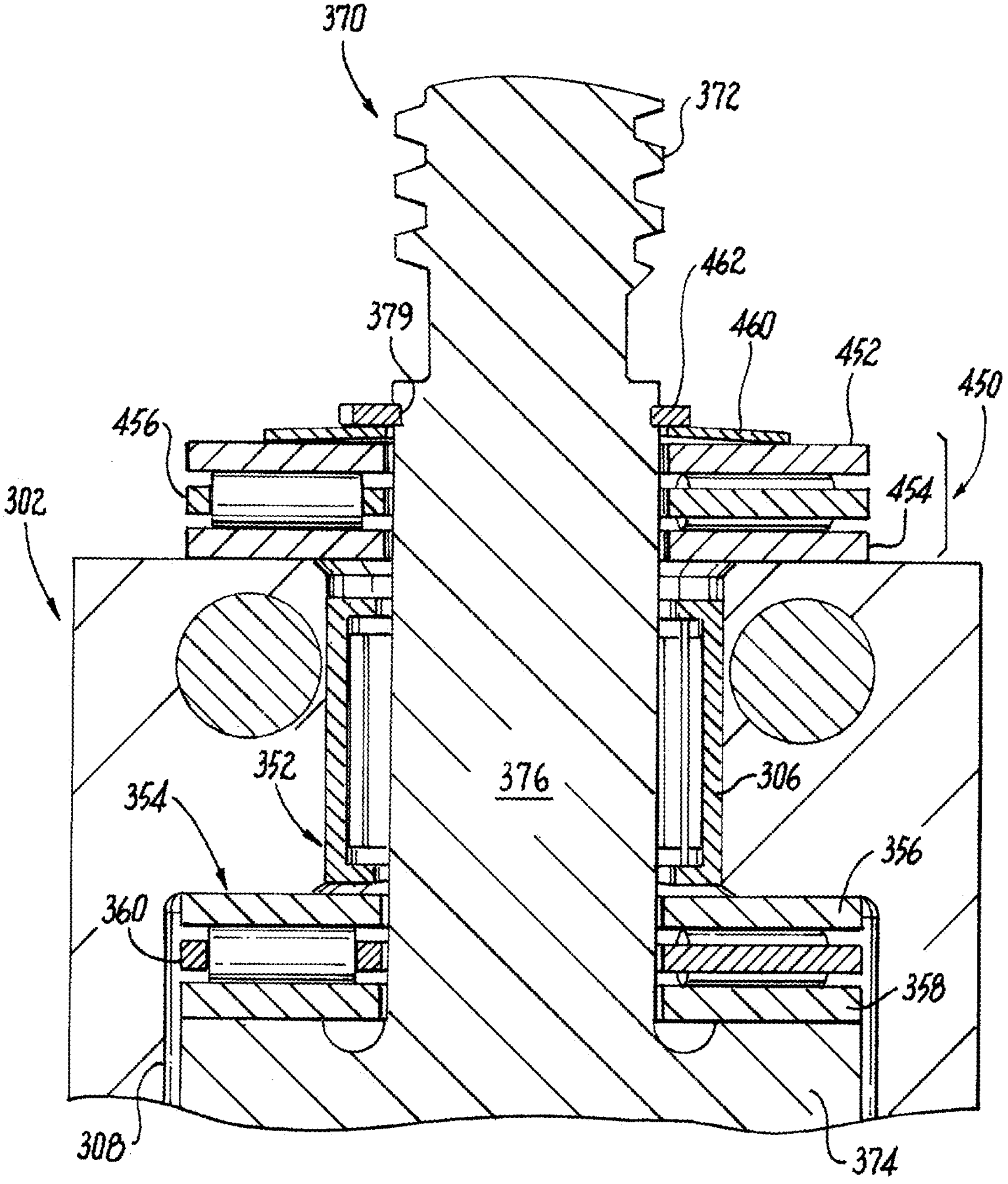
FIG. 34 is an enlarged cross-sectional view of the drive assembly of FIG. 33, taken from line 34-34 of FIG. 33 illustrating the lead drive shaft, bearing system and gear assembly of the drive assembly installed within the drive assembly housing, and the thrust bearing assembly on an outer surface of the drive assembly housing.

Referring to FIGS. 33 and 34, the bearing system 350 may include a second thrust bearing assembly 450. The second or upper thrust bearing assembly 450 includes an upper thrust washer 452, a lower thrust washer 454 and a thrust bearing 456 between the upper thrust washer 452 and lower thrust washer 454. The thrust bearing assembly 450 is provided to withstand axial (or thrust) loads on the lead drive shaft 370, in the direction of arrow “B” seen in FIG. 28, as the lead drive shaft 370 rotates during an operation of the tool 10. An example of a suitable second thrust bearing assembly 450 is the Koyo Bearing No. NTA613 manufactured by JTEKT North America Corporation. In this exemplary embodiment, the upper thrust washer 452 is positioned on the thrust bearing 456 and the lower thrust washer 454 is positioned on the outer surface **302*d* of the distal end portion 302*a* of the drive assembly housing 302. The second thrust bearing 450 has a central opening 458 configured to receive the intermediate portion 376 of the lead drive shaft 370 that extends out of the distal end portion 302*a* of the drive assembly housing 302. The second thrust bearing 450 is secured in position on the outer surface 302*d* of the of the distal end portion 302*a* of the drive assembly housing 302 using a spring washer 460 and a retaining ring 462 that attaches to a notch 379 in the intermediate portion 376 of the lead drive shaft 370**, as shown.

Referring again to FIGS. 20, 29 and 30 and as described above, extending from a proximal end portion 302*b* of the drive assembly housing 302 and operatively coupled to the gear assembly 320 is the motor 380. Generally, the motor 380 rotates a motor drive shaft 382, seen in FIGS. 20 and 21, that is coupled to the gear assembly 320. The gear assembly 320 reduces the rate of rotation of the motor drive shaft 382. The lead drive shaft 370 is coupled to the gear assembly 320 and rotates at the output rate of the gear assembly. The bearing system 350 is provided so that the lead drive shaft 370 can withstand radial and axial loads generated during an operation of the jaw assemblies 20 and 40. As an example, the motor 380 may be configured to rotate the motor drive shaft 382 at a rate in the range of about 15,000 rpm and about 21,000 rpm with an output torque in the range of about 0.4 in-lb. and about 0.8 in-lb. In this configuration, the motor current may be in the range of about 6 amps and about 15 amps, the battery voltage may be in the range of about 16 VDC and about 24 VDC, and the output motor power may be in the range of about 95 watts and about 160 watts. The gear assembly 320 may reduce the rate of rotation of the motor drive shaft 382 to a range of about 375 rpm and about 1400 rpm. As such, the gear ratio of the gear assembly 320 may be in the range of about 15:1 and about 40:1. The output of the gear assembly 320 is transferred to the lead drive shaft 370. In this exemplary embodiment, the lead drive shaft 370 is a threaded shaft having a diameter in a range of about 0.35 inches and about 0.50 inches, with a lead, e.g., a screw lead, in a range of about 0.071 inches and about 0.125 inches. Under the motor operating configuration described herein above, the efficiency of the gear assembly 320 may be in the range of about 11% and about 61%, and the pull force of the lead drive shaft 370 may be in the range of about 200 lbs. and about 400 lbs. Movement of the lead drive shaft 370 is transferred to the jaw drive member 132, seen in FIG. 6, which as noted above is attached to the lead drive shaft 370. In this exemplary embodiment of the present disclosure, the output of the gear assembly 320 is rotational motion which is transferred to the lead drive shaft 370. Rotation of the lead drive shaft 370 is translated to linear movement of the jaw drive member 132. With a pull force of the lead drive shaft 370 in the exemplary range of about 200 lbs. and about 400 lbs., the linear travel distance of the jaw drive member 132 may be in the range of about 0.6 inches and about 0.9 inches. Linear movement of the jaw drive member 132 moves the second jaw assembly 40 toward the first jaw assembly 20 when crimping a wire termination positioned between the first and second jaw assemblies. It is noted that with the gear assembly 320 reducing the rate of rotation of the motor drive shaft 382 to a range of about 375 rpm and about 1400 rpm, the total crimp cycle of the tool 10 may be in the range of about 0.4 seconds and about 2.0 seconds.

As another example, the motor 380 may be configured to rotate the motor drive shaft 382 at a rate in the range of about 19,000 rpm and about 21,000 rpm with an output torque in the range of about 0.49 in-lb. and about 0.69 in-lb. In this exemplary embodiment, the motor current may be in the range of about 9 amps and about 12 amps, the battery voltage may be in the range of about 16 VDC and about 22 VDC, and the output motor power may be in the range of about 120 watts and about 160 watts. The gear assembly 320 may reduce the rate of rotation of the motor drive shaft 382 to a range of about 600 rpm and about 1200 rpm. As such, the gear ratio of the gear assembly 320 may be in the range of about 18:1 and about 33:1. As noted, the output of the gear assembly 320 is transferred to the lead drive shaft 370. In this exemplary embodiment, the lead drive shaft 370 is a threaded shaft having a diameter in a range of about 0.35 inches and about 0.4 inches, with a lead, e.g., a screw lead, in a range of about 0.075 inches and about 0.1 inches. Under the motor operating configuration described above the efficiency of the gear assembly 320 may be in the range of about 20% and about 52%, and the pull force of the lead drive shaft 370 may be in the range of about 288 lbs. and about 377 lbs. Movement of the lead drive shaft 370 is transferred to the jaw drive member 132. In this exemplary embodiment of the present disclosure, the output of the gear assembly 320 is rotational motion which is transferred to the lead drive shaft 370. Rotation of the lead drive shaft 370 is translated to linear movement of the jaw drive member 132. With a pull force of the lead drive shaft 370 in the exemplary range of about 288 lbs. and about 377 lbs., the linear travel distance of the jaw drive member 132 may be in the range of about 0.65 inches and about 0.85 inches. Linear movement of the jaw drive member 132 moves the second jaw assembly 40 toward the first jaw assembly 20 when crimping a wire termination positioned between the first and second jaw assemblies. It is noted that with the gear assembly 320 reducing the rate of rotation of the motor drive shaft 382 to a range of about 600 rpm and about 1200 rpm, the total crimp cycle of the tool 10 may be in the range of about 0.4 seconds and about 0.9 seconds.

As described above, in the exemplary embodiment shown, the motor 380 is electrically connected to a battery or power supply 108 and the processing element 166, seen in FIG. 15, and its operation is controlled by the trigger 114 and/or the processing element 166. LED 110 and magnetic field sensor 164 are also coupled to processing element 166. Generally, the motor 380 is adapted to operate at a nominal voltage corresponding to the voltage of the battery 108, e.g., between about 16 VDC and about 24 VDC. For example, if the battery 108 is adapted to output a voltage of about 20 VDC, then the motor 124 would be adapted to operate at a voltage of about 20 VDC. Under a no-load condition, such a motor 124 can operate at about 22,000 rpm with a current of about 0.2 amps. At maximum efficiency, the motor 124 can operate in a range of about 18,000 rpm to about 20,000 rpm with a current in a range of about 10 amps and about 12 amps, a torque of about 0.4 in-lb., and an output wattage in a range of about 95 W and about 135 W. A calibration mode button 117 is provided inside the tool 10 and is accessible via a hole or vent (not shown) provided in housing 100. When calibration mode button 117 is pressed, processing element 166 enters a calibration mode for calibrating the tool 10 as will be described in more detail below.

Figure 35:
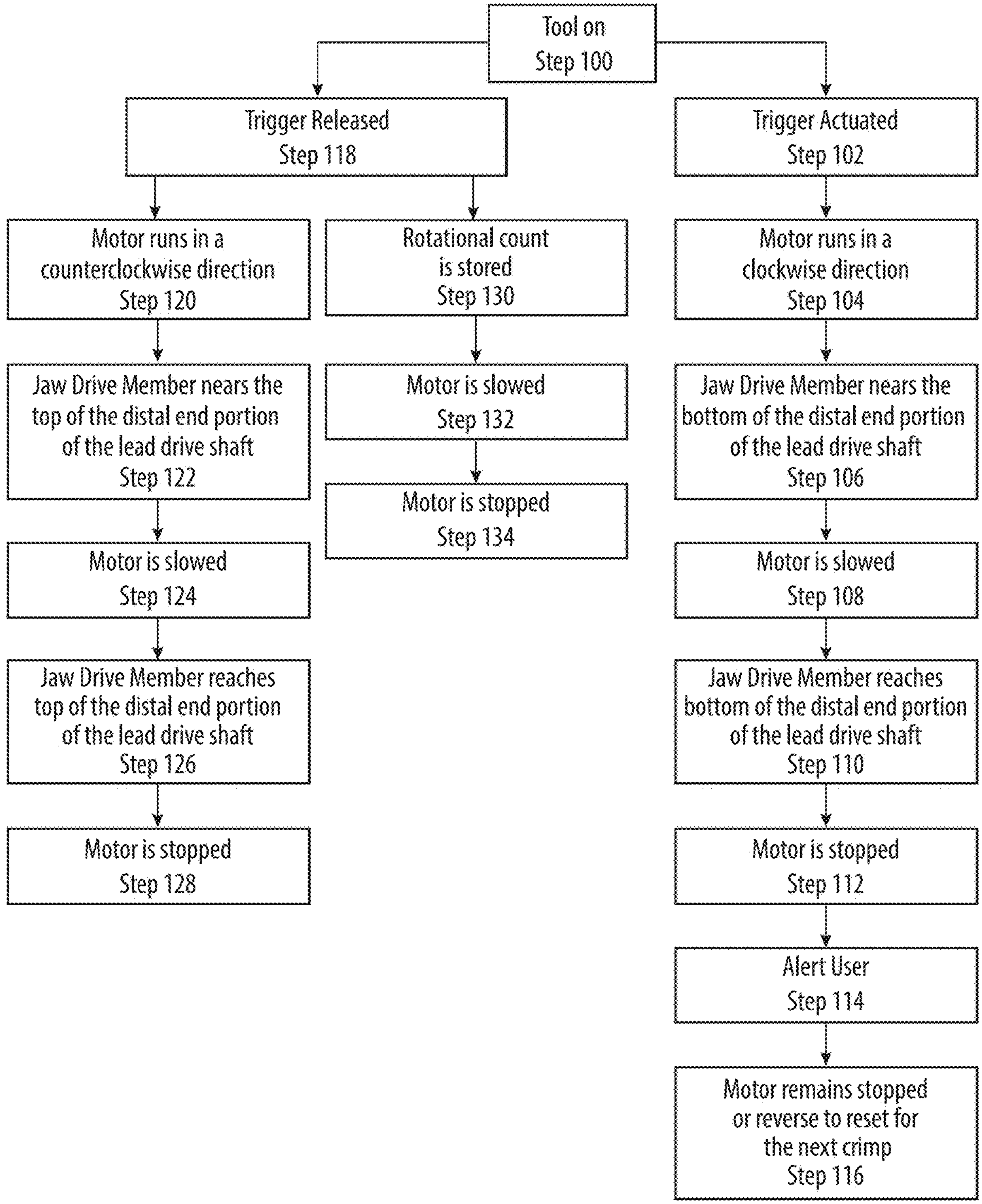
FIG. 35 is a flow diagram showing the general logic of the magnetic displacement monitoring system.

FIG. 35 is a flow diagram showing general logic of the MDMS 160 of the tool 10 according to embodiments of the disclosure. At step 100 power is supplied to the tool 10, for example, by battery 108. At step 102, the trigger 114 is actuated to start the crimp operation cycle which causes the motor (e.g., motors 124 and 380) to run and the lead drive shaft (e.g., shafts 130, 240, 370) to rotate in a clockwise direction causing the jaw drive member 132 to move down the lead drive shaft (step 104). During the crimp operation cycle, the processing element 166 counts the number of rotations of the lead drive shaft to calculate the location of the jaw drive member 132 along the lead drive shaft. As the rotation count reaches a number that indicates the jaw drive member 132 is nearing the bottom of the distal end portion of the lead drive shaft (step 106), the speed of the motor is slowed in step 108. As the rotation count reaches a number that indicates the jaw drive member 132 has reached the bottom of the distal end portion of the lead drive shaft (step 10), power is cut off to the motor and a braking system may be applied in step 112. In step 114, once the jaw drive member 132 has reached the bottom of the distal end portion of the lead drive shaft and the crimp is made, the tool 10 may indicate this to the user by an audio, visual, or haptic (or some combination thereof) indicator 125. In one exemplary embodiment, the tool 10 may utilize an LED 110 and blink or illuminate solid green (any other suitable color may be used) to indicate the crimp is complete. In another embodiment, the tool 10 may beep or produce another style of alert tone to indicate the crimp is complete. In yet another exemplary embodiment, the tool 10 may vibrate to indicate the crimp is complete. It is envisioned that the tool 10 may pause when the jaw drive member 132 reaches the bottom of the distal end portion 130*a*, 240*a*, 372 of the lead drive shaft 130, 240, 370. In step 116, the motor 124, 380 may remain stopped or the motor 124, 380 may automatically run in the reverse direction to send the jaw drive member 132 back to the top of the distal end portion 130*a*, 240*a*, 372 of the lead drive shaft 130, 240, 370 to prepare the tool 10 for the next crimp to be made.

Continuing to refer to FIG. 35, the flow diagram shows two different sequences that may occur when the crimping process is complete, or the crimping process is halted. In the first possible sequence, at step 118, the trigger 114 is released to halt the crimp operation cycle which causes the motor 124, 380 to run in an opposite direction of when the trigger is actuated and sends the jaw drive member 132 to the top of the distal end portion 130*a*, 240*a*, 372 of the lead drive shaft 130, 240, 370 in step 120. As the jaw drive member 132 is being sent to the top of the distal end portion 130*a*, 240*a*, 372 of the lead drive shaft 130, the processing element 166 counts the number of rotations of the lead drive shaft 130 to calculate the location of the jaw drive member 132 along the distal end portion 130*a*, 240*a*, 372 of the lead drive shaft 130, 240, 370. As the rotation count reaches a number that indicates the jaw drive member 132 is nearing the top of the distal end portion 130*a*, 240*a*, 372 of the lead drive shaft 130, 240, 370 (seen in step 122), the speed of the motor 124, 380 is slowed in step 124. As the rotation count reaches a number that indicates the jaw drive member 132 has reached the top of the distal end portion 130*a*, 240*a*, 372 of the lead drive shaft 130, 240, 370 (seen in step 126), power is cut off to the motor 124, 380 and a braking system may be applied in step 128. In the second possible sequence, at step 130, the rotation count of the lead drive shaft 130, 240, 370 determined by the processing element 166 is stored in memory 168 so that the location of the jaw drive member 132 is known at the time of the next use of the tool 10. At step 132, a braking system is applied to the motor 124, 380 and then power is cut to the motor 124, 380 in step 134.

Figure 36:
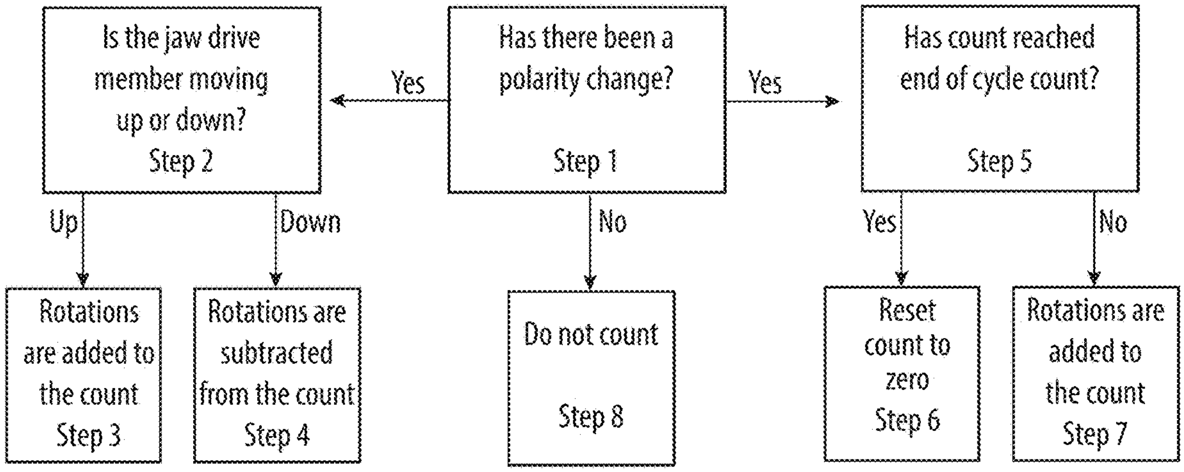
FIG. 36 is a flow diagram showing the counting logic of the magnetic displacement monitoring system.

FIG. 36 is a flow diagram showing the count logic of the MDMS 160 of the tool 10 according to embodiments of the present disclosure. As shown in FIGS. 6, 14 and 20, a magnet 162 is coupled to the distal end portion 130*a*, 240*a*, 372 of the lead drive shaft 130, 240, 370 and rotates about an axis so that the alternating N and S poles of the magnet 162 rotate adjacently to the magnetic field sensor 164 which detects a polarity change and generates a corresponding output signal that is indicative of rotation of the lead drive shaft 130, 240, 370 and the linear movement of the jaw drive member 132 about the lead drive shaft 130, 240, 370 (FIG. 36, step 1). As previously discussed, the change in polarity may occur at different points of rotation. As a non-limiting example, the polarity change may occur every ½ turn with a bipolar magnet or every ¼ turn with a quadrupole magnet. It is envisioned that the resolution of the rotation of the lead drive shaft 130, 240, 370 may be increased by determining if the polarity changed from a positive or negative to neutral. If it is determined that there has been a polarity change, next it needs to be determined if the jaw drive member 132 is moving up or down the distal end portion 130*a*, 240*a*, 372 of the lead drive shaft 130, 240, 370 (FIG. 36, step 2). If the jaw drive member 132 is moving up, then one rotation will be added to the count for each rotation that moves the jaw drive member 132 in an upward direction on the distal end portion 130*a*, 240*a*, 372 of the lead drive shaft 130, 240, 370 (FIG. 36, step 3). However, if the jaw drive member 132 is moving down, then one rotation will be subtracted from the count for each rotation that moves the jaw drive member 132 in a downward direction on the distal end portion 130*a*, 240*a*, 372 of the lead drive shaft 130, 240, 370 (FIG. 36, step 4). An alternative counting approach is if it is determined that there has been a polarity change, it next needs to be determined whether the count reached an end of cycle count (FIG. 36, step 5). If an end of cycle count has been reached, then the count is reset back to zero (FIG. 36, step 6). If an end of cycle count has not been reached, then one rotation will continue to be added to the count for each rotation that moves the jaw drive member 132 in an upward direction on the distal end portion 130*a*, 240*a*, 372 of the lead drive shaft 130, 240, 370 (FIG. 36, step 7). If it is determined that there has been no polarity change, then there is no count (FIG. 36, step 8).

The addition of the magnetic displacement monitoring systems 160 as described herein to the tool drive systems reduces the number of parts a tool may require. For example, by adding the magnetic displacement monitoring system, a tool may no longer require an adjustment tab and/or complex cam pin, the number of switches required is reduced, and universal asynchronous receiver/transmitters ("UART") ports are reduced.

In addition to the advantages described above, the magnetic displacement monitoring system allows electronic calibration to be performed on the tool without requiring the tool housing to be disassembled. For example, each of the components forming any mechanical tool will have certain degrees of allowable tolerance. Tolerance stack-up analysis is used to calculate the cumulative effects of these part tolerances in the assembly. Accordingly, although each tool coming out of manufacture is technically "identical", the cumulative effects of these part tolerances must often be dealt with when calibrating a mechanical device. For example, the upper and lower limits of tools such as those described herein are unique to each tool because of these tolerances. This requires calibration of these limits for each tool. Mechanical calibration would require each tool to be put through one or more calibration procedures during the manufacturing process where one or more of the components forming the tool may need to be adjusted to make certain the tool operates as desired and within specifications. Such mechanical calibration is often tedious and unreliable. Furthermore, as the tool wears, it may be necessary to perform additional periodic calibration procedures during the lifespan of the tool. This may generally require one or more portions of the tool to be disassembled so that the internal components can be tested and adjusted so that the tool continues to operate as desired and within specifications.

As described herein the magnetic displacement monitoring system measures the final rotary output of the lead screw. The lead screw has a fixed pitch that is used to calculate the displacement of the cam per rotation or fractional rotation of the lead screw. Such a contactless system of measurement allows easy and precise control of the start and end positions of the tool cam over the lifetime of the tool. This precise control allows a tool utilizing the magnetic displacement monitoring system to be electronically calibrated rather than mechanically calibrated. The tool can be easily calibrated and recalibrated inside of the housing without the need for any disassembly of the tool. Each tool can be calibrated with virtually no human input and the tool can be readily recalibrated in the field utilizing just a gauge block as described below. This allows the tool to produce precise crimps even when internal components are worn, thus extending the useful life of the tool.

Figure 40A:
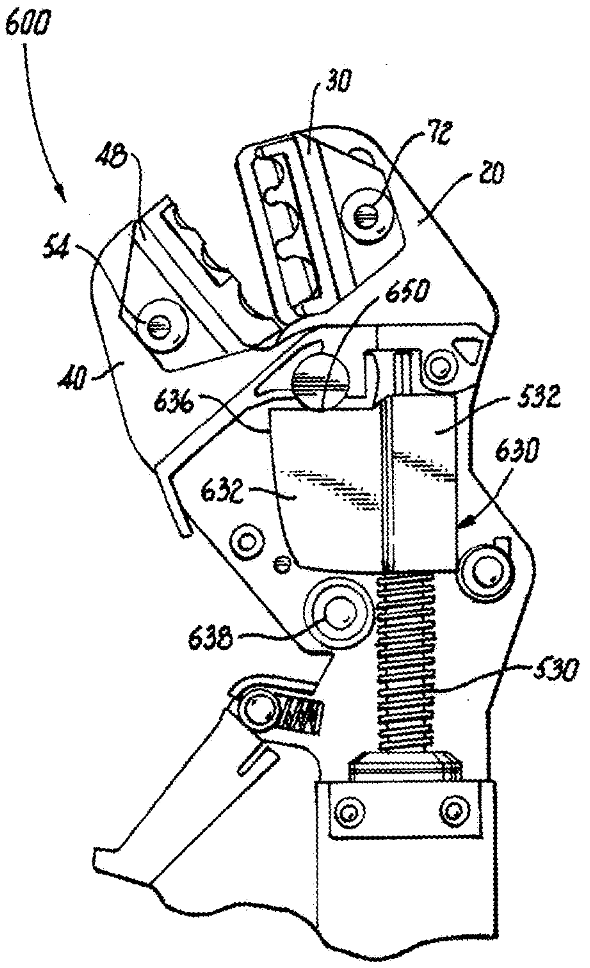
FIGS. 40A, 40B are views of a tool showing placement of portions thereof during a calibration procedure according to an illustrative embodiment of the present disclosure.
Figure 40B:
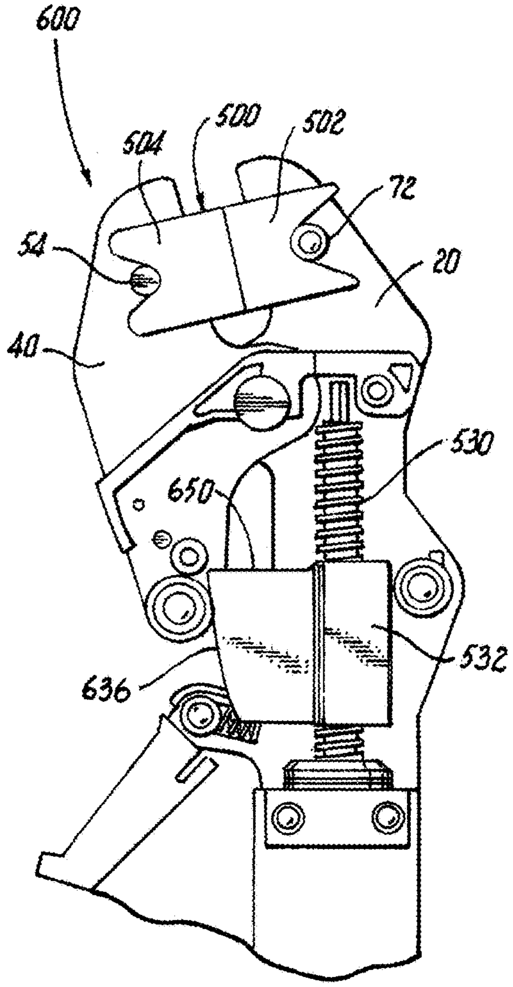

An electronic calibration procedure according to an illustrative embodiment of the present disclosure will be described by reference to FIGS. 39A-40B. These figures depict a tool 600 which is similar to the battery-powered, hand-held crimping tool 10 described above with respect to FIGS. 1-6 and includes the magnetic displacement monitoring system 160 as described herein. For purposes of ease of description, tool 600 is shown in FIGS. 39A, 40A, 40B with the outer housing removed. In addition, tool 600 is shown in FIGS. 40A, 40B with half (e.g., second jaw plate 44) of the second jaw assembly 40 and half (e.g., second jaw plate 24) of the first jaw assembly 20 removed to reveal the jaw drive member 532 coupled to the lead drive shaft 530 used to move the second jaw assembly. The jaw drive member 532 is similar to the draw drive member 132 described above with respect to FIGS. 2-4 and is movably coupled to the distal end portion of a lead drive shaft 530 similar to lead drive shaft 130 described above. In the exemplary embodiment shown, the jaw drive member 532 includes a body 630 and a camming member 632. The body 630 includes a threaded center bore (similar to bore 234 described above) that can be screwed onto the distal end portion of the lead drive shaft 530. The camming member 632 has a cam surface 636 configured to engage cam roller 638 (similar to cam roller 238 depicted in FIGS. 37A-37C) positioned between the first jaw plate (42 as shown in FIG. 2) and a second jaw plate (44 as shown in FIG. 2) in a manner similar to that described above. While the tool 600 is shown in these figures without a housing and/or with half of the jaw portions removed as described above for purposes of illustration only, the calibration procedure is normally performed with the tool 600 completely assembled.

Figure 38A:
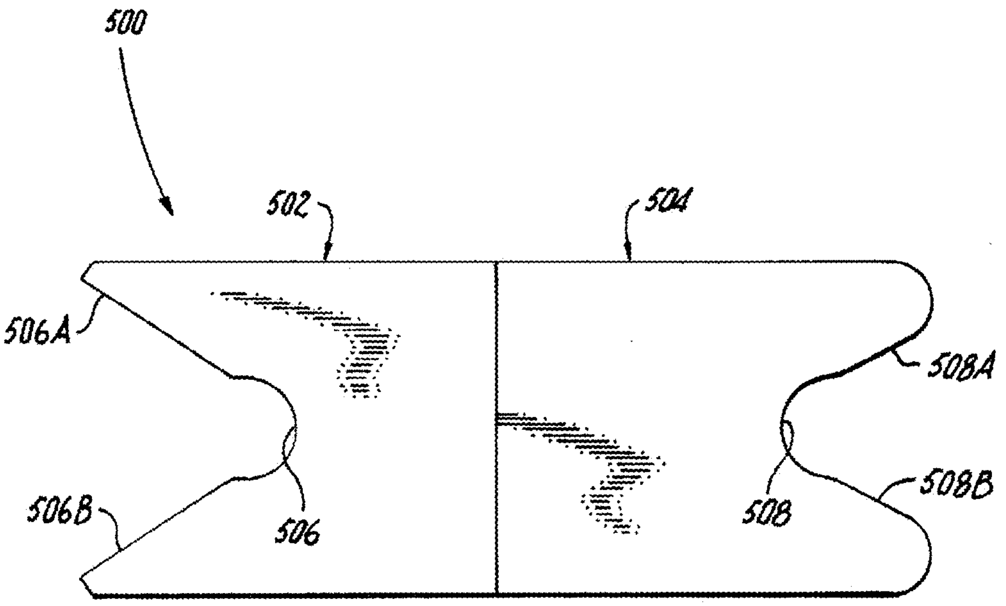
FIGS. 38A, 38B are views of a calibration gauge block according to an illustrative embodiment of the present disclosure.
Figure 38B:
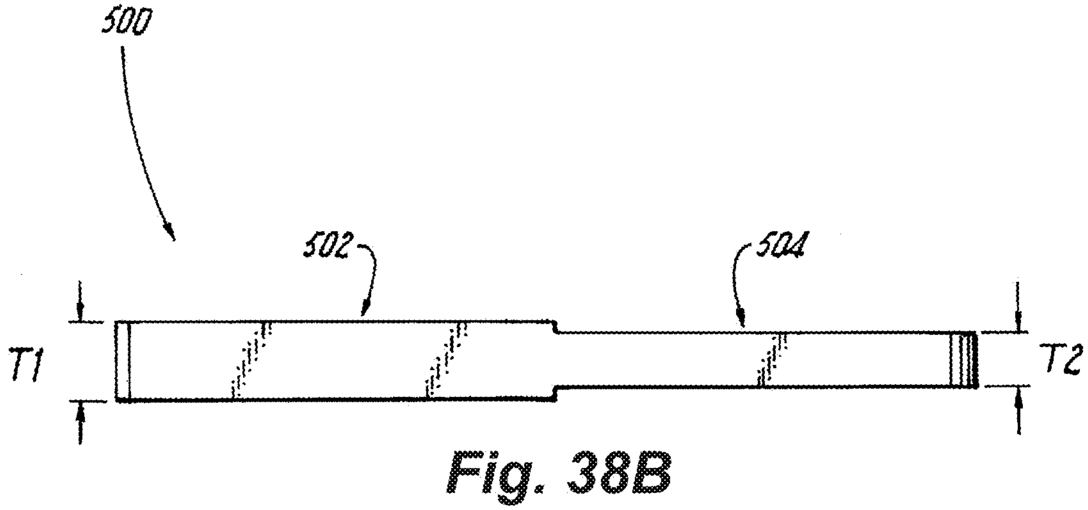

The tools described herein utilizing the magnetic displacement monitoring system 160 can be calibrated utilizing a calibration gauge block to set the center-to-center distance of the frame and jaw holes where dies are mounted. A calibration gauge block according to an illustrative embodiment of the present disclosure is shown in FIGS. 38A and 38B and may be referred to herein as gauge block 500 or just block 500. Gauge block 500 is formed from a block of material having a first end 502 and a second end 504. First end 502 is generally thicker in cross-section than second end 504 as shown in FIG. 38B. Referring also to FIG. 39A, first end 502 of gauge block 500 has a width T1 which is dimensioned to fit snugly within the gap Tj1 between the jaw plates of the first jaw assembly 20. Second end 504 of gauge block 500 has a width T2 which is dimensioned to fit snugly within the gap Tj2 between the jaw plates of the second jaw assembly 40. First end 502 has a V-shaped opening with sides 506A leading to a semi-circular like portion 506. As will be described below, the semi-circular like portion 506 is dimensioned to receive a pin or bolt 72 normally used to hold a die member in place in the first jaw assembly 20 (e.g., see FIG. 40B). Second end 504 has a V-shaped opening with sides 508A leading to semi-circular like portion 508. Semi-circular portion 508 is dimensioned to receive a pin or bolt 54 normally used to hold a die member in place in second jaw assembly 40. Gauge block 500 may be formed from any suitable type of material capable of maintaining its shape when compressed and which is not susceptible to substantial dimensional changes caused by environmental factors including temperature, moisture, etc. Examples of suitable types of materials include metals, plastics including composites, etc.

Figure 41:
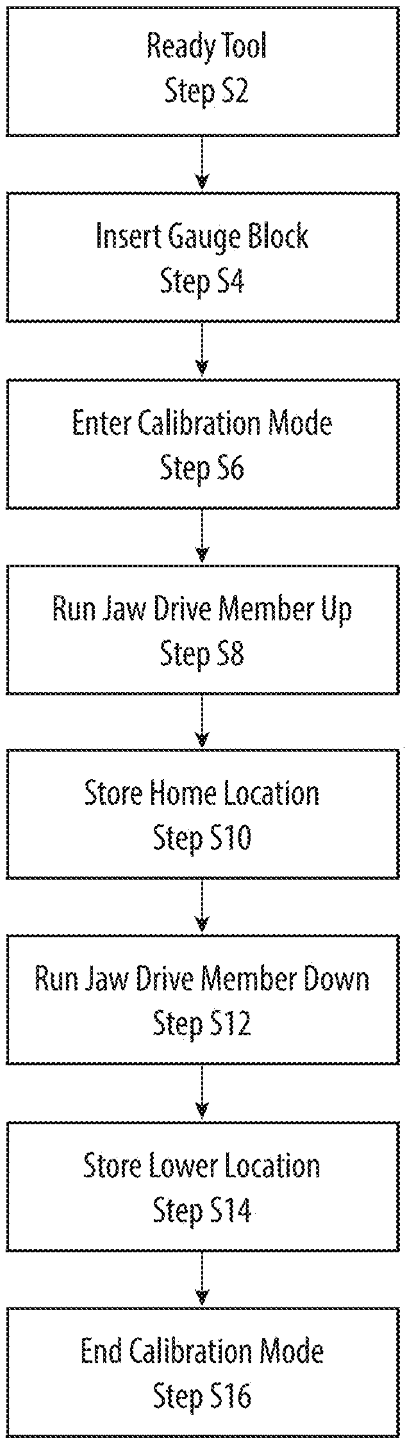
FIG. 41 is a flow chart for describing a calibration procedure according to an illustrative embodiment of the present disclosure.

A calibration procedure is described by reference to FIG. 41. In Step S2, the tool 600 is made ready for calibration. This may involve attaching a power source 108 (e.g., removable battery) to the tool, 10 removing bolts 72, 54 (FIG. 39A) and die members 30, 48 (FIG. 39B) from the first and second jaw assemblies of tool 600. Bolts 72, 54 may then be reattached. In Step S4, the gauge block 500 is inserted between the jaw plates of the first jaw assembly 20 and the second jaw assembly 40. In particular, the first and thicker end 502 of gauge block 500 is inserted into the gap Tj1 of first jaw assembly 20 until the semi-circular portion 506 engages bolt 72 (e.g., see FIGS. 39A and 40B). The gauge block 500 may then be rotated about bolt 72 so that the second and thinner end of the gauge block 500 enters the gap Tj2 of the second jaw assembly 40 and until the bolt 54 is located between the V-shaped opening in the second end 504 of gauge block 500. In Step S6, calibration mode of the tool is entered by pressing calibration mode button 117 (e.g., see FIG. 15) that can be accessed through a hole or vent (not shown) in housing 100. In Step S8, in response to button 117 being pressed, the processing element 166 will run lead drive shaft 530 (e.g., counterclockwise) driving jaw drive member 532 upward until the top of camming member 632 contacts the pivot pin 650 that connects the jaw and frame (see FIG. 40A). In Step S10, this uppermost location may be stored in firmware memory as the home location. Preferably, however, the processing element 166 determines the home location as a number of rotations or fractional rotations below this uppermost location. For example, according to an illustrative embodiment of the present disclosure, processing element 166 determines the home location as 1 rotation below the uppermost location. In Step S12, the lead drive shaft 530 is then driven by processing element 166 in the clockwise direction, driving jaw drive member 532 downward, closing the jaws on the gauge block 500 until sufficient pressure is built (e.g., see FIG. 40B). During this process, the number of rotations and/or fractions thereof of the lead drive shaft 530 are counted and maintained. As described above, the pressure is determined by the current draw of the motor and can be used to determine the uppermost location of the camming member 632 (e.g., home position) as well as the lowermost position of the camming member 632. Once sufficient pressure is reached, the lead drive shaft 530 is stopped. In Step S14, information identifying this lowermost location of the camming member 632 is stored in firmware. For example, the information identifying the lowermost location of the camming member 632 may be in the form of the number of rotations or fractions thereof for lead drive shaft 530 to reach the lowermost position from the home position. The calibration procedure then ends (Step S16).

The present disclosure provides drive assemblies with a magnetic displacement monitoring system that can be used with hand-held, battery powered tools including battery powered crimping tools that eliminate or reduce overtravel experienced by the drive assembly and also reduces the number of parts to manufacture the tool which in turn reduces the cost of manufacturing and increases the reliability of the tool.

The foregoing embodiments and advantages are merely exemplary and are not to be construed as limiting the scope of the present invention. The description of an exemplary embodiment of the present invention is intended to be illustrative, and not to limit the scope of the present invention. Various modifications, alternatives and variations will be apparent to those of ordinary skill in the art and are intended to fall within the scope of the invention.

Certain terminology may be used in the present disclosure for ease of description and understanding. Examples include the following terminology or variations thereof: top, bottom, up, upward, upper inner, outer, outward, down, downward, upper, lower, vertical, horizontal, etc. These terms refer to directions in the drawings to which reference is being made and not necessarily to any actual configuration of the structure or structures in use and, as such, are not necessarily meant to be limiting.

As shown throughout the drawings, like reference numerals designate like or similar corresponding parts. While illustrative embodiments of the present disclosure have been described and illustrated above, it should be understood that these are exemplary of the disclosure and are not to be considered as limiting. Various portions of the described embodiments may be mixed and matched depending on a particular application. Additions, deletions, substitutions, and other modifications can be made without departing from the spirit or scope of the present disclosure. Accordingly, the present disclosure is not to be considered as limited by the foregoing description.

What is claimed is:

1. A drive assembly for a portable, hand-held tool, the drive assembly comprising:

a motor;

a gear assembly coupled to the motor;

a lead drive shaft having a distal end portion and a proximal end portion;

a jaw drive member movable along the lead drive shaft as the lead drive shaft rotates about an axis;

a magnetic displacement monitoring system comprising at least one magnet having a magnetic field, the at least one magnet coupled to the distal end portion of the lead drive shaft, at least one magnetic field sensor disposed adjacent to the magnet wherein the magnetic field sensor is configured to sense the magnetic field as the lead drive shaft rotates about the axis, and a processing element electrically coupled to the magnetic field sensor configured to receive at least one signal from the magnetic field sensor and determine a position of the jaw drive member as the jaw drive member moves along the lead drive shaft; and a removable cover plate covering gaps in the hand-held tool for limiting debris from entering the hand-held tool, wherein the magnetic field sensor is embedded in the cover plate.

2. The drive assembly according to claim 1, wherein the at least one magnet is diametrically polarized.

3. The drive assembly according to claim 1, wherein the at least one magnet is one of a radial magnet, cylindrical magnet, or ring magnet.

4. The drive assembly according to claim 1, wherein the at least one magnet is a dipole magnet.

5. The drive assembly according to claim 1, wherein the at least one magnet is a quadrupole magnet.

6. The drive assembly according to claim 1, wherein the processing element slows the motor when the jaw drive member reaches a predefined point along the lead drive shaft.

7. The drive assembly according to claim 1, wherein the processing element stops power being supplied to the motor when the jaw drive member reaches a predefined point on the lead drive shaft.

8. The drive assembly according to claim 1, wherein the motor automatically reverses after the jaw drive member reaches a predefined point on the lead drive shaft.

9. A drive assembly for a portable, hand-held tool, the drive assembly comprising:

a drive assembly housing;

a motor housed within the drive assembly housing;

a gear assembly housed within the drive assembly housing;

a lead drive shaft having a distal end portion and a proximal end portion, the distal end portion being threaded;

a drive member movable along the lead drive shaft as the lead drive shaft rotates about an axis;

a magnetic displacement monitoring system having at least one magnet coupled to the distal end portion of the lead drive shaft, at least one magnetic field sensor disposed substantially adjacent to the magnet such that the magnetic field sensor detects a change to the magnetic field as the magnet rotates about the axis in relation to the lead drive shaft, and a processing element operatively coupled to the magnetic field sensor, wherein the processing element calculates the position of the drive member along the lead drive shaft; and a removable cover plate covering gaps in the drive assembly housing for limiting debris from entering the drive assembly housing, wherein the magnetic field sensor is embedded in the removable cover plate.

10. The drive assembly according to claim 9, wherein the at least one magnet is diametrically polarized.

11. The drive assembly according to claim 9, wherein the at least one magnet is one of a radial magnet, cylindrical magnet, or ring magnet.

12. The drive assembly according to claim 9, wherein the at least one magnet is a dipole magnet.

13. The drive assembly according to claim 9, wherein the at least one magnet is a quadrupole magnet.

14. The drive assembly according to claim 9, wherein the processing element slows the motor when the drive member reaches a predefined point along the lead drive shaft.

15. The drive assembly according to claim 9, wherein the processing element stops power being supplied to the motor when the drive member reaches a predefined point on the lead drive shaft.

* * * * *